(12) United States Patent
Booth

(10) Patent No.: US 10,453,131 B2
(45) Date of Patent: Oct. 22, 2019

(54) APPARATUSES, METHODS AND SYSTEMS FOR A LOCKED-IN TRADE FACILITATION ENGINE

(75) Inventor: Andrew Miles Booth, New York, NY (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 13/407,755

(22) Filed: Feb. 28, 2012

(65) Prior Publication Data

US 2012/0221458 A1    Aug. 30, 2012

Related U.S. Application Data

(60) Provisional application No. 61/447,566, filed on Feb. 28, 2011.

(51) Int. Cl.
  G06Q 40/00 (2012.01)
  G06Q 40/04 (2012.01)

(52) U.S. Cl.
  CPC ............ *G06Q 40/04* (2013.01); *G06Q 40/00* (2013.01)

(58) Field of Classification Search
  CPC ........ G06Q 40/04; G06Q 40/00; G06Q 40/06
  USPC ............... 705/37, 36 R, 35, 38, 39, 4, 26.64
  See application file for complete search history.

(56) References Cited

U.S. PATENT DOCUMENTS

| | | | |
|---|---|---|---|
| 7,379,911 B2* | 5/2008 | Lutnick | 705/37 |
| 7,584,130 B1* | 9/2009 | Schluetter | 705/35 |
| 8,027,900 B1* | 9/2011 | Chaffee | 705/37 |
| 2002/0046145 A1* | 4/2002 | Ittai | 705/36 |
| 2002/0091625 A1 | 7/2002 | Blauvelt et al. | |
| 2002/0138390 A1* | 9/2002 | May | 705/37 |
| 2002/0156719 A1 | 10/2002 | Finebaum et al. | |
| 2003/0229571 A1* | 12/2003 | May | 705/37 |
| 2007/0239589 A1* | 10/2007 | Wilson et al. | 705/37 |
| 2009/0024509 A1 | 1/2009 | Hawrysz | |

(Continued)

FOREIGN PATENT DOCUMENTS

WO    WO 2009/089358    7/2009

OTHER PUBLICATIONS

Lenglet, Marc "Conflicting Codes and Codings: How Algorithmic Trading Is Reshaping Financial Regulation" Dec. 2, 2011,Theory, Culture & Society, 2011 vol. 28 Issue 6, pp. 44-66.*

(Continued)

*Primary Examiner* — Kelly S Campen
(74) *Attorney, Agent, or Firm* — DLA Piper LLP (US)

(57) ABSTRACT

The APPARATUSES, METHODS AND SYSTEMS FOR A LOCKED-IN TRADE FACILITATION ENGINE ("LITF ENGINE") provides and facilitates delivery of open futures positions, upon or before expiry, into financial instruments, such as currency-denominated fixed income market positions. The LITF ENGINE facilitates cash trade transactions produced upon expiration of currency-denominated interest rate and fixed income futures contracts such as U.S. Treasury futures. In one embodiment, the LITF ENGINE provides a delivery process for U.S. Treasury futures, where contracts that remain open after the close of trading on the last trading day of the delivery month may be automatically submitted as locked-in trades in the underlying U.S. Treasury securities eligible for settlement on a delivery vs. payment (DVP) basis on the next business day.

28 Claims, 54 Drawing Sheets

(56) References Cited

U.S. PATENT DOCUMENTS

2009/0254488 A1* 10/2009 Huberman-Shlaes ...... 705/36 R
2011/0087580 A1*  4/2011 Patterson et al. ............... 705/37
2012/0078772 A1*  3/2012 Booth ............................ 705/37
2012/0116995 A1*  5/2012 Bloom ........................ 705/36 R
2012/0221458 A1*  8/2012 Booth ............................ 705/37

OTHER PUBLICATIONS

Muniesa, Fabian "Is a Stock Exchange a Computer Solution?: Explicitness, Algorithms and the Arizona Stock Exchange" 2011; International Journal of Actor-Network Theory and Technological Innovation (IJANTTI) 3(1); pp. 1-15.*

International Search Report and Written Opinion of the International Searching Authority, dated Feb. 6, 2013, for PCT International Application No. PCT/US2012/0274046, filed Feb. 28, 2012.

* cited by examiner

| | Example #1 | Example #2 | Example #3 | Example #4 |
|---|---|---|---|---|
| | 2Yr T-Note | 2Yr T-Note | 5Yr T-Note | 5Yr T-Note |
| CUSIP | 912828KG4 | 912828KG4 | 912828LQ1 | 912828LQ1 |
| First Calendar Day of Expiry Month | | | | |
| Coupon | 1.375 | 1.375 | 2.375 | 2.375 |
| Maturity | | | | |
| 10 Year T-Note or 30 Year Bond (Y or N)? | N | N | N | N |
| Days To Maturity from end of Expiry | 745 | 653 | 1674 | 1582 |
| months difference (same year) | 0 | -3 | 6 | 3 |
| months difference | 24 | 21 | 54 | 51 |
| years diff (irrespective of month/day) | 2 | 2 | 4 | 4 |
| n - No. of Years | 2 | 1 | 4 | 4 |
| z - No. of Months/Months to Nearest Quarter | 0 | 9 | 6 | 3 |
| v | 0 | 3 | 6 | 3 |
| coupon | 1.375 | 0.01375 | 0.02375 | 0.02375 |
| a | 1 | 0.985329 | 0.970874 | 0.985329 |
| b | 0.687500 | 0.003438 | 0.000000 | 0.005938 |
| c | 0.888487 | 0.915142 | 0.789409 | 0.789409 |
| d | 2.555506 | 0.019447 | 0.083359 | 0.083359 |
| Conversion Factor | 1.444 | 0.9242 | 0.8589 | 0.8657 |

FIG. 16B

| | Example #5 | Example #6 | Example #7 | Example #8 |
|---|---|---|---|---|
| | 10Yr T-Note | 10Yr T-Note | 30Yr T-Note | 30Yr T-Note |
| | 912828GS3 | 912828KS3 | 912828EY0 | 912828EY0 |
| | 4.5 | 4.5 | 6.5 | 6.5 |
| | Y | Y | Y | Y |
| | 2540 | 2448 | 5828 | 5738 |
| | -1 | -4 | -1 | 8 |
| | 83 | 80 | 191 | 188 |
| | 7 | 7 | 16 | 15 |
| | 6 | 6 | 15 | 15 |
| | 9 | 6 | 9 | 6 |
| | 3 | 6 | 3 | 6 |
| | 0.045 | 0.045 | 0.065 | 0.065 |
| | 0.985329 | 0.970874 | 0.985329 | 0.970874 |
| | 0.011250 | 0.000000 | 0.016250 | 0.000000 |
| | 0.680951 | 0.701381 | 0.399987 | 0.411987 |
| | 0.239287 | 0.223965 | 0.650014 | 0.637014 |
| | 0.9177 | 0.9202 | 1.0504 | 1.05 |

FIG. 16C

| | |
|---|---|
| | Example #1 |
| | 2Yr T-Note |
| CUSIP | 912828KG4 |
| First Calendar Day of Expiry Month | 40238 |
| Coupon | 1.375 |
| Maturity | 40983 |
| 10 Year T-Note or 30 Year Bond (Y or N)? | N |
| Days To Maturity from end of Expiry | =B6-B4 |
| months difference (same year) | =MONTH(B6)-MONTH(B4) |
| months difference | =(YEAR(B6)-YEAR(B4))*12+MONTH(B6)-MONTH(B4) |
| years diff (irrespective of month/day) | =YEAR(B6)-YEAR(B4) |
| n -No. of Years | =ROUNDDOWN(B11/12,0) |
| z -No. of Months/Months to Nearest Quarter | =IF(B7="Y",IF(B11-(B14*12)<3,0,IF(B11-(B14*12)<6,3,IF(B11-(B14*12)<9,6,9))),B11-(B14*12)) |
| y | =IF(B15<7,B15,IF(B7="Y",3,(B15-6))) |
| coupon | =B5/100 |
| a | =ROUND(POWER(1/1.03,B16/6),6) |
| b | =ROUND((B17/2)*(6-B16)/6,6) |
| c | =ROUND(IF(B15<7,POWER(1/1.03,(2*B14)),POWER(1/1.03,((2*B14)+1))),6) |
| d | =ROUND((B17/0.06)*(1-B20),6) |
| Conversion Factor | =ROUND(B18*((B17/2)+B20+B21)-B19,4) |

| |
|---|
| Example #2 |
| 2Yr T-Note |
| 912828KG4 |
| 40330 |
| 1.375 |
| 40983 |
| N |
| =C6-C4 |
| =MONTH(C6)-MONTH(C4) |
| =(YEAR(C6)-YEAR(C4))*12+MONTH(C6)-MONTH(C4) |
| =YEAR(C6)-YEAR(C4) |
| =ROUNDDOWN(C11/12,0) |
| =IF(C7="Y",IF(C11-(C14*12)<3,0,IF(C11-(C14*12)<6,3,IF(C11-(C14*12)<9,6,9))),C11-(C14*12)) |
| =IF(C15<7,C15,IF(C7="␣",3,(C15-6))) |
| =C5/100 |
| =ROUND(POWER(1/1.03,C16/6),6) |
| =ROUND((C17/2)^6-C16)/6,6) |
| =ROUND(IF(C15<7,POWER(1/1.03,(2*C14)),POWER(1/1.03,((2*C14)+1))),6) |
| =ROUND((C17/0.06)*(1-C20),6) |
| =ROUND((C18*((C17/2)+C20+C2)-C19,4) |

Notice Date: 09Jun — 1802

| Mbr | Member Name | Product | Product Name | Delivery Month | Origin | Sold Lots | Nominated Lots | Unallocated Lots |
|---|---|---|---|---|---|---|---|---|
| 230 | ABC Corporation | TU | 2 Yr TNOTE Basket | Jun | C | 15 | 15 | 0 |
| 230 | | TU | 2 Yr TNOTE Basket | Jun | H | 103 | 0 | 103 |
| 230 | | FV | 5 Yr TNOTE Basket | Jun | C | 10 | 10 | 0 |
| 230 | | FV | 5 Yr TNOTE Basket | Jun | H | 3 | 0 | 3 |
| 230 | | TY | 10 Yr TNOTE Basket | Jun | C | 138 | 77 | 61 |
| 230 | | US | 30 Yr TBOND Basket | Jun | H | 37 | 37 | 0 |

View/Amend Nominations | Go — 1806

Notice Day: 09Jun   Member: 230 – ABC Corporation
TY – 10 Yr TNOTE Basket   Jun   Origin: Client Back to Sellers Delivery Positions

| CUSIP | CUSIP Description | Coupon | Issue Date | Maturity Date | Conversion Factor | Nominated Lots |
|---|---|---|---|---|---|---|
| 912828K01 | 2.750 TNOTE 2/15 | 2.750 | 17Feb | 15Feb | 0.7861 | 77 |

Sold Lots: 138    Nominated Lots: 77    Unallocated Lots: 61

| CUSIP | CUSIP Description | | Coupon | | Issue Date | | Maturity Date | | Conversion Factor | | Nominated Lots |
|---|---|---|---|---|---|---|---|---|---|---|---|
| [X] | | [X] | | [X] | | [X] | | [X] | | [X] | |
| 912828KD1 | 2.750 TNOTE 2/15 | | 2.750 | | 17Feb | | 15Feb | | 0.7861 | | 77 |
| 912828LY4 | 3.375 TNOTE 11/15 | | 3.375 | | 16Nov | | 15Nov | | 0.8157 | | 51 |

Notice Day: 09Jun    Member: 230 — ABC Corporation
TY — 10 Yr TNOTE Basket    Jun    Origin: Client Back to Sellers Delivery Positions Sold Lots: 138    Nominated Lots: 77    Unallocated Lots: 61

1812 (Issue Date column)
1814 (Save/Cancel buttons)

Notice Day: 09Jun        Member: 230 – ABC Corporation
TY – 10 Yr TNOTE Basket         Origin: Client Back to Sellers Delivery Positions

| CUSIP | CUSIP Description | Coupon | Issue Date | Maturity Date | Conversion Factor | Nominated Lots |
|---|---|---|---|---|---|---|
| 912828MX01 | 2.750 TNOTE 2/15 | 2.750 | 17Feb | 15Feb | 0.7861 | 77 |
| 912828LY4 | 3.375 TNOTE 11/15 | 3.375 | 16Nov | 15Nov | 0.8157 | 51 |

Sold Lots: 138    Nominated Lots: 128    Unallocated Lots: 10

Save | Cancel

FIG. 18F

| Sender | Senders Reference | Master Reference Number | Broker Reference Number | Trade Date & Time | Settlement Date | Deal Price |
|---|---|---|---|---|---|---|
| 00009798 | 091211B00001 | 091211B00001 | 091211B912B28FY1 | 20091211120508 | 20091214 | 94544.57031 |
| 00009798 | 091211B00002 | 091211B00002 | 091211B912B28FY1 | 20091211120508 | 20091214 | 94544.57031 |
| 00009798 | 091211B00003 | 091211B00003 | 091211B912B28GH7 | 20091211120508 | 20091214 | 94319.58594 |
| 00009798 | 091211B00004 | 091211B00004 | 091211B912B28GH7 | 20091211120508 | 20091214 | 94319.58594 |
| 00009798 | 091211B00005 | 091211B00005 | 091211B912B28GH7 | 20091211120508 | 20091214 | 94319.58594 |
| 00009798 | 091211B00006 | 091211B00006 | 091211B912B28GH7 | 20091211120508 | 20091214 | 94319.58594 |
| 00009798 | 091211B00007 | 091211B00007 | 091211B912B28GH7 | 20091211120508 | 20091214 | 94319.58594 |
| 00009798 | 091211B00008 | 091211B00008 | 091211B912B28GH7 | 20091211120508 | 20091214 | 94319.58594 |
| 00009798 | 091211B00009 | 091211B00009 | 091211B912B28GH7 | 20091211120508 | 20091214 | 94319.58594 |
| 00009798 | 091211B00010 | 091211B00010 | 091211B912B28HA1 | 20091211120508 | 20091214 | 94636.60938 |
| 00009798 | 091211B00011 | 091211B00011 | 091211B912B28HA1 | 20091211120508 | 20091214 | 94636.60938 |
| 00009798 | 091211B00012 | 091211B00012 | 091211B912B28HA1 | 20091211120508 | 20091214 | 94636.60938 |
| 00009798 | 091211B00013 | 091211B00013 | 091211B912B28HA1 | 20091211120508 | 20091214 | 94636.60938 |

FIG. 20B

| Trade Type | Party i.e. Member FICC ID | Party Executing Firm i.e. Member NYPC ID | Quantity | Security Identifier i.e. CUSIP |
|---|---|---|---|---|
| SELL | 00006601 | 830 | 200000 | 912828FY1 |
| BUY | 00006601 | 801 | 200000 | 912828FY1 |
| SELL | 00006601 | 830 | 500000 | 912828GH7 |
| SELL | 00006722 | 844 | 100000 | 912828GH7 |
| SELL | 00006722 | 845 | 500000 | 912828GH7 |
| SELL | 00006500 | 811 | 200000 | 912828GH7 |
| BUY | 00006601 | 800 | 600000 | 912828GH7 |
| BUY | 00006682 | 850 | 1300000 | 912828GH7 |
| BUY | 00006638 | 882 | 300000 | 912828GH7 |
| SELL | 00006500 | 811 | 600000 | 912828HA1 |
| SELL | 00006505 | 823 | 700000 | 912828HA1 |
| BUY | 00006601 | 800 | 900000 | 912828HA1 |
| BUY | 00006698 | 882 | 400000 | 912828HA1 |

FIG. 20C

| Sender | Senders Reference | Master Reference Number | Broker Reference Number | Trade Date & Time | Settlement Date | Deal Price |
|---|---|---|---|---|---|---|
| 00009798 | 100219C0000001 | 100219C0000001 | 100219C912828MM9 | 21100219173349 | 20100222 | 211250 |
| 00009798 | 100219C0000002 | 100219C0000002 | 100219C912828MM9 | 21100219173349 | 20100222 | 211250 |
| 00009798 | 100219C0000003 | 100219C0000003 | 100219C912828MM9 | 21100219173349 | 20100222 | 211250 |
| 00009798 | 100219C0000004 | 100219C0000004 | 100219C912828MM9 | 21100219173349 | 20100222 | 211250 |
| 00009798 | 100219C0000005 | 100219C0000005 | 100219C912828MA5 | 21100219173349 | 20100222 | 104775 |
| 00009798 | 100219C0000006 | 100219C0000006 | 100219C912828MA5 | 21100219173349 | 20100222 | 104775 |
| 00009798 | 100219C0000007 | 100219C0000007 | 100219C912828MA5 | 21100219173349 | 20100222 | 104775 |
| 00009798 | 100219C0000008 | 100219C0000008 | 100219C912828MA5 | 21100219173349 | 20100222 | 104775 |
| 00009798 | 100219C0000009 | 100219C0000009 | 100219C912828MA5 | 21100219173349 | 20100222 | 104775 |

FIG. 20D

| Trade Type | Party i.e. Member FICC ID | Party Executing Firm i.e. Member NYPC ID | Quantity | Security Identifier i.e. CUSIP |
|---|---|---|---|---|
| SELL | 0000601 | 402 | 600000 | 912828MM9 |
| SELL | 0000541 | 401 | 300000 | 912828MM9 |
| BUY | 0000601 | 401 | 100000 | 912828MM9 |
| BUY | 0000508 | 432 | 800000 | 912828MM9 |
| SELL | 0000580 | 411 | 170000 | 912828MA5 |
| SELL | 0000541 | 420 | 600000 | 912828MA5 |
| BUY | 0000541 | 410 | 1000000 | 912828MA5 |
| BUY | 0000601 | 411 | 500000 | 912828MA5 |
| BUY | 0000541 | 401 | 800000 | 912828MA5 |

Date                Time:              Delivery Note No:                                Page:   1

Member: 201         ABC Corporation               Sub A/c: Client    NYPC ID: 830    FICC ID: 6601

Settlement Date:

The securities listed below will be delivered in fulfillment of sold futures contracts or will be received in fulfillment of bought futures contracts for the stated product and delivery period.

| DelNoteNo | Member | MemberName | CUSIP | Description | C/H | NYPC ID | FICC ID | SettDate | B/S | Product | DelMonth | Reference |
|---|---|---|---|---|---|---|---|---|---|---|---|---|
| | 201 | | 912828FY1 | 4.625 TNOTE | C | 830 | 6601 | | B | TY | | 091211B000001 |
| | 201 | | 912828GH7 | 4.625 TNOTE | C | 830 | 6601 | | B | TY | | 091211B000003 |

| Quantity | Coupon | IssueDate | Maturity Date | ConvFactor | DelPrice | DealPrice |
|---|---|---|---|---|---|---|
| 2000000 | 4.625 | | | 0.9245 | 102-085 | 94.5445703 |
| 5000000 | 4.625 | | | 0.9223 | 102-085 | 94.3195859 |

FIG. 21B

Date:                Time:              Delivery Note No:                    Page: 1

Member: 301          ABC Corporation              Sub A/c: House    NYPC ID: 401    FICC ID: 6601

Settlement Date:

The securities listed below will be delivered in fulfilment of sold futures contracts or will be received in fulfilment of bought futures contracts for the stated product and delivery period.

| DelNoteNo | Member | MemberName | C/H | NYPC ID | FICC ID | SettDate | B/S | Product | DelMonth | Reference |
|---|---|---|---|---|---|---|---|---|---|---|
| | 301 | | | 401 | 6601 | | B | CT2 | | 10021900 |
| | 301 | | | 401 | 6601 | | S | CT2 | | 10021900 |
| | 301 | | | 401 | 6601 | | S | CT5 | | 10021900 |

| Quantity | CUSIP | Description | Coupon | IssueDate | Maturity Date | ConvFactor | DelPrice | DelPrice | DealPrice |
|---|---|---|---|---|---|---|---|---|---|
| 30000 | 912828MM | 0.750 TNOTE | 0.75 | | | | 105.625 | 105.625 | 105.625 |
| 10000 | 912828MM | 0.750 TNOTE | 0.75 | | | | 105.625 | 105.625 | 105.625 |
| 80000 | 912828MA | 2.750 TNOTE | 2.75 | | | | 104.775 | 104.775 | 104.775 |

FIG. 21C

| Block/Tag | Notes | | |
|---|---|---|---|
| Message Header | Each Message must contain a message header. All header fields are mandatory fixed format with trailing blanks, where required. | | |
| Password | 12!c | | A password will be assigned by GSCC enabling the sender to submit trades on behalf of specific participant(s). |
| Sender | 8!c | | Participant ID |
| Message Type | 3!n/3!n/4!c | | The first three characters indicate to the recipient the message type (515); the second three positions reflect the version of the message interface (currently always 000). The last four characters indicate the issuer code to be used in the message ("GSCC"). |
| Receiver | 8!c | | GSCCTRRS (GSCC Trade Registration and Reconciliation System) will always be the recipient of the MT515 messages. |
| GENL | This Mandatory block provides general information regarding the message. It appears only once in a trade contract. | | |
| 20C | Sender Message Reference | | |
| | • SEME// - This field contains the sender's message reference number. It is mandatory and must contain a unique number to unambiguously identify each message sent to GSCC. (This is a communications message number, not a trade number.) It is suggested that participants use a number that includes a date followed by either a time stamp or a sequence number. In this way uniqueness can be ensured. | | |
| | Note: While the SWIFT message accommodates both Upper and Lower case alphanumeric and certain symbols, for GSCC purposes, this field must be populated with an upper case alphanumeric value. It cannot contain symbols or hyphens. | | |

FIG. 23A

| | | |
|---|---|---|
| 23G | Function of the Message<br>This mandatory field identifies the function of the message. It will either be a new message (NEWM) for an Instruct, Modify or DK or a cancellation (CANC) of a previous message. Because we will not support the Replace (REPL) message via interactive messaging, participants must submit a cancel (CANC) and a new trade (NEWM) to replace a previously existing trade in the system. Participants may choose to retain their original reference number on the new trade, or use a new reference number, where desired.<br><br>• NEWM - will be used for a new trade or a trade modification or DK message.<br>• CANC - will be used to request the cancellation of a trade. | e.g., :20C::SEME//20010915/001<br><br><br><br><br><br><br><br><br><br>e.g., :23G:NEWM |
| 98C | Preparation Date and Time<br>• PREP// -This field contains the date and time the message sent to GSCC was prepared.<br><br>Note: The "C" format for this (98) tag indicates a date/time format of "YYYYMMDDHHMMSS". | e.g., :98C::PREP//19991215102015 |
| 22F | Trade Transaction Type Indicator (TRTR)<br>This mandatory field specifies whether the trade is cash or repo and if the trade is Bilateral, Locked-in or Demand.<br><br>• TRTR/GSCC/CASH - This qualifier/option should be used on buy/sell trades requiring two - sided (Bilateral) comparison.<br>• TRTR/GSCC/REPO - This qualifier/option should be used on repo trades requiring two-sided comparison.<br>• TRTR/GSCC/TRLK - This qualifier/option should be used on Locked-in cash trades. | |

FIG. 23B

| Block/Tag | | |
|---|---|---|
| LINK | Notes | - TRTR/GSCC/TRLR - This qualifier/option should be used on Locked-in repo trades.<br>- TRTR/GSCC/TRDC - This qualifier/option should be used on Demand cash trades.<br>- TRTR/GSCC/TRDR - This qualifier/option should be used on Demand repo trades. e.g., :22F::TRTR/GSCC/TRLK |
| | Reference | The LINK Block can be repeated for the various reference qualifiers required on a Trade Contract. It is intended to provide the required information to identify the trade. Each reference number must be enclosed within a Start Link Block (:16R:LINK) and End Link Block (:16S:LINK). Each LINK repeating subsequence is within the GENL Block. At least one LINK sequence is required on the MT515 message. |
| 20C | | The Reference Numbers provided by the Participant must contain Upper Case AlphaNumeric characters - and must not contain symbols or hyphens. As indicated above, each reference number must be enclosed in a LINK Start and End block. MT515 DK messages (submitted against contraparty trades) will not contain reference numbers in this sequence, but require the MAST qualifier to be included on the record.<br>- MAST// - Master Reference Number - This qualifier contains the Participant's Reference Number for the trade (External Reference Number). This field must be unique for an Instruct, and should be populated with the primary reference number that the participant will use to track trades on the GSCC system. It is mandatory for inbound MT515 INSTRUCT and DK messages. For DK's this field should be populated with the value "NONREF". For Cancels and Modifies, the participant can elect to send either the External Reference Number (MAST) or the GSCC Reference Number (LIST). |

FIG. 23C

- PREV// - Previous Reference Number - This qualifier is used on either Trade Modify or Trade Cancel MT515 records. On Modify records, it is used to modify the reference number and should contain the Participant's Previous External Reference Number. For MT515 Cancel records you are submitting (23G:CANC and 22F::PROC/GSCC/CANC in the Confirmation Details (CONFDET) block), this field should be populated with the value "NONREF". This field will not be used on Instruct or DK records.

- LIST// - GSCC Reference Number — This qualifier contains GSCC's reference number (TID) for the trade. (This can be used on Modify and Cancel records - and where supplied, will be used by GSCC to identify the trade, rather than the reference provided in the Master Reference Field, "MAST"). For Cancels and Modifies, the participant can elect to send either the External Reference Number (MAST) or the GSCC Reference Number (LIST). This field will not be used on Instruct or DK records.

- BASK// - Broker Reference Number - This qualifier specifies the broker reference, which is required for broker submitted trades. This field will not be used on DK records.

Note: While the SWIFT message accommodates both Upper and Lower case alphanumeric and certain symbols, for GSCC purposes, this field must be populated with an upper case alphanumeric value. It cannot contain symbols or hyphens, except where the reference number is assigned by GSCC.

*e.g., :20C::MAST//PARTREF1*

| CONFDET | The Mandatory CONFDET (Confirmation Details) block appears only once in a Trade Contract. It contains Trade and Confirming Party Details. |
|---|---|
| 98C | Trade Date |

FIG. 23D

| Block/Tag | | |
|---|---|---|
| 98A | Settlement Date | • TRAD/ - This field is used on all messages to specify Trade Date and Trade Time. (The "C" format for this (98) tag indicates a date/time format of "YYYYMMDDHHMMSS".)<br><br>*e.g., :98C::TRAD//19991215095510*<br><br>• SETT// - This field is used on all messages to specify settlement date for a cash trade, or the "Start-leg" settlement date, in the case of a repo. (The "A" format for this tag (98) indicates a date format of "YYYYMMDD".)<br><br>*e.g., :98A::SETT//19991216* |
| 90A | Deal Price | This field is reflected on all messages. It contains the Execution Price Type and Price. Only one Tag 90A is allowed per trade contract. The price is in SWIFT Standard format, which is left justified, with commas removed, and a comma used instead of a decimal. The following price types may be specified:<br><br>• DEAL/PRCT/ - This qualifier/option is used for dollar prices and repo rates. (Where the trade is a repo, however, the price portion of the field must be populated with "0,".) Repo rates can be found in the REPO Block.<br><br>• DEAL/YIEL/ - This qualifier/option is used for Yield priced trades.<br><br>• DEAL/DISC/ - This qualifier/option is used for Discount Rates.<br><br>Note: While the SWIFT format accommodates 15d characters (with decimal), the GSCC system supports a field size of 14d. The field should be populated with a value no larger than 14d.<br><br>*e.g., :90A::DEAL/PRCT/99,625* |
| | Notes | |
| 19A | Settlement Amount | |

FIG. 23E

| | |
|---|---|
| | • SETT// - This field is used to specify the Settlement Amount for buy/sell trades and the "Start-leg" settlement amount for Repo trades.<br><br>The amount is in SWIFT Standard format, which is left justified, with commas removed, and a comma used instead of a decimal. The amount is always preceded by a 3-character ISO currency code ("USD" for GSCC trades).<br><br>For repo trades, this field must be populated with the Start-leg settlement amount.<br><br>Note: The SWIFT format can accommodate a value of 15d in this field. This is a change from the 18 character field on the GSCC proprietary layouts.<br><br>e.g., :19A::SETT//USD1000500,5 |
| 22H | Trade Type Indicator (BUSE)<br>This field is required on all messages and has two allowable values for this BUSE qualifier:<br><br>• BUSE/BUY - This qualifier/option indicates that the trade submitted is either a buy, in the case of a cash trade, or a reverse, in the case of a repo trade.<br><br>• BUSE/SELL - This qualifier/option indicates that the trade submitted is either a sell, in the case of a cash trade, or a repo, in the case of a repo trade.<br><br>Note: The inclusion of a REPO block and the use of a Repo qualifier in Tag 22F (TRTR/GSCC/REPO, TRTR/GSCC/TPLR or TRTR/GSCC/TRDR) in the GENL block will indicate that the trade is a repo trade, rather than a cash trade.<br><br>e.g., :22H::BUSE/BUY/ |
| 22F | Processing Indicator (PROC)<br>This processing indicator enables the participant to indicate to GSCC the type of record/ command being submitted on this MT515.<br>The allowable values for this field are: |

FIG. 23F

| | |
|---|---|
| | • PROC/GSCC/INST - This qualifier/option indicates that the MT515 is an INSTRUCT record.<br>• PROC/GSCC/CANC - This qualifier/option indicates that the MT515 is a CANCEL record.<br>• PROC/GSCC/MDFC - This qualifier/option indicates that the MT515 is a MODIFY record.<br>• PROC/GSCC/TDDK - This qualifier/option indicates that the MT515 is a DK record.<br><br>*e.g., :22F::PROC/GSCC/INST* |
| 22H | Payment Indicator (PAYM)<br>This Payment indicator field is mandatory for the MT515 message. All trades submitted to GSCC must provide the following qualifier:<br><br>• PAYM/APMT - This qualifier/option indicates that the trade will settle against payment.<br><br>*e.g., :22H::PAYM//APMT* |
| 36B | Quantity of Securities (CONF)[1]<br>• CONF//FAMT/ - This field is mandatory, and for the purposes of GSCC, must use the option 'FAMT' - indicating face amount (par). The quantity of the financial instrument is in SWIFT Standard Format, which is left justified, with commas removed, and a comma used instead of a decimal.<br><br>*e.g., :36B::CONF//FAMT//1000000,*<br><br>Note: The SWIFT format can accommodate a value of 15d in this field. This is a change from the 18-character field on the GSCC proprietary layouts. |
| 35B | Identification of Security[1] |

FIG. 23G

| | The security/collateral involved is identified in the US by specifying the ISO country identifier ('/US/'), followed by the CUSIP number.<br><br>Note: While the SWIFT layout accommodates a format of 4 * 35x, a 9!c (alpha numeric) value should populate the field for the CUSIP.<br><br>*e.g., :35B:/US/9128275N8* |
|---|---|
| 70E | Trade Instruction Processing Narrative (TPRO)[1]<br><br>• This field is intended to reflect transaction related information not supported by the MT515 layout. It will be used on all MT515 DK messages to reflect the reason for the DK.<br><br>*e.g., :70E::TPRO/GSCC/DKRSE008* |

[1] Tags 36B, 35B and 70E::TPRO// in the CONFDET block must be placed on the GSCC MT515 message following the confirming party subsequences.

| Block/Tag | Notes |
|---|---|
| CONFPRTY | • TPRO/GSCC – denotes narrative trade instruction processing information related to GSCC.<br>• /DKRS – Should be used to specify the reason for the DK. The four character code can be found in Appendix E of this document. |
| CONFPRTY | The Mandatory Confirming Party Block must be repeated for each party to a trade. Each party specified must be enclosed within a Start Party block (:16R:CONFPRTY) and End Party block (:16S:CONFPRTY). Please note that on every trade there should be at least two (one buyer and one seller) repeating Confirming Party sequences, and one of these parties will also be the submitter of the MT515 record. It should be noted that certain fields in this block must follow the Confirming Party subsequences (36B, 35B and 70E). |
| 95R | Party |

FIG. 23H

| | |
|---|---|
| 20C | • BUYR/GSCC/PART – specifies the Buying, or Reversing, Party. (the "GSCC" issuer code allows the specification to include the GSCC participant or contra ID, depending on whom is acting as buyer or seller).<br>• SELL/GSCC/PART – specifies the Selling, or Repoing, Party.<br>*e.g., :95R::BUYR/GSCC/PART9501*<br>Note: While the SWIFT layout supports a format of 35x for this field, the participant must populate the field with the appropriate qualifier and 4 character Participant ID, for buyer or seller.<br><br>Processing Reference<br>• PROC// – This field must be used on DK messages in the appropriate buyer or seller subsequence to indicate the Contraparty's External Reference Number of the trade being DK'ed.<br>*e.g., :20C::PROC//CONTRAXREF1* |
| 70E | Narrative (DECL)<br>This field will be used in each subsequence to identify the executing firm, where applicable.<br>• DECL/GSCC – denotes narrative information specific to GSCC.<br>• /CORR – should be used in the BUYR and/or SELL confirming party sequence(s) to indicate the buyer and/or seller's executing (correspondent) firm(s).<br>Note: While this field can support a narrative 10 * 35x, the participant, at this time, should only provide the above qualifiers and the GSCC assigned executing firm code in this field. In the future, this narrative field can be used to support additional information related to the buyer or seller, where required. |

FIG. 23I

| | |
|---|---|
| 70C | Participant Contact Narrative (PACO)<br>This field will be used in the appropriate buyer or seller confirming party sequence on MT515 Instructs, Cancels or Modifies submitted to provide information regarding the individual/desk at the contraparty that executed the trade. It should be noted that the trader ID field is for informational purposes only, and will be captured for the purposes of passing the information to the contraparty on MT518 Request for Comparison messages. This field will not be compared or validated, nor will it be a basis for rejection or DK capabilities.<br><br>• PACO/GSCC – denotes participant contact narrative information specific to GSCC.<br>• /TDID – should be used in the appropriate BUYR or SELL confirming party sequence to indicate the following:<br>   • on MT515 Instruct, Cancel or Modify Records, this qualifier should be used by the submitter to indicate the buyer or seller contraparty ID of the trader that executed the trade.<br>   • on MT515 DK messages, this qualifier should be used to reflect the buying or selling submitter's ID of the trader that executed the trade (as originally submitted by the contraparty).<br><br>*e.g., :70E::DECL//GSCC/CORRATGN*<br><br>*e.g., :70C::PACO//GSCC/TDIDFRED1* |
| SETDET | This Optional block, and the AMT subsequence, are necessary only when commission is specified on the trade. Currently, GSCC accepts commission on WI trades for coupon bearing instruments submitted prior to auction, or on Repo trades. |
| 22F | Settlement Indicator (SETR)<br>This field is SWIFT Mandatory for the Block.<br><br>• SETR/RPTO – Indicates that this trade confirmation is for reporting purposes only. |

FIG. 23J

| Block/Tag | Notes |
|---|---|
| | Note: This field is not used by GSCC although it is SWIFT mandatory in order to support the inclusion of the Commission Amount field. |
| | Notes |
| 17B | Standing Instructions Override<br>This field is SWIFT Mandatory for the Block.<br>• STAN/N - This indicates that standing instructions should not be overridden.<br>*e.g., :17B::STAN//N*<br>Note: This field is not used by GSCC although it is SWIFT mandatory in order to support the inclusion of the Commission Amount field. |
| AMT | As indicated above, this Optional sequence is only necessary to support the inclusion of broker commission on a WI trade or a commission amount on Repo Trades. This block should always be included within the Settlement Details (SETDET) block. |
| 19A | Commission Amount<br>• LOCO/USD - This field specifies the broker's commission amount on WI trades or Repo trades. The commission amount field is in SWIFT Standard Format, which is left justified, with commas removed, and a comma used in lieu of a decimal. The amount must be preceded by a 3-character ISO currency code.<br>Note: The value in this field is an AMOUNT - this differs from the rate field format on the GSCC proprietary layouts and within the GSCC system. The Commission Amount per trade should be included in this field – e.g., where the commission is $40 per million, for a two million dollar trade the field should be displayed "LOCO/USD80,". |

FIG. 23K

| | | |
|---|---|---|
| | | Note: The commission amount submitted for a Repo trade should not be included in the net money. At this point in time, GSCC will not process the value in this field for Repo trades.<br><br>*e.g., :19A::LOCO//USD40,* |
| REPO | | The Optional Repo Block appears only on trade contracts involving a repurchase/reverse repurchase trade. It appears only once in the contract. Its inclusion indicates that the trade is either a Repo or Reverse trade, based on the BUSE indicator in the CONFDET Block (BUY1 = Reverse, SELL = Repo). This block must be included on a Repo MT515 record. |
| | Repurchase Date | |
| 98A | | • REPU// – This Mandatory field specifies the Repo Close-leg Settlement Date in SWIFT format (YYYYMMDD).<br><br>*e.g., :98A::REPU//19991217* |
| | Secondary Reference | |
| 20C | | • SECO// – This field is optional, but if used, should include the qualifier "SECO" to support an additional reference number for the participant's REPO trade. |
| | | Note: Please note that while the SWIFT message accommodates both Upper and Lower case alphanumeric and certain symbols, for GSCC purposes, this field must be populated with an upper case alphanumeric value. It cannot contain symbols or hyphens.<br><br>*e.g., :20C::SECO/REPOREF2* |
| | Repo Rate | |
| 92A | | • REPO// – The Mandatory REPO Rate field is in SWIFT standard format - left justified with a comma inserted in lieu of a decimal.<br><br>Note: While the SWIFT format accommodates 15d characters (with decimal), the GSCC system supports a field size of 14d. The participant should populate the field with a value no larger than 14d. |

FIG. 23L

| | | |
|---|---|---|
| 19A | Repurchase Amount<br><br>• REPA/ - The Close-leg settlement amount is always prefixed by the ISO currency code (USD) and is in SWIFT standard format – left-justified with commas removed, and a comma used in lieu of a decimal.<br><br>Note: The SWIFT format can accommodate a value of 15d in this field. This is a change from the 18-character field on the GSCC proprietary layouts. | *e.g., :92A::REPO/3,75*<br><br>*e.g., :19A::REPA//USD100100,* |
| 70C | Repurchase Narrative<br><br>• REPO/GSCC - This field, which will be mandatory, contains the other valid specifications for a REPO trade. The following information can be specified, and combined in any order, each element separated by a '/'. | |

| Block/Tag | | | |
|---|---|---|---|
| Notes | | | |
| | Qualifier | Format | Description |
| | /SUBN | 2c | Number of Substitutions, up to 99 or 'U' for unlimited |
| | /SUBC | 20x | Generic Collateral CUSIP (to identify collateral eligible for substitution). The 9-character CUSIP should always be preceded with '/US/'. |
| | /SUBT | 1!c | Type of Substitution Allowed 'P' = Par Fill, 'M' = Money Fill |

FIG. 23M

| /SUBV | 5d | Variance for Par Fill Repo Substitutions, as a percentage |
|---|---|---|
| /SUBF | 21c | Frequency of substitutions (i.e. 1M = once per month) | e.g., :70C::REPO/GSCC/SUBN1/SUBC/US/371488AP2
/SUBTP/SUBV3/SUBF1D

FIG. 23N

APPARATUSES, METHODS AND SYSTEMS FOR A LOCKED-IN TRADE FACILITATION ENGINE

RELATED APPLICATIONS

Applicant hereby claims priority under 35 USC § 119 for U.S. provisional patent application Ser. No. 61/447,566 filed Feb. 28, 2011, entitled "Apparatuses, Methods and Systems For a Locked-In Trade Facilitation Engine".

The entire contents of the aforementioned application are herein expressly incorporated by reference.

FIELD

The present invention is directed generally to apparatuses, methods, and systems for transaction management, and, more particularly, to APPARATUSES, METHODS AND SYSTEMS FOR A LOCKED-IN TRADE FACILITATION ENGINE (hereinafter, "LITF ENGINE").

BACKGROUND

Financial instruments are frequently traded in securities markets. Some securities markets allow for electronic trading of financial instruments, such as stocks, bonds, etc. and may be governed by a variety of regulatory requirements.

BRIEF DESCRIPTION OF THE DRAWINGS

The accompanying drawings illustrate various non-limiting, exemplar, inventive aspects in accordance with the present disclosure:

FIGS. 16B-16E provide exemplary spreadsheets illustrating aspects of a Conversion Factor Calculation Component for some embodiments of the LITF ENGINE;

FIGS. 17B-17C provide screenshots of example user interfaces for an exemplary Settlement Prices Maintenance Component for some embodiments of the LITF ENGINE;

Figure 18C:
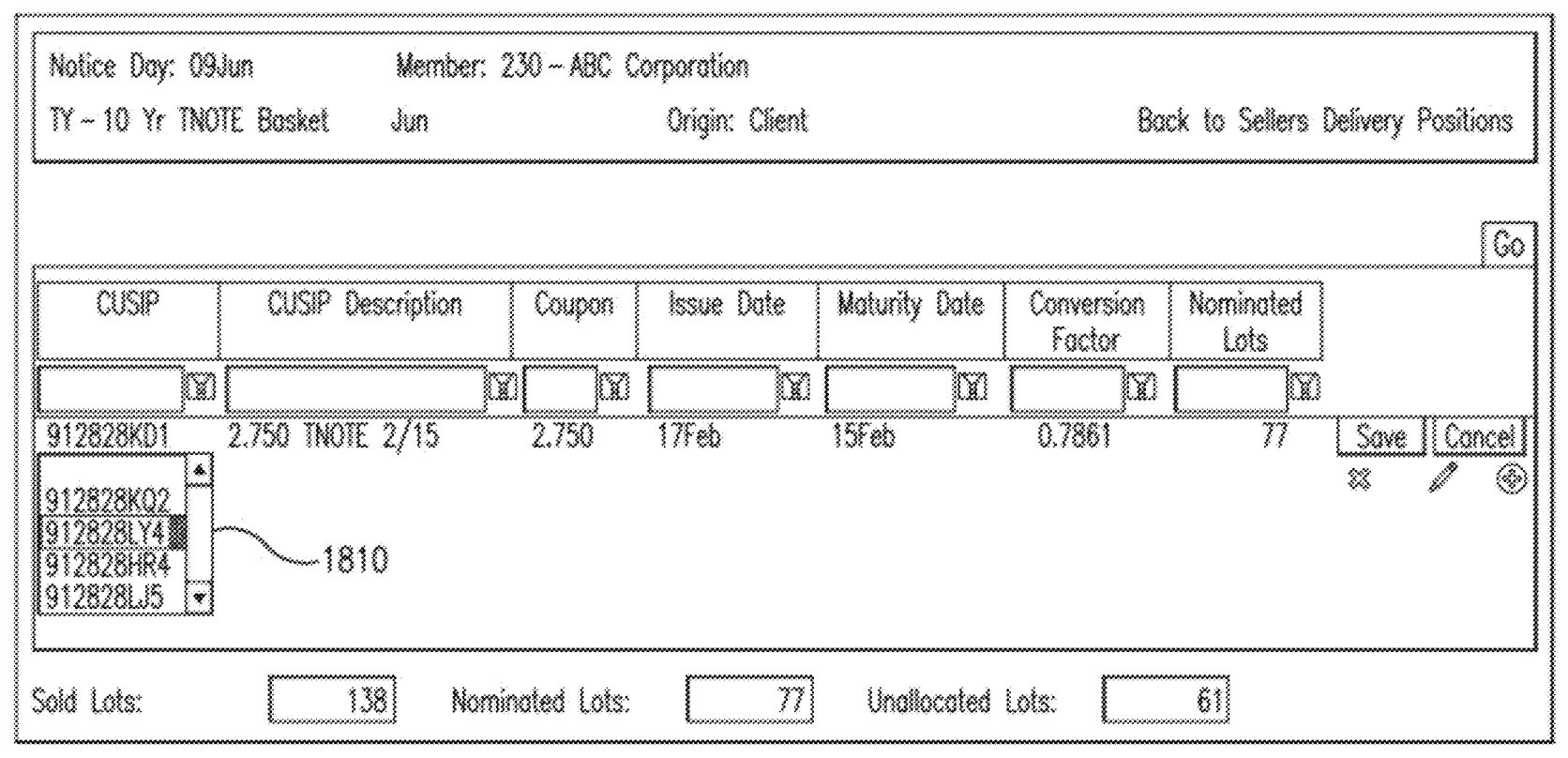

FIGS. 18A-18F provide screenshots of example user interfaces for an exemplary Sellers Issue Nomination Component for some embodiments of the LITF ENGINE;

FIGS. 20B-20E provide examples reports illustrating aspects of an exemplary Cash Trades File Component for some embodiments of the LITF ENGINE;

FIG. 21A provides screenshots of example user interfaces for a Members Delivery Notification Component for some embodiments of the LITF ENGINE;

FIGS. 21B-21C provide exemplary reports illustrating aspects of a Members Delivery Notification Component for some embodiments of the LITF ENGINE;

FIGS. 23A-23N provide tables illustrating an exemplary embodiment of the Cash Trades File in some embodiments of the LITF ENGINE.

Figure 1:
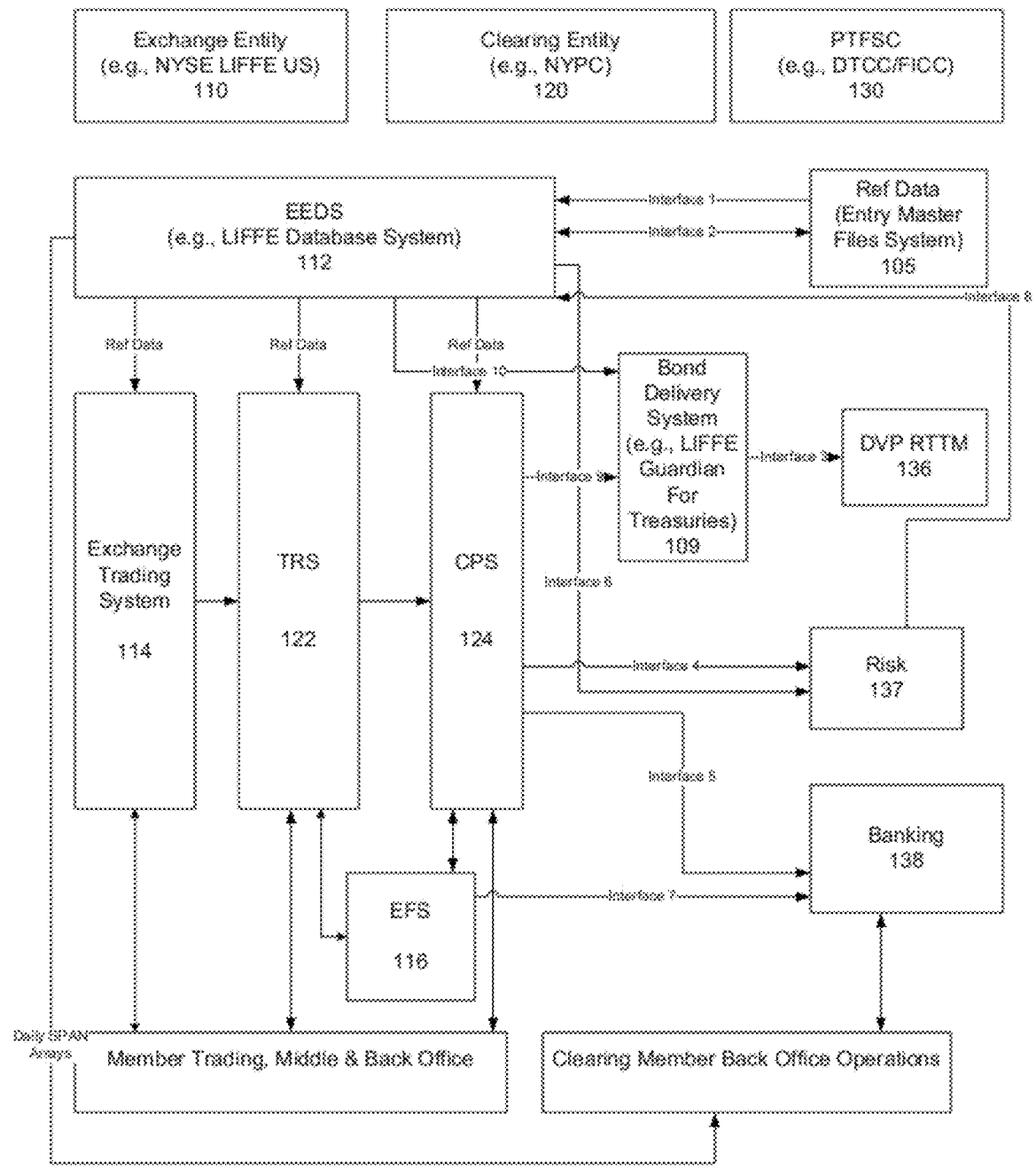
FIG. 1 provides a data flow diagram illustrating various aspects of interactions for embodiments of the LITF ENGINE.

The leading number of each reference number within the drawings indicates the figure in which that reference number is introduced and/or detailed. As such, a detailed discussion of reference number 110 would be found and/or introduced in FIG. 1. Reference number 202 is introduced in FIG. 2, etc.

DETAILED DESCRIPTION

LITF ENGINE Overview

The APPARATUSES, METHODS AND SYSTEMS FOR A LOCKED-IN TRADE FACILITATION ENGINE (hereinafter "LITF ENGINE") provides and facilitates delivery of open futures positions, upon or before expiry, into financial instruments, such as U.S. dollar-denominated fixed income market positions. In one embodiment, the LITF ENGINE provides and facilitates management, analysis and/or communications for entities involved in resolving open interests in futures products. In one embodiment, the LITF ENGINE facilitates clearing, settlement, and delivery of underlying interests of U.S. dollar-denominated interest rate and fixed income futures contracts such as U.S. Treasury futures. In some embodiments, the LITF ENGINE provides for the automated delivery of the underlying interests of U.S. Treasury futures through a capital-efficient margining system, providing the operational efficiencies of physical settlement utilizing a semi-mutualized ownership structure by automatically submitted as locked-in trades in the underlying U.S. Treasury securities eligible for settlement on a delivery vs. payment (DVP) basis on the next business day. In one embodiment, the LITF ENGINE facilitates cash-settled transactions produced upon expiration of U.S. dollar-denominated interest rate and fixed income futures contracts such as U.S. Treasury futures. In one embodiment, the LITF ENGINE provides a delivery process for U.S. Treasury futures, whereby contracts that remain open after the close of trading on the last trading day of the delivery month may be automatically submitted as locked-in trades in the underlying U.S. Treasury securities eligible for settlement on a delivery vs. payment (DVP) basis on the next business day.

The LITF ENGINE enables, facilitates, assists, and/or provides, ("provides") clearing, settlement and delivery and/or provides management of financial instruments, such as U.S. dollar-denominated interest rate and fixed income futures contracts such as U.S. Treasury futures ("Financial Products") for entities involved in trading financial instruments and/or related transactions. In some embodiments, the LITF ENGINE provides for the automated resolution of open interests in U.S. Treasuries margined through a capital-efficient margining system, providing the operational efficiencies of physical settlement utilizing a semi-mutualized ownership structure. In one embodiment, the LITF ENGINE facilitates cash trade transactions produced upon expiration of a futures product. In one embodiment, the LITF ENGINE may facilitate one or more aspects of locked in trading processes, such as, for example, the interaction between a clearing processing system and a bond delivery system.

In one embodiment, the LITF ENGINE may facilitate delivery by member firms of U.S. Treasuries against expiring U.S. Treasury futures contracts without risking the onerous penalties associated with failing to deliver. In one embodiment, the LITF ENGINE may eliminate the need to "box" securities prior to physical delivery, reducing financing costs and increasing capital efficiency. In one embodiment, the LITF ENGINE may facilitate processing of final settlement trades on the various futures' bookkeeping systems. In one embodiment the types of U.S. Treasuries products available include U.S. Treasury Bills, U.S. Treasury Notes, U.S. Treasury Bonds, Inflation-Protected Securities (TIPS), U.S. Treasury Zero Coupon Bonds, Separate Trading of Registered Interest and Principal of Securities (STRIPS), (hereinafter "Treasuries").

Depending on the embodiment, the LITF ENGINE may be implemented by one or more intermediate parties to a financial products transaction, such as an exchange entity or clearing entity. In some embodiments, the LITF ENGINE may be implemented by being connected to a trading platform environment. Alternatively, or additionally, the LITF ENGINE may be implemented by a third-party service provider as part of a package of services and/or products offered to one or more parties involved in financial products transactions. In one embodiment, the LITF ENGINE may offer innovative risk management, portfolio margining and clearance and settlement efficiencies to member firms. In one embodiment, delivery of Basket Treasuries may be made by the seller on any business day of the contract delivery month (and the first three days of the following month for 2-year and 5-year treasury futures).

In some embodiments, the LITF ENGINE may clear, settle, provide position management for financial products. In one such implementation, the LITF ENGINE may communicate, interface, and/or otherwise interact with member firms that trade on an exchange trading system, for example, via interaction with a clearing processing system of a clearing entity, such as New York Portfolio Clearing ("NYPC") and/or like entity or entities. In one embodiment, the LITF ENGINE provides settlement and/or banking services, for example, via interaction with a post-trade financial services company ("PTFSC"), such as the Depository Trust & Clearing Corporation ("DTCC") or a subsidiary thereof (e.g., Fixed Income Clearing Corporation ("FICC")), and/or like entity or entities.

According to one embodiment, NYPC may clear U.S. interest rate derivatives and cross-margin such positions against fixed income cash instruments (including repurchase and reverse repurchase agreements) cleared by PTFSC. In another embodiment, the LITF ENGINE may enable and facilitate netting of final delivery cash positions submitted via the NYPC locked-in trade delivery process along with a PTFSC member's daily cash trading activity.

In one embodiment, an exchange may determine the basket of Treasury notes/bonds that are eligible for delivery under the terms of a contract. In one embodiment, delivery of Basket Treasuries may be made by the seller on any business day of the contract delivery month (and the first three days of the following month for 2-year and 5-year treasury futures). In one embodiment, delivery may be initiated by the short position submitting an intention to deliver two business days prior to the delivery day ("intent day"). In one embodiment, delivery may be via the submission of a trade by Clearing Entity directly into the PTFSC matching system. Short positions will be allocated to long positions and converted to trades. In one embodiment, the price of the trade submitted to the PTFSC systems may be based on the settlement price calculated on the intent day and a conversion factor based on the price of the delivered treasury to yield 6 percent.

In some embodiments, the LITF ENGINE delivery and settlement and/or provides management of U.S. dollar-denominated interest rate and fixed income futures contracts. In one such implementation, as illustrated by FIG. 1, the LITF ENGINE may communicate, interface, and/or otherwise interact with clearing systems, for example, via interaction with Clearing Processing System ("CPS") 124 of a Clearing Entity 120, such as New York Portfolio Clearing (NYPC) and/or like entity or entities. In one embodiment, the LITF ENGINE interacts with risk management, settlement and/or banking services, for example, via interaction with a Post-Trade Financial Services Company ("PTFSC") 130, such as the Depository Trust & Clearing Corporation (DTCC) or a subsidiary thereof (e.g., Fixed Income Clearing Corporation (FICC)), and/or like entity or entities. In such an embodiment, PTFSC may have an Entry Master Files System 105 which has Interface 2 with EEDS 112 (e.g., LIFFE Database System).

In one embodiment of the LITF ENGINE, contract transactions or trades for an Exchange Entity 110 (e.g., NYSE Liffe U.S.) cleared through a Clearing Entity 120 may be sent to Transaction Registration System ("TRS") 122/CPS 124 via a trade registration gateway. In one embodiment, the LITF ENGINE may facilitate one or more aspects of locked-in trading processes, such as, for example, the interaction between a CPS 124 and a Bond Delivery System ("BDS")

such as LIFFE Guardian For Treasuries 109 ("Guardian"). An Interface 5 may allow for communication between CPS 124 and Banking 138 and Interface 7 may be for communicating between Exchange Fees System ("EFS") 116 and Banking 138. In some embodiments Interface 4 is used as a way to input values for risk management systems 137 that may be part of the PTFSC 130.

In some embodiments, the LITF ENGINE provides an Interface 3 that may allow for communication between BDS 109 and DVP Real-Time Trade Matching ("RTTM") 136. In such an embodiment, Interface 3 may carry all cash trades from an Exchange Entity (e.g., NYSE Liffe US) no to a PTFSC (e.g., DTCC) 130 that result from the expiry of futures in an Exchange Entity. These cash trades may be delivered future positions and may be settled in the DVP RTTM 136 which, in certain embodiments, is the PTFSC's Real Time Trade Matching system. In such an embodiment, cash trades may be submitted by each Clearing House under a single PTFSC ID but also with the relevant Clearing Entity ID for the Buyer and Seller Executing Firm. The Clearing Entity ID may be traced to the Exchange Entity Exchange Member Mnemonic.

In such an embodiment, a single security type underlying a future may deliver on day 1 whereas baskets of diverse security types may deliver on N number of days in the delivery month. In this embodiment of the LITF ENGINE, the PTFSC 130 (e.g., DTCC systems) may provide a confirmation to be sent for each cash trade to the relevant participant member by the relevant PTFSC system. In this embodiment of the LITF ENGINE, the PTFSC 130 (e.g., DTCC systems) may provide each cash trade to be copied to PTFSC Risk 137 by the recipient PTFSC 130 (e.g., DTCC systems). In some embodiments of the LITF ENGINE, an Exchange Entity's or other entity's product and participant database system ("EEDS") 112 may provide the master product and participant data required by the LITF ENGINE and/or Exchange Entity systems.

In some embodiments, the LITF ENGINE and/or LITF ENGINE components provide enhanced security for transactions and inter-entity communications, such as providing improved communication and transaction security between an exchange entity, a clearing entity, and/or one or more post-trade financial services companies. For example, via the cash trade file generated by the LITF ENGINE.

Figure 2:
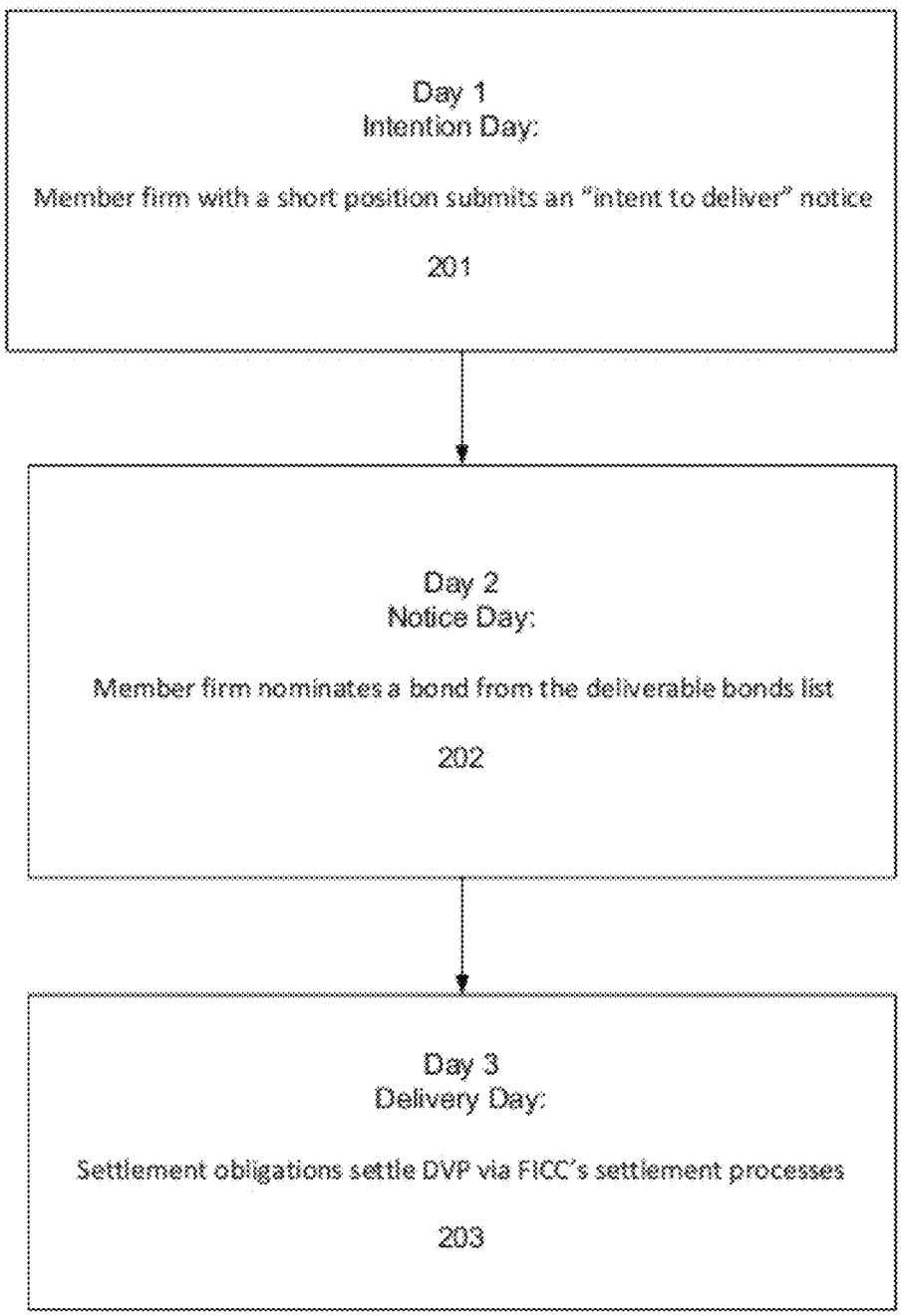
FIG. 2 is of a logic flow diagram illustrating elements of some embodiments of the LITF ENGINE.

As illustrated by FIG. 2, in some embodiments of the LITF ENGINE provides services where on Day 1, Intention Day, 201 a Member firm with a short position may notify Clearing Entity that the Member firm intends to make delivery on an expiring contract and submits an "intent to deliver" notice into Clearing Entity's Clearing Processing System by 9:00 P.M. (all times Eastern Time). In this embodiment, Clearing Entity's Clearing Processing System may produce a "delivered positions" file detailing all short positions for which "intent to deliver" notices have been submitted, as well as all long positions that are to be assigned for delivery. A file containing details of all Clearing Entity members may be generated (e.g., via a RTTM of FICC), and this file may be used to conduct a periodic (e.g., daily) reconciliation against the Clearing Entity and PTFSC IDs held in a database. In one embodiment, the overview file may be generated, and updated according to and/or based on received/entered information. At the end of a specified period (e.g., daily), according to reconciliation information, the overview file is reconciled. For example, if there is missing information (e.g., a Clearing Entity or FICC ID exists in a FICC database but is not contained in the file) or if information is indicated as restricted or otherwise tagged, one or more exception reports may be generated, and sent to one or more specified recipients (e.g., Clearing Entity operations).

In some embodiments of the LITF ENGINE, Clearing Entity members may be identified with specified indicia in Exchange Trading System(s) and/or CPS (e.g., using a three character member mnemonic). In some implementations, trade processing and clearing conducted in CPS and/or Commodity Management System (system for the allocation of product (e.g., Treasuries) deliveries and/or creation of cash trades for booking in a real time trade management system) may reference Clearing Entity members using this ID, as may reports produced by such systems.

Depending on the embodiment, Clearing Entity members may also require a Clearing Entity ID for the purposes of margining, fund settlement and/or reporting. In some implementations, a Clearing Entity ID may be required for each margining account held by the Clearing Entity member: one ID for House business and one ID for Customer business. In some embodiments, a House account may be an integrated trading and/or clearing account for proprietary trading, which, in some implementations, may have restrictions regarding registrations/re-registrations and/or may have default netting. Customer accounts may, in some embodiments, refer to accounts for members' customers, and in some implementations may require position administration.

In some embodiments of the LITF ENGINE, for the purpose of delivery, any member above may be required to have a defined relationship with a PTFSC member who will be responsible for delivery (e.g., responsible for delivery in the FICC delivery versus payment ("DVP") system on behalf of the Clearing Entity member). In one such an embodiment, cash trades created as part of the delivery process may be submitted under the participant ID of the PTFSC member, and the Executing Member field may be set to the Clearing Entity ID.

As illustrated by FIG. 2, the LITF ENGINE provides a three day delivery process. In one embodiment, a CPS may automatically record details of the volume purchased by each member on each trading date (the "Bought Position Date") throughout the life of a contract. In one embodiment, if a member's long position reduces to zero over night their Bought Position history will be automatically erased. In another embodiment, prior to first notice day, any position that is netted during clearing (e.g. a member's House account or due to a member's settlement instruction) may not automatically update the Bought Position Date (BPD volume). The member may need to manually revise down any long volume that has been closed out against the correct date. In one embodiment, on the first notice day (and going forward), the system may automatically net down the BPD data to match the current long position held in CPS. This will take place during the end of day processes. The netting process will net down the oldest long trade dates first.

As illustrated by FIG. 2, in one embodiment, any short position wishing to initiate delivery for T+2 must submit an intent to deliver into CPS by 20:00 CT on day 1 (T) or Intention day ("Intent Day") 201 of the delivery cycle. In one embodiment, it may be a requirement that the deadline for submitting an intent is configurable and that clearing members are able to enter the intent at any point during the trading day up until the intent deadline.

Figure 9:
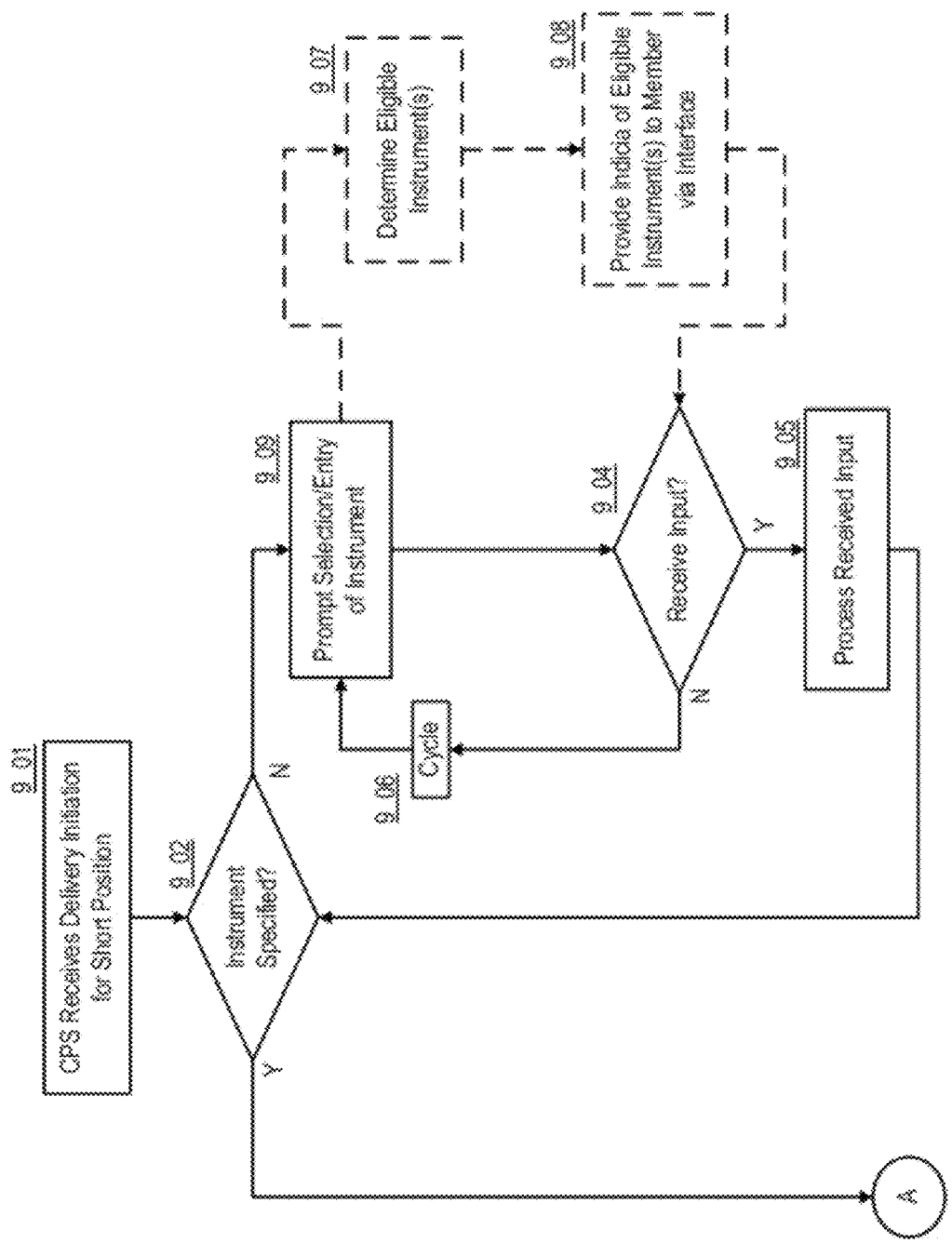
FIG. 9 is of a logic flow diagram illustrating aspects of a Delivery Initiation Component for some embodiments of the LITF ENGINE.

In some embodiments, members having a short position may be provided with the ability to nominate the Treasury Note, Treasury Bond, and/or the like that they are delivering at the time that the intent to deliver is submitted. Advancing to FIG. 9 which illustrates a clearing system that may receive a delivery initiation for a short position 901 and determine if the instrument is specified 902. If the instrument is not specified, the member may be prompted to enter or select the instrument 909. Subsequent member input is received 904 and processed 905 to confirm that instrument is specified. In one embodiment, a user interface may be provided (e.g., a drop-down menu), allowing the short member to select the relevant treasury for each delivery note. In one implementation, eligible instruments are determined 907 (e.g., according to the terms of the contract and/or other specifications), and indicia of the eligible instruments are provided on the interface 908. In such an implementation, the menu/interface may be restricted to the Treasuries that have been determined (e.g., by the Exchange Entity) to be deliverable Notes/Bonds under the terms of the contract. Depending on the implementation, one or more of the following details may be provided to the short member via the interface for each deliverable treasury: CUSIP, Coupon Rate, Maturity Date, etc. In some embodiments, this may be an optional process for the short member. In some embodiments, the deadline for nominating the deliverable Treasuries will be on the Notice day (as discussed below).

In one embodiment, members who wish to deliver different Treasury Notes/Bond on a single delivery day may be required to enter a separate Intent to deliver for each deliverable Treasuries in TRS/CPS. The Bond Delivery System (e.g., LIFFE Guardian For Treasuries) may provide the ability to split an Intent to allow for multiple Treasuries deliveries.

In one embodiment, exchange members with long positions may be permitted to adjust their Bought Position Date ("BPD") data. The volume against each date can be reduced down provided the total BPD volume is greater than or equal to their account volume. This facility may be available until 20:00 CT each day.

In one embodiment, the positions data for deliveries may be based on close of TRS/CPS on intent day (T). Although the trading day for T+1 starts prior to the deadline for intents and long position maintenance any changes to positions based on trading on trade day T+1 may not be reflected in the positions used for delivery. After 20:00 CT, the clearing systems will calculate the pool of long positions that will take delivery of those short positions based on an Oldest Long/"Vintage" assignment:

The volume assigned to a Bought Position Date for each exchange member may be calculated as follows:
 i. The total volume for each long position is sorted by BPD record with the latest date first.
 ii. The Bought Positions Dates are then selected in turn until the total long position for that member account has been satisfied.

The short positions that have submitted intents to deliver may be aggregated and allocated to the long positions on a "position date pro-rata" basis:
 i. Long positions will be grouped by BPD, and sorted eldest date first. The long positions within each BPD are added to the long position pool in turn until the total long position is sufficient to satisfy the total short positions.
 ii. If the total volume of a BPD is greater than required (i.e. the remaining short position is not sufficient to satisfy the whole volume within a BPD), the members' positions within the BPD are selected using a pro-rata algorithm.

A "delivered positions" file may be produced detailing all short positions that have submitted intents and the pool of long positions that are to be assigned delivery. This file may contain positions at a clearing member level segregated by margin account as well as details of any nominated deliverable Treasuries. This may be passed to the Bond Delivery System, such as the system associated with LIFFE Guardian For Treasuries, and/or other appropriate Delivery Entity. The delivered positions will also be reflected in the end of day positions in TRS/CPS (i.e. delivered positions will be removed from TRS/CPS). It is required for long positions to be notified of the quantities they are to receive via a HIT report. This report will be produced at an exchange member level.

Returning to FIG. 2 which illustrates that in some embodiments, the LITF ENGINE may provide services whereby on Day 2, (T+1) Notice Day, 202, a Member firm, by 3:00 PM EST on all trading days except for the day before the Last Delivery Day in which case it is 4:00 pm EST, with a short position may be required to nominate a bond from the deliverable bonds list in the Bond Delivery System, which will create the cash trades and send them to FICC's RTTM system. FICC, through its Netting Engine, may then create settlement obligations for next business day settle in Day 2, 202.

Figure 12:
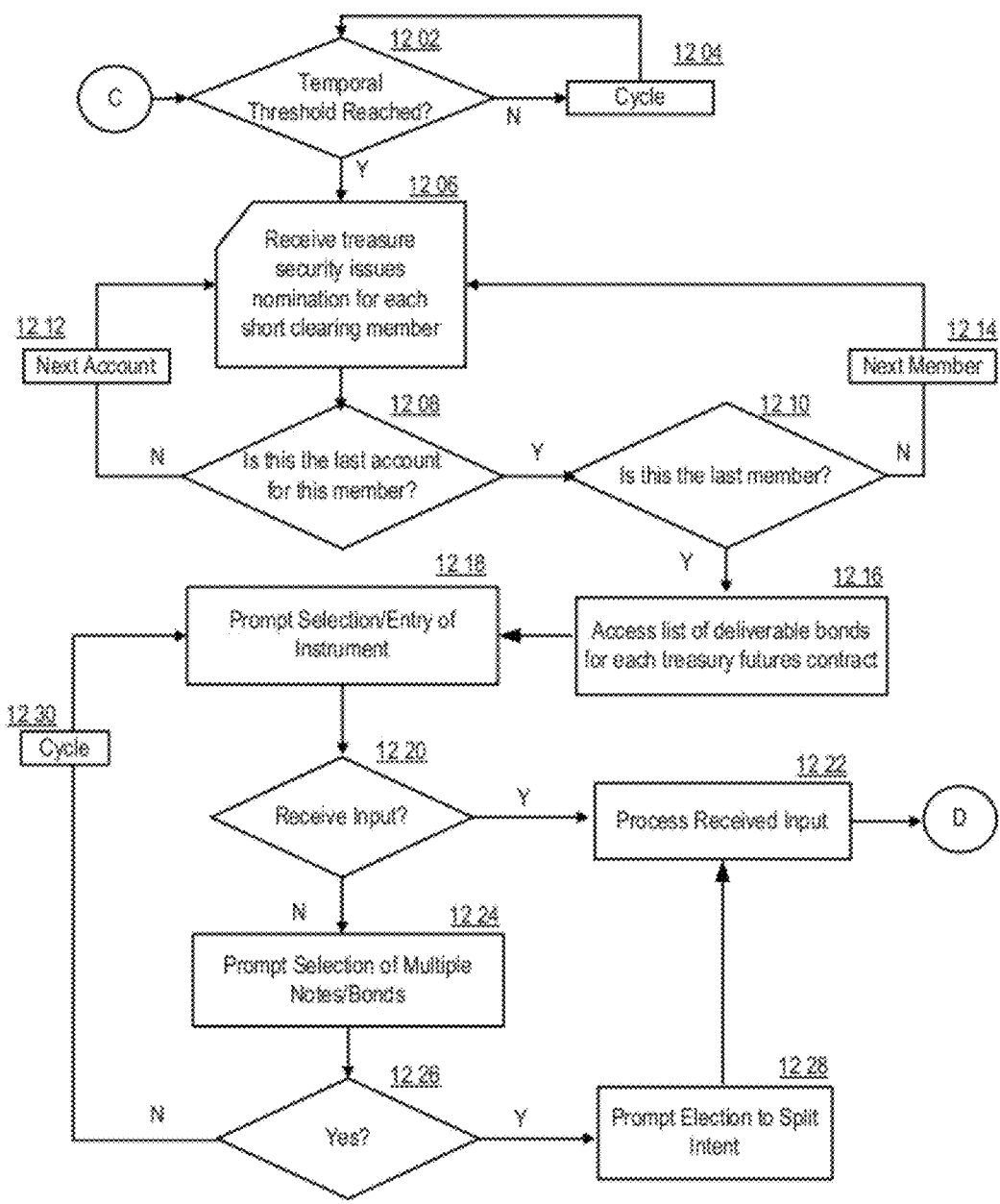
FIG. 12 is of a logic flow diagram illustrating aspects of a Short Clearing Member Initiation Component for some embodiments of the LITF ENGINE.

Advancing to FIG. 12 which illustrates that, in some embodiments, the LITF ENGINE may require for each short clearing member to nominate the treasury security issues that they shall deliver for their entire delivery commitment 1206. In one embodiment, house and client accounts may be treated separately where clearing members may submit separate nominations for each account. As such, the LITF ENGINE may determine if the account is the last account for this member 1208. The clearing members may submit separate nominations for each account 1212. The LITF ENGINE may determine if the member is the last member for nominations 1210, and the next member may submit nominations 1214. In one embodiment, this functionality may be provided by the Bond Delivery System. Bond nomination may be completed by 10:00 CT on T+1 1202, although this bond nomination deadline should be made configurable. In one such embodiment, prior to the first intent day, Exchange Entity operations may specify the complete list of deliverable bonds for each treasury futures contract in LDS 1216. The Exchange Entity systems may provide the ability for the operations team to pick the list of deliverable bonds from the complete list of bonds provided by the PTFSC 1218. Bonds not contained in the PTFSC file may not be tenderable on the Exchange Entity contract. The deliverable Bond list configured in LDS may be made available to the Bond Delivery System (e.g., LIFFE Guardian For Treasuries system). On Notice Day, each clearing member with a short position may be required to nominate a bond from the deliverable bonds list. NLG may restrict the short position to selecting a bond from the list of deliverable bonds.

In one embodiment, an interface may provide a drop down list of deliverable Treasuries to the short clearing member. The list may provide a CUSIP, Coupon Rate, and Maturity Date for each deliverable Treasuries. If the LITF ENGINE receives an input from the short clearing members 1220, it may process the received input 1222 for matching and allocation process. In one embodiment, if the LITF ENGINE does not receive an input from the short clearing members, members who wish to nominate multiple Notes/Bonds for a single Intent to deliver may be permitted to split the Intent in Bond Delivery System 1224. If the member indicates a multiple NOTES/Bonds input are needed 1226, the LITF ENGINE may prompt election to split the intent 1228.

In yet another embodiment, after the bond nomination deadline, and before 12:00 CT, the LITF ENGINE may facilitate match deliveries in each issue with buyers in the long positions pool, using a random strip algorithm, wherein in one embodiment:

a. The long clearing member accounts are listed in member mnemonic sequence, numeric first followed by alphabetic.
b. A starting account is then chosen at random.
c. The allocation of the lowest coupon bond commences with the selected mnemonic and progresses through the list of members' accounts.
d. When no further allocation of the lowest coupon bond can be made, the allocation continues with the next lowest coupon bond.
e. If bonds of equal coupon, but different maturities, have been nominated, those with the earliest maturity will be selected first.

In one embodiment of the LITF ENGINE, the Bond Delivery System may create the cash trades to be sent to PTFSC. The Clearing Entity may act as a broker to each trade where each short position may be converted to a Clearing Entity purchase in the underlying treasury (as defined by the treasury nominated by the short position). The short clearing member may be listed as the counterparty. PTFSC systems may create the matching sell side trade for the short clearing member. In this embodiment, each long position may be converted to a Clearing Entity sale in the underlying treasury (as defined by the allocation algorithm in step 2 above). The long clearing member may be listed as the counterparty. PTFSC systems may create a matching buy side trade for the long clearing member. Any position with a value greater than $50 million may be broken down into multiple trades. If one embodiment, Clearing Entity will act as a broker and positions will not be directly matched member to member, all trades created on the same trading day in a single treasury note or bond must have the same Broker Reference Number ID populated on the cash trade record. This facilitates PTFSC to make sure the Clearing Entity half trades balance out to zero for each product. In one embodiment, the deal price (principal amount) for each cash trade sent to the PTFSC will be calculated as follows:

$$DSP(I) \times PF \text{ (and rounded to the nearest cent,) where:}$$

DSP(I)=Either:
(a) The daily settlement price calculated and published by the exchange on Intent Day; or,
(b) The daily settlement price calculated and published by the exchange on the Last Trading Day if Intent Day is on or after the Last Trading Day.

PF=The Price Factor

The face value (PAR) for each cash trade sent to the PTFSC will be calculated as follows:

$$\text{Contract Value} \times \text{No. of Lots where:}$$

Contract Value=Face value of the underlying treasury:
$100,000 for the 5-, 10- and 30-year treasury futures.
$200,000 for the 2-year treasury futures.
No. of Lots=Number of futures lots being delivered in the transaction.

In one embodiment, all trades will be sent to PTFSC in a single file on a daily basis. In such an embodiment, PTFSC systems may calculate the accrued interest and determine the total invoice value.

Returning to FIG. 2 which illustrates that, in some embodiments, the LITF ENGINE may provide services whereby on Day 3, Delivery Day, 203, Settlement obligations may settle delivery versus payment (DVP) via PTFSC's established settlement processes through Member Settling Banks and PTFSC Clearings Banks. Upon completion of such a settlement, a Notice of Settlement may be sent to PTFSC on Day 3, 203. In one embodiment of the LITF ENGINE, there may be days that Exchange Entity is open for trading and Clearing Entity is clearing business but the FICC RTTM system is closed. Rules may be implemented in the Bond Delivery System to prevent cash trades being sent to PTFSC on a holiday or with a settlement date which falls on a holiday. In one embodiment where a Notice day falls on the day prior to a PTFSC holiday, the settlement date specified on the cash trades must always be the next date that PTFSC is open. This may be different to the next Exchange Entity/Clearing Entity business day. In another embodiment, where a Notice day falls on an PTFSC holiday, a Guardian matching algorithm may be run on Notice day but the cash trades produced may be rolled into the file produced on the next PTFSC business day. In such an example, the settlement date may be two business days following the PTFSC holiday.

As an illustrative example, Labor Day falls on Monday 6 Sep. 2010, and suppose the PTFSC is closed on Labor Day but the Exchange Entity and the Clearing Entity are open for trading. One implementation of the LITF ENGINE may be configured such that the following rules are implemented and applied.

For Notice Day Friday 3 September (Intent Day 2 Sept), commodity management system may conduct standard matching algorithms on Friday 3 September and produce the standard files and reports. However, applicable rules may specify that cash trades produced on this day have a settlement date of Tuesday 7 September.

For Notice Day Monday 6 September (Intent Day 3 Sept), rules may specify that the commodity management system conduct standard matching algorithm on Monday 6 September and produce the standard files and reports with the exception of the cash trades file. The applicable rules may specify that trades produced on Monday 6 September be reported to PTFSC in the standard cash trades file produced on Tuesday 7 September in the same file as those trades produced for Notice Day Tuesday 7 September. The settlement date for trades relating to Notice Day Monday 6 September may be set as Wednesday 8 September.

Figure 3:
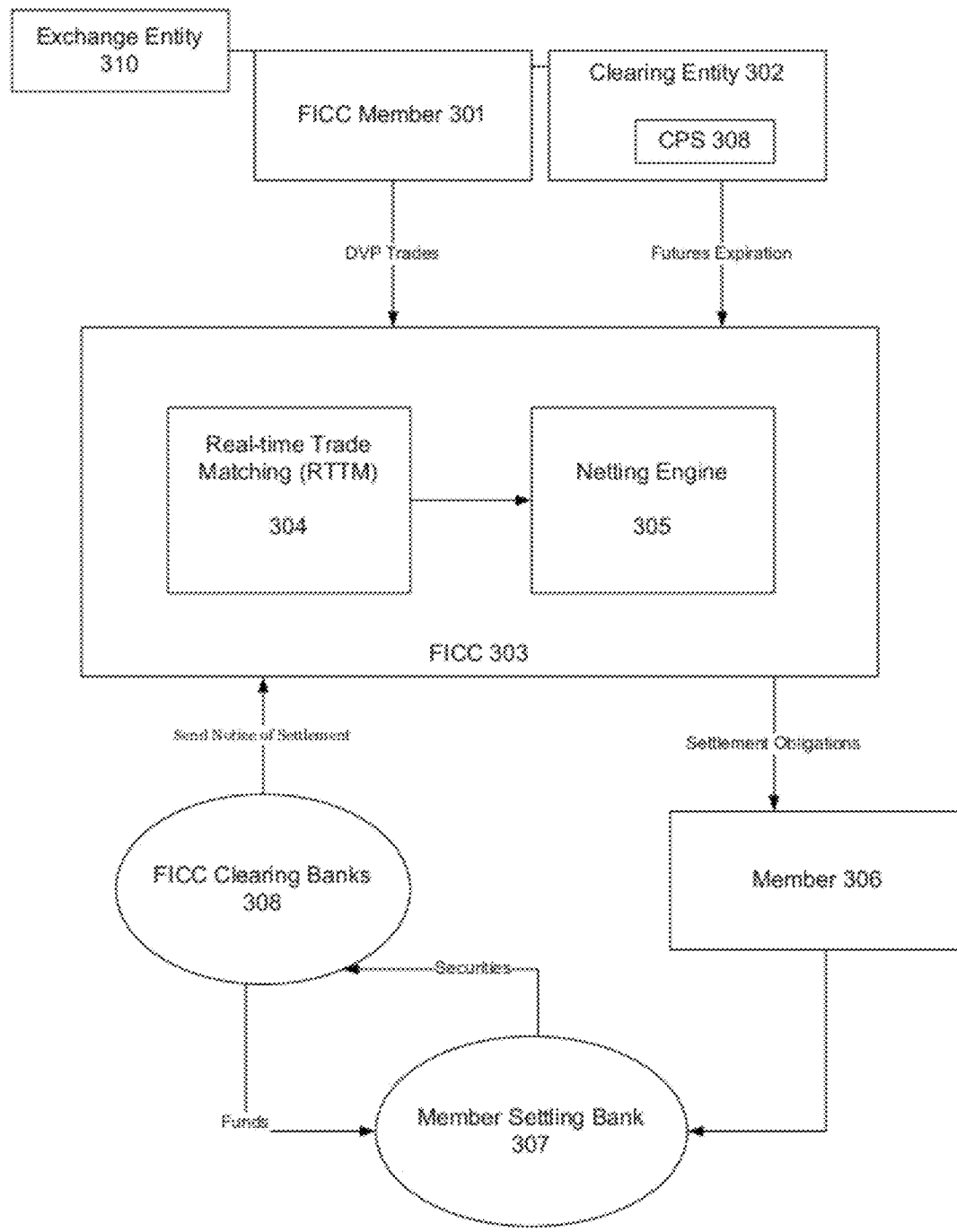
FIG. 3 is of a data flow diagram illustrating aspects of a locked-in trade transaction for some embodiments of the LITF ENGINE.

In one implementation, as illustrated by FIG. 3, Clearing Entity 302, such as New York Portfolio Clearing (NYPC) and/or like entity or entities has a clearing processing system ("CPS") 308. In one embodiment of the LITF ENGINE, contract transactions or trades for an exchange entity (e.g., NYSE Liffe U.S.) 310 may be cleared through Clearing Entity 302.

In some embodiments of the LITF ENGINE, a CPS 308 may hold positions for the exchange entity products/contracts cleared through a Clearing Entity 302. In such embodiments of the LITF ENGINE, some implementations may specify information to be provided by the Exchange Entity 310 (and/or related systems) to the CPS 308, including, by way of non-limiting example:

Cash trades for delivered futures (and/or like) positions (may be settled real time, for example, via a real time trade matching (RTTM) system 304).
Cash trade files with validated data including PTFSC ID and other related identification data;
Cash trade files with validated data including settlement date, trade date, broker reference and other related data;
Daily prices file containing settlement prices and options settlement;

Calculated daily variation margin (may be collected from members via the billing process to reflect the daily profit and loss from futures (and/or like) positions); and Billing information (e.g., billing file(s)) containing calculated trading and clearing fees for a banking element/component (e.g., as collected from members via the billing process);

In one embodiment illustrated by FIG. 3, PTFSC Members 301 may submit trades to PTFSC's Real-time Trade Matching system (RTTM) 304. In this embodiment, these trades may be DVP by a PTFSC member. In one such an embodiment, cash trades created as part of the delivery process may be submitted under the participant ID of the PTFSC member, and the executing member field may be set to the Clearing Entity ID.

In some embodiments of the LITF ENGINE, access to an Exchange Entity's CPS may be via a new instance of a system that acts as an application router between the end member user's terminal/application and the appropriate CPS environment ("TVS"). In some embodiments, product and participant data may be held in both Exchange Entity and the member entity. In the embodiment as shown in FIG. 3, Clearing Entity may submit locked-in trades through existing PTFSC members' accounts through RTTM 304 of PTFSC 303. In this embodiment, Clearing Entity only members may be required to designate a PTFSC member to settle trades on their behalf.

As shown in the embodiment of FIG. 3, PTFSC 303 may have a Netting Engine 305 where RTTM 304 may collect and match the received trade data. PTFSC 303 through the Netting Engine 305 may establish single net long or short position per PTFSC Member based on CUSIP codes (9-character alphanumeric identifier used to identify North American securities for the purposes of facilitating clearing and settlement of trades). By using the Netting Engine 305, the PTFSC may create settlement obligations for a Member 306 to settle on the next trading day. A Member 306 may communicate receiving/delivery instructions to the Member Settling Bank 307. A Member Settling Bank 307 makes delivery of securities in exchange of full payment over Fedwire from a PTFSC Clearing Bank 308. A PTFSC Clearing Bank 308 may communicate the Notice of Settlement back to the PTFSC 303 after the settlement.

In some embodiments of the LITF ENGINE, an Exchange Entity's or other entity's product and participant database system may provide the master product and participant data required by the LITF ENGINE and/or Exchange Entity systems (e.g., CUSIP codes).

In some embodiments, trade registration and management for Clearing Entity-cleared products may be provided by a TRS, which may provide the trade registration and management functionality for the Clearing Entity cleared products. In some implementations, trades conducted on the Exchange Entity (e.g., fixed income markets) may be passed to a TRS for registration. Access to TRS may be provided to all Exchange Entity Clearing Entity clearing members to view registered trades. TRS functionality may replicate functionality implemented on an Exchange Entity financials market, as discussed below.

In some implementations, a clearing member is a member of the clearing house that is responsible for the positions held in the clearing system(s) on its own behalf and on behalf of other related exchange members with whom there is a clearing agreement established. In some embodiments, CPS may provide clearing and position management for Clearing Entity products. CPS may be used to maintain positions for the Exchange Entity products (e.g., fixed income products). In some implementations, any trade registered by TRS may be automatically passed to CPS and reflected in the clearing member's position account for that contract.

Access to CPS may be provided to all Exchange Entity Clearing Entity clearing members to view and manage positions. In one embodiment, the CPS functionality may replicate that implemented on an Exchange Entity financials market, such as account structure; delivery process; trade interfaces; and margin payment procedures.

Figure 4:
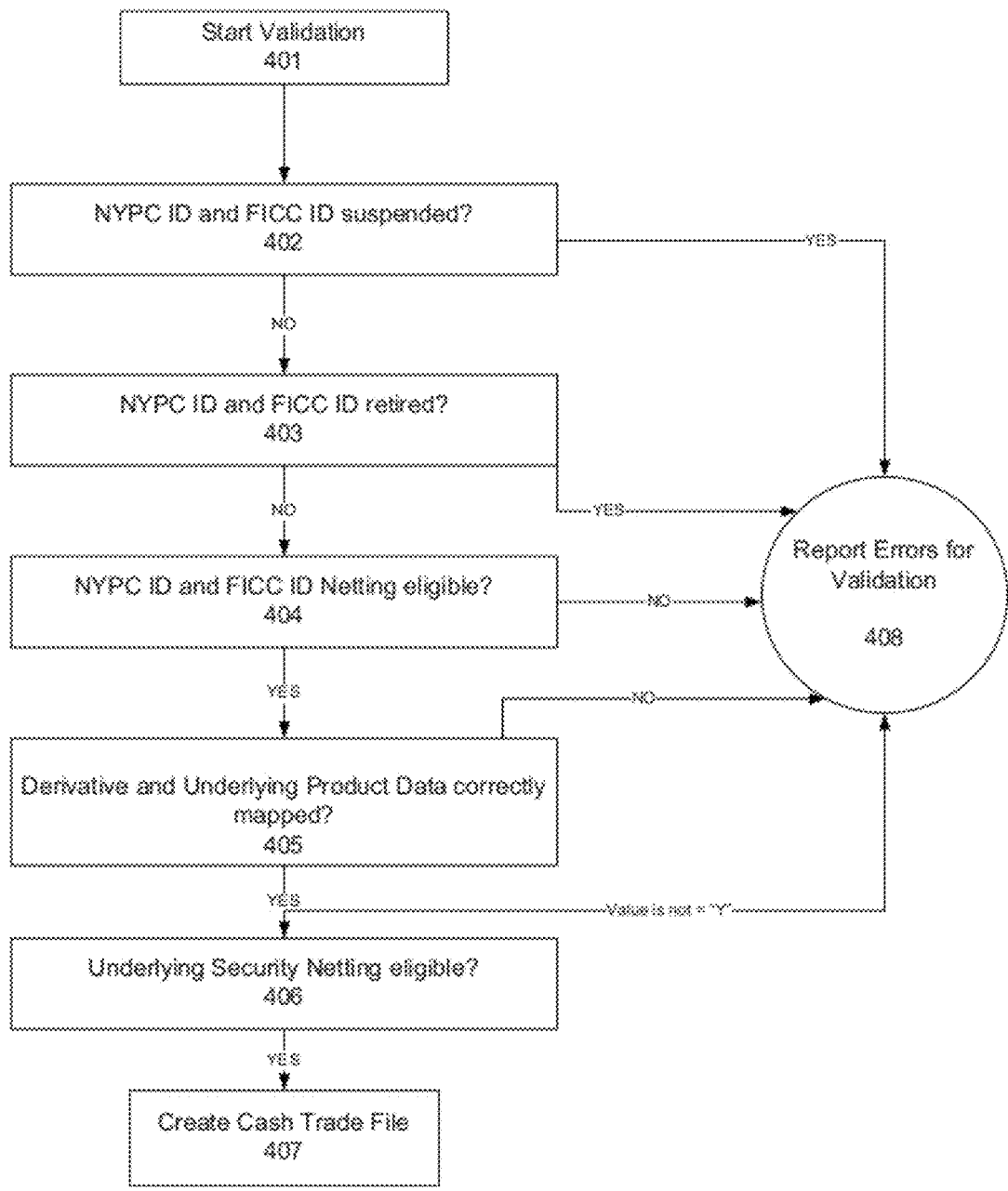
FIG. 4 is a logic flow diagram illustrating aspects of the eligibility validation of a locked-in transaction for some embodiments of the LITF ENGINE.

In one embodiment, as illustrated in FIG. 4, there are functional requirements and pre-conditional validation of a Member's reference data that may be required to be applied, by an exchange entity, before sending a cash trades file and interface. In one embodiment, a cash trade resulting from the expiry of futures may need to be validated before it can be sent from Exchange Entity to PTFSC. In one embodiment a member validation may be required to be applied by Liffe Database Systems ("LDS") 112 before Bond Delivery System can create the Cash Trades file. In FIG. 4, the cash trade validation process starts in Start Validation 401. In 402 a member's Clearing Entity ID and PTFSC ID on the Cash Trade are validated by checking the suspension status. A member's Clearing Entity ID and PTFSC ID on the Cash Trade should not be suspended, in one embodiment, for the Cash Trade to be validated. If the member's Clearing Entity ID and PTFSC ID on the Cash Trade are suspended, a Report of the Validation errors is sent in 408.

In one embodiment, member's Clearing Entity ID and PTFSC ID are validated to see if they are retired in 403. A member's Clearing Entity ID and PTFSC ID on the Cash Trade should not be retired, in one embodiment, for the Cash Trade to be validated. If the member's Clearing Entity ID and PTFSC ID on the Cash Trade are retired, a Report of the Validation errors is sent in 408. In one embodiment, member's Clearing Entity ID and PTFSC ID are validated to see if they are eligible for Netting in 404. A member's Clearing Entity ID and PTFSC ID on the Cash Trade should be eligible for Netting, in one embodiment, for the Cash Trade to be validated. If the member's Clearing Entity ID and PTFSC ID on the Cash Trade are not Netting eligible, a Report of the Validation errors is sent in 408. In this embodiment, the reference data must be relevant for the business day. For example in one embodiment, if the Cash Trade file is created on a Wednesday, it should use the Member and Account data received for the start on Wednesday (i.e. received physically on Tuesday) and not for any prior day.

Further in one embodiment, as shown in FIG. 4, a validation is performed in 405 to confirm that the Derivative and Underlying Product Data have been correctly mapped. In one embodiment, the pre-conditional validations must be applied on the Product reference data by EEDS 112 before Bond Delivery System can create the Cash Trade files. If the Derivative and Underlying Product Data has not been correctly mapped, a Report of the Validation errors is sent in 408. In 406 a validation is performed to verify that each Cash Trade is using an underlying security (e.g., one identified by CUSIP code) that is netting eligible. In one embodiment, validation is performed by checking the EEDS 112 to confirm whether or not the Cash Trade meets the netting criteria.

In this embodiment, once validation checking has been performed, a field in the PTFSC Product File, e.g., "SUBJ_NET_FLAG," may be given a value of Y ("yes") or N ("no"). Only a field value of Y represents full eligibility to complete a cash settlement trade. In one embodiment, for any of the given validation criteria, there is a product file with fields that may pre-define values which may be mandatory or optional. In one embodiment, in a Data Record file there may be a "Message Header" field that may be set to "Cash Trade Indicator." In this embodiment, from a PTFSC perspective, Locked-in means both sides must cancel to have the trade undone, whereas, Clearing Entity may send 2 half trade sides per trade. However in PTFSC systems, every position has 4 trades before netting all the buys versus the sells per CUSIP. So PTFSC may have to generate another two half trades in their systems to match the 2 NYSE trade halves. As another example, the fields "Message Header" may have the value of "Broker Reference Number." This is a non-unique ID that exists on buy half trades and their sell half trades to link them together as being from the same position. In such an embodiment, the half trades may be tied together as a position from a Clearing Entity perspective. This may allow PTFSC to facilitate that the half Cash Trades submitted by Clearing Entity balance out to zero. In one embodiment, for example 1 buy for 10 lots and the corresponding combined 3 sells for 10 lots will all have the same Broker Reference Number to tie them together for Clearing Entity. In one embodiment, the Exchange entity may provide trade type information which indicates if the Cash Trade is a buy or sell half trade, as derived from a long or short expiring future position.

In one embodiment, the reference data must be relevant for the business day. If the value of the "SUBJ_NET_FLAG" Field is not equal to "Y", a Report of the Validation errors is sent in 408. In this embodiment, if the Cash Trade file is created on a Wednesday, it should use the Member and Account data received for the start on Wednesday (i.e. physically on Tuesday) and not for any prior day.

Figure 5:
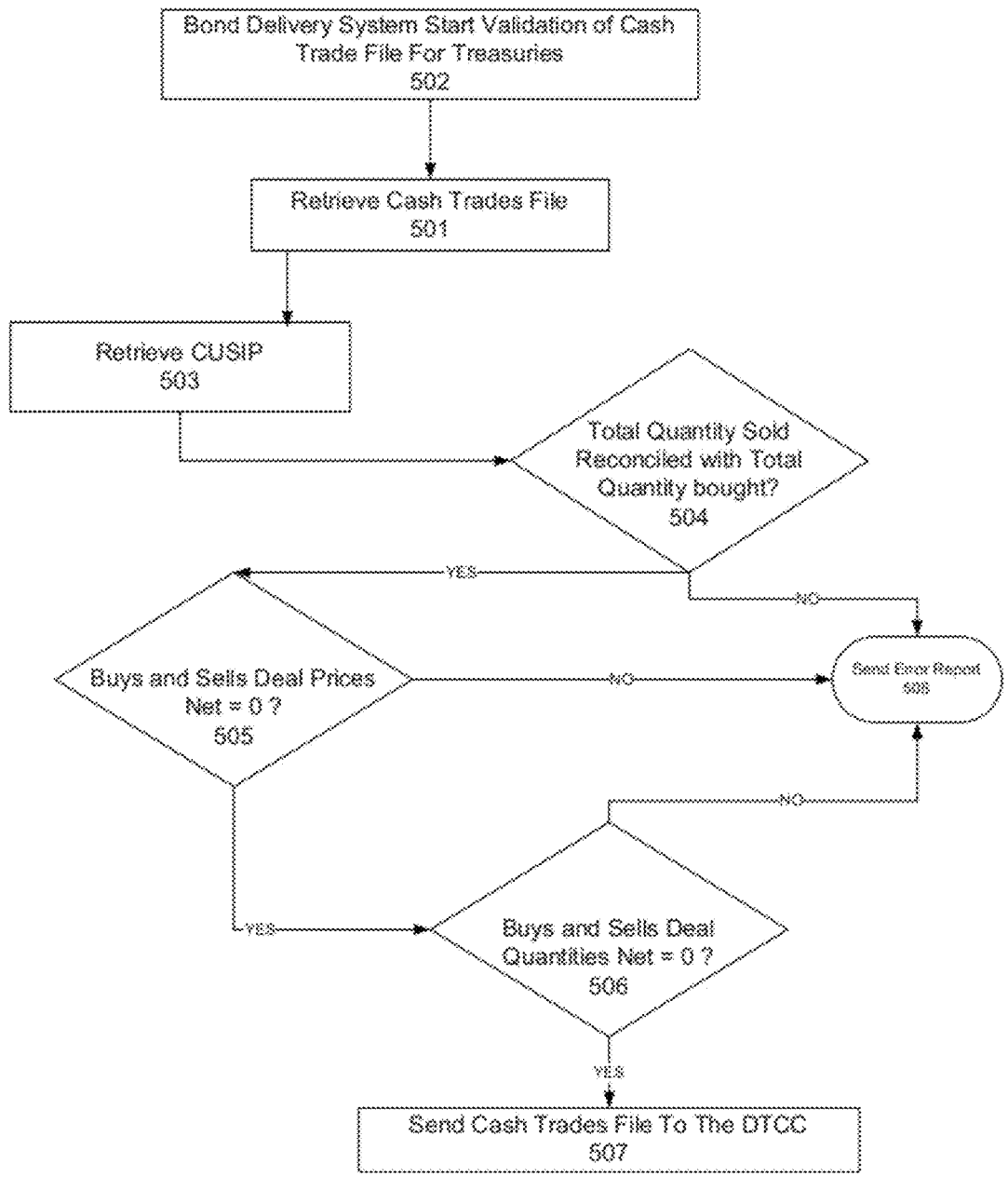
FIG. 5 is of a logic flow diagram illustrating various aspects of the margining and clearing of a locked-in trade transaction for some embodiments of the LITF ENGINE.

In one embodiment, a Bond Delivery System may need to validate a Cash Trade file before sending it to the PTFSC. In one embodiment, as illustrated in FIG. 5, validation must be applied by Bond Delivery System before sending the Cash Trades file to the PTFSC. Bond Delivery System starts validation of Cash Trade file for Treasuries in 502. The Cash Trade File is retrieved for validation in 501. The corresponding CUSIP is retrieved in 503 for the validation process. The Cash Trade file may be validated to see if the total quantity sold is reconciled with the total quantity bought with the corresponding CUSIP in 504. If the total quantity is not reconciled a report of the validation errors is sent in 508. If the total quantity is reconciled, there is a validation performed in 505 to verify that the deal prices net to zero across all buys and sells for Clearing Entity as a broker. If the deal prices do not net to zero across all buys and sells for Clearing Entity as a broker a report of the validation errors is sent in 508. If the price is validated, there is a validation performed in 506 to verify that the deal quantities net to zero across all buys and sells for Clearing Entity as a broker. If the deal quantities do not net to zero across all buys and sells for Clearing Entity as a broker a report of the validation errors is sent in 508. After the validation process is complete for the Cash Trade file, the file and interface is sent to the PTFSC.

In one embodiment, a trade match rule may be applied where buy and sell half trades must be capable of being matched as described below. Example Trade Match rule— Each half trade has a corresponding matching half trade on these fields: trade date; settlement date; CUSIP; broker XREF; buy to sell; quantity (aka par and face value).

Figure 6:
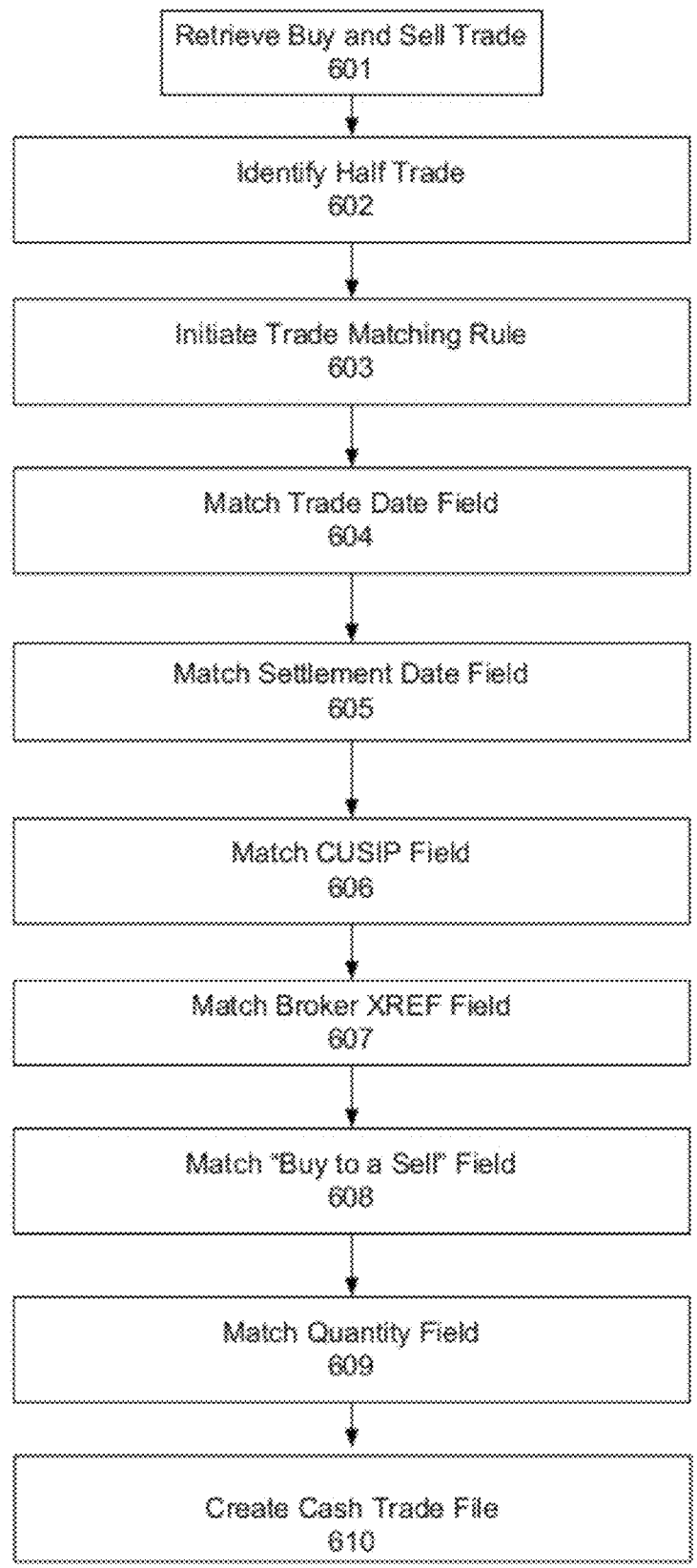
FIG. 6 provides a logic flow diagram illustrating elements of some embodiments of the LITF ENGINE.

In such an embodiment, as shown in FIG. 6, the buy and sell trade is retrieved in 601. In 602 the half trade is identified and the trade matching rule is initiated in 603. In one embodiment, each half trade is verified to have a corresponding matching half trade such as matching Trade Date Field 604, Match Settlement Date Field 605, Match CUSIP Field 606, Match Broker XREF Field 607, Match "Buy to a Sell" Field 608, and Match Quantity Field 609. Once the half trades are matched, a Cash Trade File is created 610. In yet another embodiment, in a failure scenario, prior to sending the Cash Trade file to the PTFSC, the Bond Delivery System such as the Liffe Guardian system may not send the Member File to the PTFSC if any of the file validation checks fail. In such an embodiment, the Bond Delivery System may produce a report listing all the validation errors and the report may be sent to an Exchange Entity and the Clearing Entity. In one embodiment the report may be sent to the NYSE Service Desk and Clearing Entity Market Operations.

In one embodiment, after a Cash Trade file is sent to the PTFSC, if any file errors are detected by the PTFSC, the PTFSC may identify the errors and manually inform NYSE Support Desk. In this embodiment, NYSE Support Desk may resolve the issues and resend the corrected Cash Trade files along with any reference data files. In one embodiment, if there are any failures due to Participant Default, for example, if the relevant PTFSC participant is inactive, operational procedures may ensure no Cash Trade may be sent to the PTFSC for settlement. To implement this in an embodiment, the business requirement will specify and configure the defaults and membership issues may be managed via business operations. In one embodiment a clearing house may move or resolve or close-out any positions prior to expiry because future positions would not be kept open after that time.

Furthermore, in one embodiment, in holiday scenarios the Cash Trade File may assume a settlement date of T+1. If the settlement date falls on a holiday, the settlement date may be adjusted, and reset to be the next business day, i.e., T+2, assuming T+2 is a valid business date. For example, in one embodiment, a file sent on Monday may be cued to settle on Tuesday, but if Tuesday is a holiday, then the settlement date may be reset to Wednesday—the next working day.

In some embodiments, the deal price (Principal per lot) for each cash trade (e.g., sent to the PTFSC) may be calculated as follows:

$$\text{Deal Price} = \text{Futures Settlement Price} * \text{Contract Size} * \text{Conversion Factor}.$$

where a lot=100,000 of the underlying.
One embodiment can be shown as an example:
Deal Price=107 19.5/32*1000*0.9040=$97,278.875.
If Accrued Interest per lot=e.g. $519.71, and if delivery is 5 lots:

$$\begin{aligned}
\text{Total Invoice} &= \text{Principal} + \text{Accrued Interest} * \text{Lots} \\
&= \$97278.875 + \$519.71 * 5 \\
&= \$97798.585 * 5 \\
&= \$488{,}992.925.
\end{aligned}$$

$$\text{Face Value(aka Par)} = \$100{,}000 * \text{lots}.$$

In one embodiment, in interface 3, the PTFSC will calculate accrued interest, not LGT.

Format of the Cash Trade File

In one embodiment, a Cash Trade file is a daily file which may contain all expires for the relevant expiry day. The Cash Trade file may contain one Header Record as illustrated below:

```
<CashTradesData >
    <Constant>Header </Constant> //identifies record as header
    <Destination>DTCC</Destination>
    <Application>TRRS</Application> //identifies system handle
    <SourceName>GSCC</SourceName> //participant ID
    <FileFormat>Swift</FileFormat>
    <DateTimet>YYYY-MMM-DD HH-MM-SS.H</DateTime>
    <AddlCashTradesData>
        ...
    </AddlCashTradesData>
</CashTradesData >
```

In one embodiment, the Cash Trade file may contain one Footer Record for reconciliation as illustrated in one embodiment below:

```
<CashTradesData >
    <Constant>Footer </Constant> //identifies record as footer
    <TrailerID>TRAIL</TrailerID>
    <RecordCount>00011</RecordCount>
//identifies total number of transactions or data records in file
    <SubmittingFirm>GSCC</SubmittingFirm>
    <AddlCashTradesData>
        ...
    </AddlCashTradesData>
</CashTradesData >
```

In one embodiment, the Cash Trade file may contain zero or more Cash Trade records. There may be two or more Cash Trade Data Records to represent each "deal" where a clearing entity such as NYPC may be listed as the central counterparty to each half trade. Each half trade may have the Clearing Entity as the buyer to the seller and the seller to the buyer i.e., each trade half may have one party tag as seller and one party tag as buyer. In one embodiment for example, if Member XX decides to deliver US $300,000, this may be allocated between two members e.g. US $100,000 to member YY and US $200,000 to member ZZ. In this embodiment there will be three MTM515 records as follows. In this embodiment they will linked together by the same Broker Reference number and their lots will net to zero:

NYPC Buy 300,000. Counterparty Member XX. Broker Xref 123
NYPC Sell 100,000, Counterparty Member YY, Broker Xref 123
NYPC Sell 200,000, Counterparty Member ZZ, Broker Xref 123

In one embodiment, the Data Record may have the format of an MTM515 data message record format. Depending on the embodiment, the accrued interest may not be calculated until loading of the file (e.g., performed by DTCC following their load of the file). In some embodiments, if the record is a Sell half trade, they the Buy fields are not populated (and vice-a-versa). In some embodiments, the field data format may be as follows: C—characters a-z and not case sensitive; X—alphanumeric (a-z and numbers, no symbols); N—numeric. Depending on the implementation, fields in these and other records may or may not be padded (i.e., with spaces or zeros).

In one embodiment, the Cash Trade file will be compliant with SWIFT Conformance. For example, the DTCC MT515 may be very close to the standard SWIFT confirmation message, except it may have a few additional custom fields that standard SWIFT format does not have. This file may be used for the Trade Instruct. In one embodiment the file may be a single file with embedded SWIFT MT515 messages as data records. In some embodiments each SWIFT message may consist of one line of data, with tag/field delimiters (carriage return line feeds (i.e. CRLF)) embedded in each record line. And in some embodiments, each record/line may end with a "CRLF-" followed by a CRLF to begin the following record on the next line. The table, as illustrated in FIGS. 23A-23N, provides one example embodiment with the standard SWIFT descriptions of each Data record filed, which may be identified by their Tag ID and/or Message Header.

Some embodiments of the LITF ENGINE may provide for and/or support the delivery process for Financial Products. In one embodiment, the LITF ENGINE may facilitate communications and data management relating to delivery of such instruments. For example, one implementation may facilitate the PTFSC (e.g., FICC) sending the Exchange Entity a complete list of specified instruments (e.g., Treasury Notes/Bonds) held in the PTFSC systems along with corresponding identifying data and/or indicia (e.g., the related CUSIP code, coupon date, and a text description of the Treasuries). Provision of this information may vary depending on the embodiment. In one implementation, this information may be provided periodically (e.g., daily) as a data file (e.g., downloadable XML file, spreadsheet, etc.).

Figure 8:
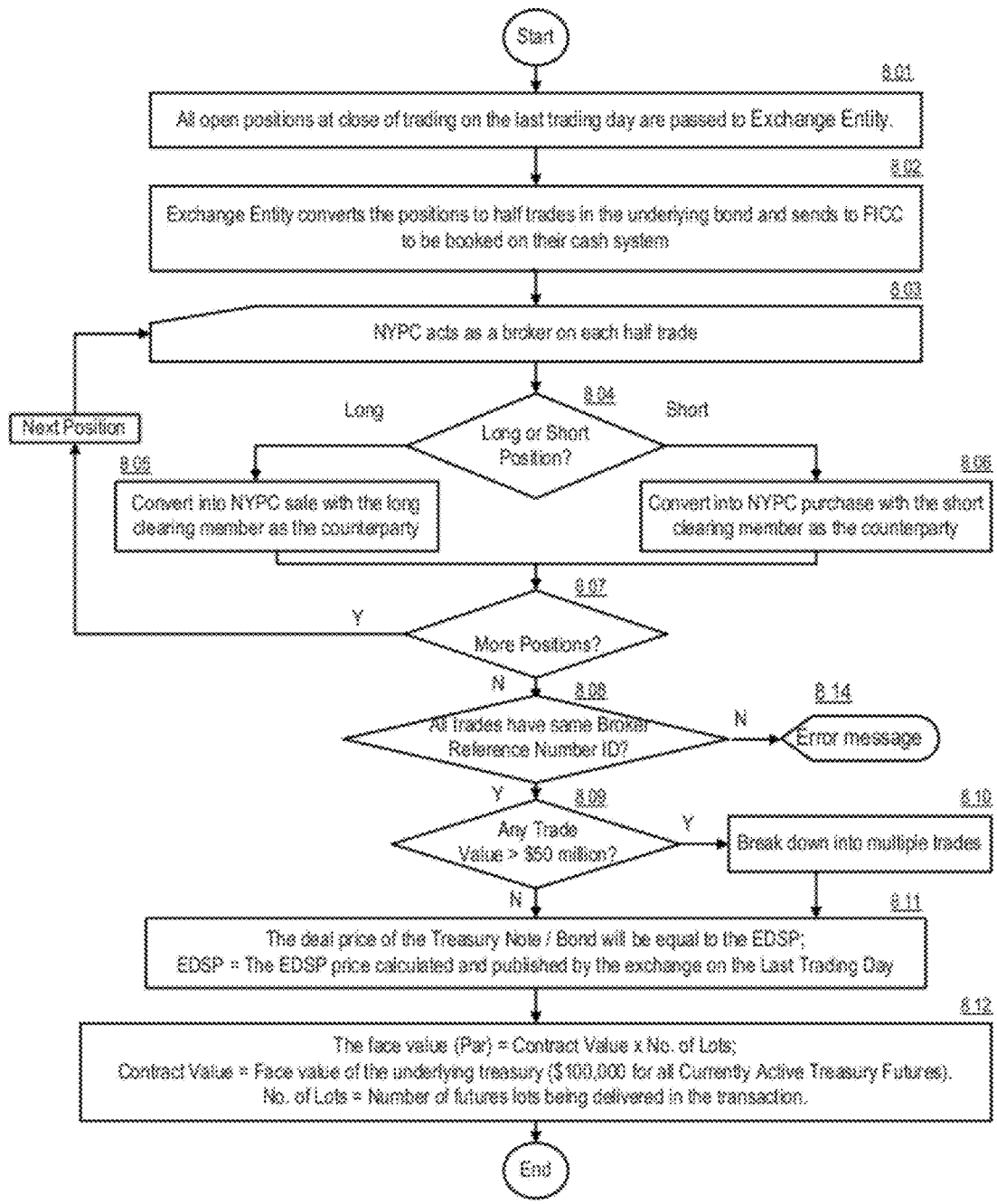
FIG. 8 is of a logic flow diagram illustrating aspects of a Benchmark Treasury Futures Delivery Component for some embodiments of the LITF ENGINE.

The LITF ENGINE may facilitate clearing, settlement, delivery, and/or management of one or multiple instruments as desired. Advancing to FIG. 8, in one embodiment, as illustrated in the figure, the LITF ENGINE may facilitate Treasury futures based on Benchmark Treasuries. Such Benchmark Treasury Futures may have a single delivery day with settlement on the business day after the last trading day of the futures delivery month. In such an embodiment, delivery of the Futures contracts may take place according to and/or derived/determined from the exchange delivery settlement price ("EDSP") calculated on the last trading day.

In such an embodiment, all open positions at close of trading on the last trading day may be received by a Commodity Management System 801. The Commodity Management System may directly convert the positions to half trades (i.e., half trades in the underlying bond), which may be recorded and/or transmitted for further processing (e.g., sent to PTFSC to be booked on a cash system) 802. In one embodiment, the Clearing Entity may act as a broker on each half trade 803. Every position may be checked to determine whether it is a long position or a short position 804. For example, long positions may become Clearing Entity sales of the underlying with the long clearing member as the counterparty 806, and shorts positions may become Clearing Entity purchases of the underlying with the short clearing member as the counterparty 805.

Some embodiments of the LITF ENGINE may be configured to provide oversight, quality assurance, and/or impose restrictions to assure transaction integrity. For example, in one implementation, the Clearing Entity may act as a broker and positions may not be directly matched member to member. In one implementation, the Clearing Entity (e.g. NYPC) may check if there are more positions to process 807. If there are more positions to process, the Clearing Entity may go on to process the next position. If there are no more positions to process, trades created on the same trading day in a single treasury note or bond may be specified/required to have the same Broker Reference Number ID populated on the cash trade record, thus allowing for confirmation that the Clearing Entity half trades balance out to zero for each product 808

In some embodiments, if all trades created on the same trading day in a single treasury note or bond do not have the same Broker Reference Number ID populated on the cash trade record, then the Clearing Entity may generate an error message 814. If all trades created on the same trading day in a single treasury note or bond have the same Broker Reference Number ID populated on the cash trade record, then the Clearing Entity may check whether all trades are smaller than or equal to the value of $50 million 809. If any trade is above the value of $50 million, then the Clearing Entity may break down the trade into multiple trades 810. The Clearing Entity may calculate the deal price of the Treasury Note/Bond to be equal to EDSP, where EDSP is equal to the EDSP price calculated and published by the exchange on the Last Trading Day 811. The face value (PAR) for each cash trade sent to the PTFSC may be calculated as Contract Value×No. of Lots, where Contract Value is equal to the face value of the underlying treasury ($100,000 for all Currently Active Treasury Futures) and No. of Lots is equal to the number of futures lots being delivered in the transaction 812.

In some embodiments, all trades may be sent to PTFSC in a single file on a daily basis. Settlement in the PTFSC systems may be on the business day following the last trading day. In one implementation, trades may be identified by CUSIP codes. The LITF ENGINE may list a Treasury futures delivery month, e.g., on the LIFFE CONNECT® systems, prior to the underlying CUSIP code(s) being known. In another implementation, individual delivery months within a contract may be configured with different CUSIP code(s).

Some embodiments of the LITF ENGINE may utilize an interaction gateway (hereinafter "PC Gateway") to support interaction and communication. In one implementation, the PC Gateway may be used to allow members to access and/or download details of trades, settlement prices, reports from TRS, and the like via their computing devices (e.g., desktop/laptop computers, media systems, mobile devices, etc.). Depending on the implementation, the PC Gateway may be provided to or for Exchange Entity members.

PC Gateway functionality, including reports, may be made available for the members on the Exchange Entity platform. The PC Gateway may, in some embodiments, support fractional pricing and/or may provide additional functionality, as described in detail below.

Depending on the implementation of the LITF ENGINE, the PC Gateway may support a variety of data types and formats, such as, by way of non-limiting example, any and all price formats required. In one implementation, prices in PC Gateway may be displayed using a variety of formats, such as the following:

| | |
|---|---|
| Ticks | In some implementations, this may be the default setting for all file types. Prices may appear as the total number of ticks. For example, for the 10-year Treasury futures contract, the price of 108 24/64 appears as 6936.<br>In some embodiments, this format may be used for prices stored in an internal download file and how they appear in Trade menu functions. |
| Decimal | Prices may appear in decimal format but without the decimal point. For example, a 10-year Treasury futures contract price of 108 24/64 appears as 108375. |
| Fractional | Prices may appear in decimal format with a decimal point included, with no fixed number of decimal places are specified. Instead, prices are justified with zeros placed in the most significant digits. A 10-year Treasury futures contract price of 108 24/64 appears as 108.375. |

In some embodiments of the LITF ENGINE, PTFSC systems may be provided with cash trades resulting from futures delivery. In such an embodiment, the product set may include treasury futures which deliver into the underlying treasury products. In some implementations, delivered positions in physically delivered fixed income products may be converted to trades in the underlying treasury products for matching in the PTFSC system and trades may be sent to the PTFSC in a prescribed PTFSC format, if required. In some embodiments, each half trade may be submitted with the Clearing Entity as the counterparty, which may aid PTFSC processing of the trade.

In some implementations, member codes may be in a PTFSC-specific format, and a mapping of Exchange Entity member codes to PTFSC participant codes may be provided by an Exchange Entity database system. In some embodiments, cash trades may not be segregated by House and Client accounts when submitted to the PTFSC systems (as discussed above) and each Clearing Entity member may have a single PTFSC account for delivery.

In some embodiments, cash trades are created according to the delivery procedures of the listed product, as discussed below. In some implementations, PTFSC may require receipt of a cash trade file every day even if this file does not contain any trades.

In some embodiments, CPS may manage exercise and assignment for options on fixed income futures and/or like products. In such embodiments, CPS may provide the following functionality for Clearing Entity cleared contracts:

Exercise Notifications—enables instructions to be entered to exercise long option positions;

Auto-Exercise Instructions—in addition to entering manual exercise instructions, CPS can be used to exercise certain in-the-money option positions automatically;

Options Assignment—CPS may be used to assign exercised long option positions to short option positions (depending on the embodiment, allocation assignment algorithms may be used for early exercised options).

In some embodiments, the CTI may be made available to a fees system ("EFS") 116 to be used as a basis for the calculation of trading and clearing fees for settled interests in Financial Products.

In some embodiments, an origin code may be stored by TRS and made available for back office systems (via TRS screens, TSCS, PC Gateway, and/or the like) for received trades. In some embodiments, the LITF ENGINE facilitates member code mapping, thereby enhances Exchange Entity operations. In one embodiment, files sent to the PTFSC may have clearing member codes in the PTFSC format. In such an embodiment, the systems producing the specific files may translate the Clearing Entity clearing member codes into the relevant PTFSC participant code. The master data for this translation may be held in an Exchange Entity database system and passed to the relevant systems when required.

In one embodiment, Exchange Entity operations/support may be able to maintain the mapping of these codes in the Exchange Entity database system. Exchange Entity operations may work with the Clearing Entity operations to determine the mappings. Depending on the implementation, Clearing Entity operations may have restricted or limited access to the Exchange Entity Database System.

In some embodiments, a separate instance of TCS may be provided for access to the Exchange Entity version of TRS/CPS. As discussed above, a TVS application may be used to route connections from the end users, including those connecting via PC Gateway, through to the appropriate TRS/CPS environment. While some embodiments may utilize a single instance of TVS, other embodiments may utilize one or more new instances of TVS (or like application) for routing connection to the Exchange Entity market.

Depending on the implementation, other requirements may include that all trades be identified by CUSIP codes and/or other indicia, that an Exchange Trading System be able to list a Treasury futures delivery month prior to the underlying CUSIP code(s) and/or other indicia being known, and/or that individual delivery months within a contract to be configured with different CUSIP code(s).

In some embodiments, the LITF ENGINE may be implemented as a LITF ENGINE system. A LITF ENGINE system may include a number of operational modules and/or data stores configured to carry out and/or support LITF ENGINE features and/or functionality. A LITF ENGINE controller may serve a central role in some embodiments of LITF ENGINE operation, serving to orchestrate the reception, generation, and distribution of data and/or instructions to, from, and between LITF ENGINE modules and/or allow further review/analysis of data generated and/or gathered during LITF ENGINE operation. The LITF ENGINE controller may be coupled to one or more operation modules configured to implement various features associated with embodiments of LITF ENGINE operation.

In one embodiment, the LITF ENGINE controller may be coupled to a market and/or exchange interface configured to: query and/or receive market and/or exchange data from one or more data sources or feeds; effectuate orders and/or transactions; receive confirmations and/or fulfillment notifications; and/or the like.

In one implementation, the LITF ENGINE controller may also be coupled to a LITF ENGINE output interface, which may be configured to publish and/or transmit information, data, and/or reports to internal or external systems, components, and/or entities. In a further implementation, the LITF ENGINE controller may be coupled to one or more administrator interfaces and/or administration components, configured to provide an interface via which an administrator can monitor and/or interact with LITF ENGINE system settings, actions, rules, data management, and/or the like. For example, in one implementation, a LITF ENGINE administrator may interface with the LITF ENGINE system via an administrator user interface to adjust transaction rules, update chronological information, adjust user permissions, and/or the like within a given application or tool of the LITF ENGINE system.

In one implementation, the LITF ENGINE controller may be coupled to a transaction module configured to record contract purchase details, including, by way of non-limiting example: purchase date and/or time information, term information, exchange information, position information, volume information, member/user information, and/or the like. The transaction module (and/or a related module) may be configured to receive inputs and/or requests, via specified channels and/or user interfaces, such as short position delivery intents and/or instrument nominations provided by exchange members via a member interface. In some implementations, the controller may be coupled to a user interface module to provide appropriate user interfaces to exchange member and/or other users to allow interaction with and utilization of the LITF ENGINE. The transaction module (and/or related module(s)) may also be configured to process transactions, including but not limited to: aggregating delivery intents, determining positions (or a collection or pool thereof) that will take delivery, generating a positions record, and/or the like.

The LITF ENGINE may facilitate the management of a variety of products, including, by way of non-limiting example, Basket issue Treasury futures—exchange listed futures which permit delivery of a range of Exchange-defined Treasury notes/bonds, Benchmark Treasury futures—exchange listed futures that deliver into the Benchmark Treasury (i.e., the last Treasury note or Treasury note/bond or Treasuries to be issued, also Currently Active Treasury (CAT)), and/or the like. Specific non-limiting examples may include one or more of the following: 2-Year U.S. Treasury Note Futures (CAT), 5-Year U.S. Treasury Note Futures (CAT), 7-Year U.S. Treasury Note Futures (CAT), 10-Year U.S. Treasury Note Futures (CAT), 2-Year U.S. Treasury Note Futures (Basket), 5-Year U.S. Treasury Note Futures (Basket), 10-Year U.S. Treasury Note Futures (Basket), and or the like.

Figure 7A:
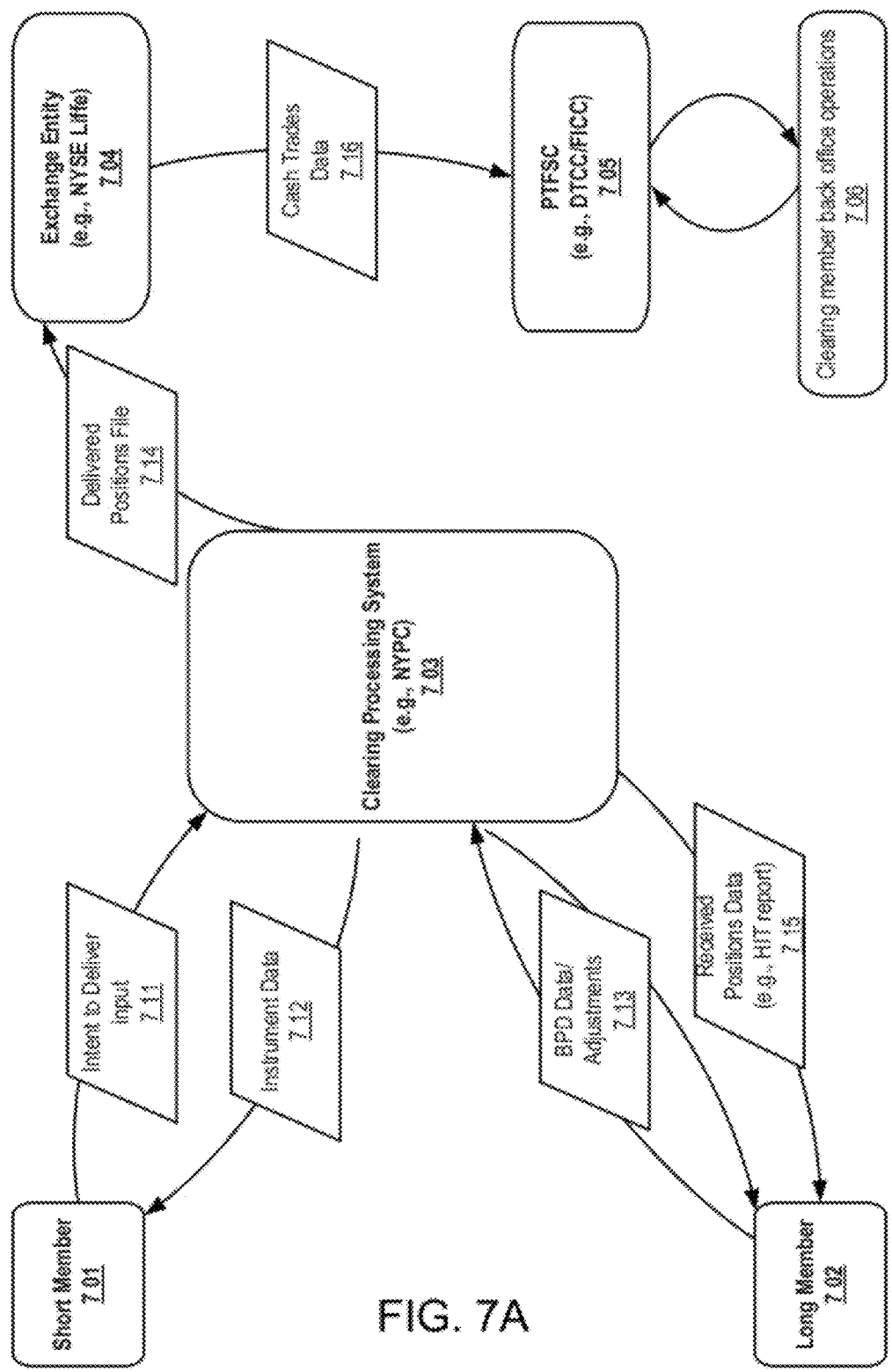
FIG. 7A provides an data flow diagram illustrating various aspects of interactions of embodiments of the LITF ENGINE.

FIG. 7A shows a data diagram illustrating example embodiments of the delivery process for Treasury Futures in some embodiments of the LITF ENGINE. In some embodiments, any short member, 701, wishing to initiate delivery may submit an intent to deliver, 711, into CPS (e.g., NYPC), e.g., 703, by 20:00 CT on day 1 (T) of the delivery cycle. CPS may provide short members with instrument data, 712, to enable the short member to nominate the Treasuries that they intend to deliver at the time that the intent to deliver is submitted. The exchange members with long positions, 702, may revise or adjust Bought Position Date (BPD) data or adjustments, 713. A "delivered positions" file, 714, may be generated by CPS, detailing all short positions that have submitted intents and the pool of long positions that are to be assigned delivery. This file may contain positions at a clearing member level segregated by margin account as well as details of any nominated deliverable Treasuries. This may be sent to exchange entity, e.g., NYSE Liffe, 704. The delivered positions may also be reflected in the end of day positions in TRS/CPS (i.e. delivered positions may be removed from TRS/CPS). Long positions may be notified of the quantities they are to receive, e.g., via a HIT report, 715. This report may be produced at an exchange member level. The CPS may match deliveries in each issue with buyers in the long positions pool, and generate cash trades, 716, to be sent to PTFSC, e.g., DTCC/FICC, 705. The PTFSC may communicate with the clearing members 706 to settle the trades.

In some embodiments, the LITF ENGINE and/or LITF ENGINE components provide enhanced reliability for transactions and inter-entity communications, such as, by way of non-limiting example, via the LITF ENGINE generated cash trade file.

Figure 7B:
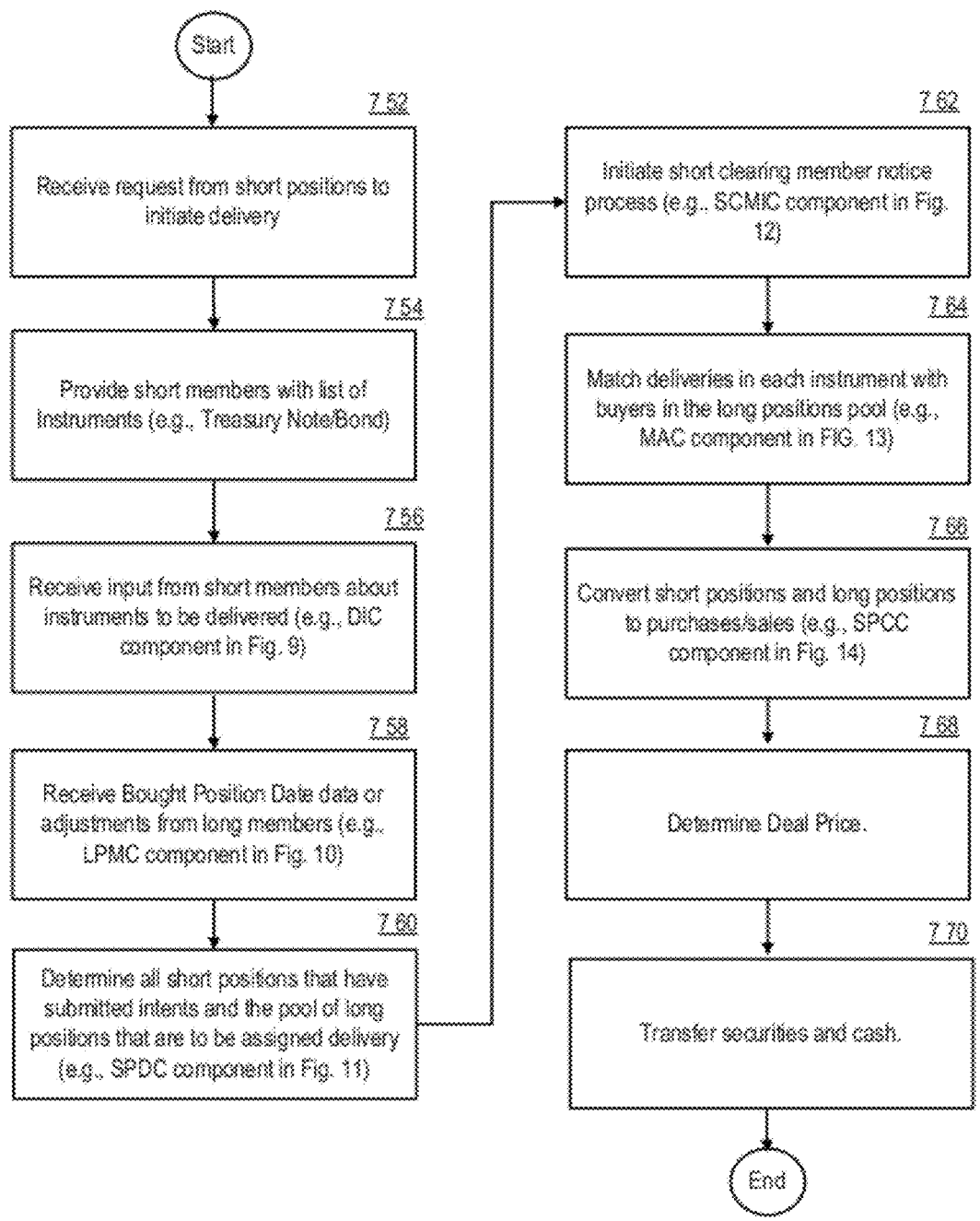
FIG. 7B is of a logic flow diagram illustrating elements of some embodiments of the LITF ENGINE.

FIG. 7B shows a logic flow diagram illustrating example embodiments of the delivery process for Treasury Futures in some embodiments of the LITF ENGINE. In some embodiments, the LITF ENGINE may receive requests from short positions to initiate delivery of Treasure Futures, e.g., Treasure Notes, Bonds, and/or the like 752. The LITF ENGINE may provide a list of Treasury Notes or Bonds to the short position members at the time that the intent to deliver is submitted 754. The short members may nominate instruments to be delivered 756. Additional details are discussed in the exemplary Delivery Initiation Component in FIG. 9. The exchange members with long positions, may adjust their instrument purchasing data, e.g., Bought Position Date (BPD) data or adjustments, 758. Additional details are discussed in the exemplary Long Position Maintenance Component in FIG. 10. Upon receiving input from the short and the long positions, the LITF ENGINE may determine all short positions that have submitted intents and the pool of long positions that are to be assigned delivery 760. Additional details are discussed in the exemplary Short Position Delivery Component in FIG. 11. On Notice day, each clearing member with a short position may nominate an instrument that to be delivered 762. Additional details are discussed in the exemplary Short Clearing Member Initiation component in FIG. 12. The LITF ENGINE may match deliveries in each instrument with buyers in the long positions pool 764. Additional details are discussed in the exemplary Matching/Allocation Component in FIG. 13. Each short position may be converted to a purchase in the underlying treasury, and each long position may be converted to a sale in the underlying treasury 766. Additional details are discussed in the exemplary Short Position Conversion Component in FIG. 14 and Long Position Conversion Component in FIG. 15. The LITF ENGINE may determine the deal price and the face value for each cash trade, and send to PTFSC 768. On Delivery Day, net transfers of securities and cash occur 770. Some embodiments of the LITF ENGINE may be carried out by CPS, and/or BDS.

Figure 10:
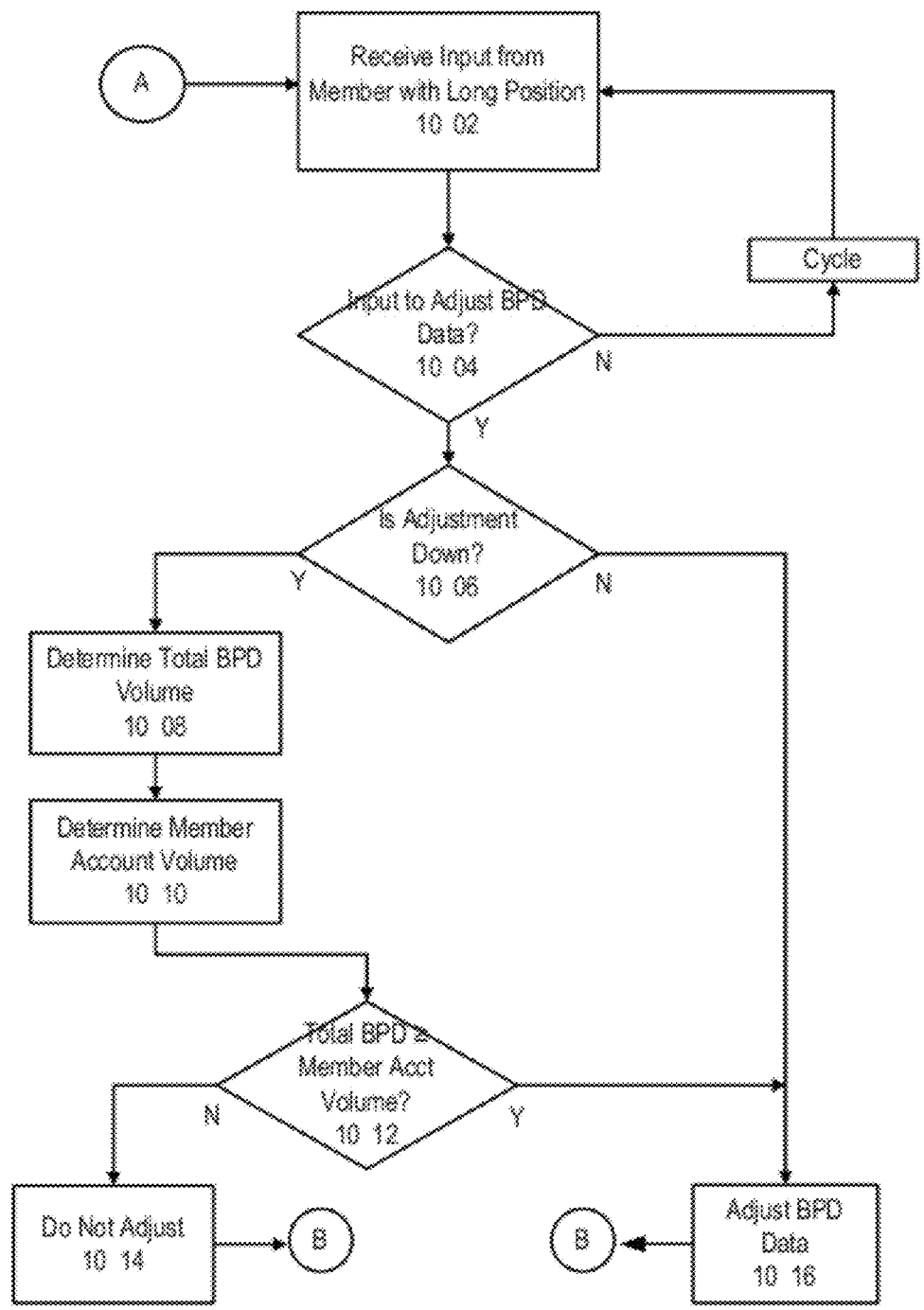
FIG. 10 is of a logic flow diagram illustrating aspects of a Long Position Maintenance Component for some embodiments of the LITF ENGINE.

In some embodiments, exchange members with long positions may be permitted to adjust their Bought Position Date (BPD) data. As illustrated in FIG. 10, in one such embodiment, input/communications from a member with a long position may be received 1002, and if the input relates to adjust BPD data 1004, a determination is made as to whether the adjustment is a downward adjustment 1006. If the adjustment is not down 1006, the BPD data is adjusted 1016. If the adjustment is down 1006, the total BPD volume is determined 1008 and the member account volume is determined 1010. If the total BPD volume is greater than or equal to the member account volume 1012, the BPD data is not adjusted 1014, while if the total BPD volume is less than the member account volume 1012, the BPD data is adjusted 1016. In such an embodiment, the volume against each date can be reduced down provided the total BPD volume is greater than or equal to the member account volume. Some implementations may limit access to this facility (e.g., available until 20:00 CT each day).

The example code below further illustrates the above aspects for one embodiment of the LITF ENGINE:

```
//if the keyed input is to Adjust BPD data and the direction indicated
//for the adjustment is down, check the volume of the BPD against the
//accounts volume. If the BPD Volume is greater, adjust the BPD
//according to the data keyed in by the account holder
if (keyed_input.type == "Adjust BPD Data" &&
keyed_input.direction == "Down")
{
    if (Member.BPD.Volume( ) > Members.Accounts.Volume( ))
        AdjustBPD(keyed_input.data);
}
```

In some embodiments, positions data for deliveries may be according to and/or derived/determined from close of TRS/CPS on intent day (T). In some implementations, although the trading day for T+1 may start prior to the deadline for intents and long position maintenance, any changes to positions based on trading on trade day T+1 may not be reflected in the positions used for delivery.

In some embodiments, the LITF ENGINE and/or LITF ENGINE components provide improved communication security and interoperability between various systems of entities, such as between exchange entity systems and clearing entity systems.

Figure 11:
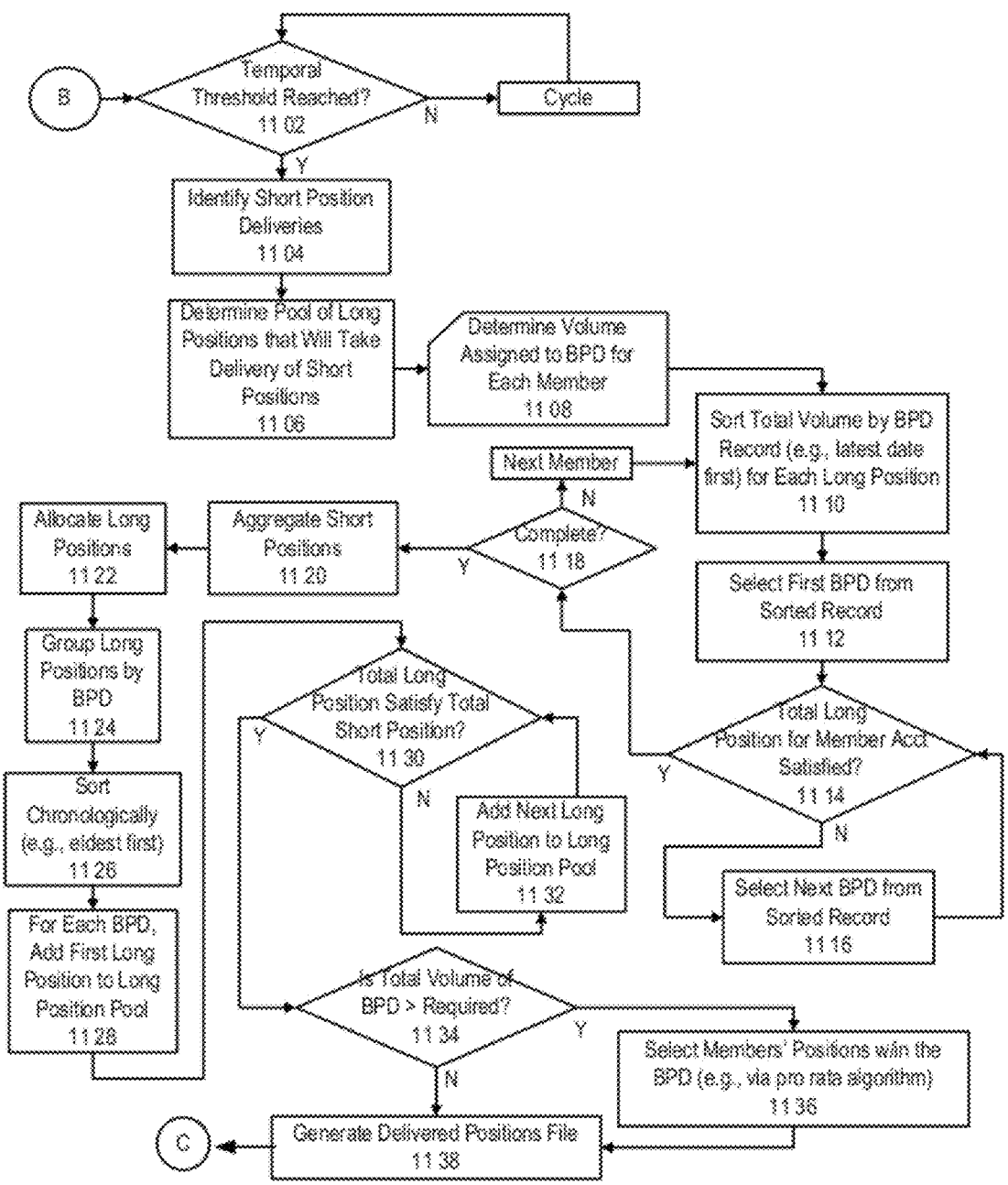
FIG. 11 is of a logic flow diagram illustrating aspects of a Short Position Delivery Component for some embodiments of the LITF ENGINE.

In some embodiments, as illustrated in FIG. 11, after a specified temporal threshold has been reached 1102 (e.g., after 20:00 CT), the clearing systems may calculate/determine a pool of long positions 1106 that may take delivery of indicated short positions 1104, for example, according to an Oldest Long/"Vintage" assignment and/or the like.

In one such implementation, the volume assigned to a Bought Position Date for each exchange member 1108 may be determined/calculated by sorting the total volume for each long position by BPD record 1110 (with the latest date first), then selecting the Bought Positions Dates in turn 1112, 1116 until the total long position for that member account has been satisfied 1114.

Upon completion 1118, the short positions that have submitted intents to deliver 1104 may be aggregated 1120 and allocated 1122 to the long positions, for example, via a "position date pro-rata" basis and/or the like. In such an embodiment, long positions may be grouped by BPD 1124, and sorted chronologically 1126 (e.g., eldest date first). The long positions within each BPD may then be added to the long position pool in turn 1128, 1132 until the total long position is sufficient to satisfy the total short positions 1130.

In some additional or further embodiments, if the total volume of a BPD is greater than required 1134 (i.e., the remaining short position is not sufficient to satisfy the whole volume within a BPD), the members' positions within the BPD may be otherwise selected 1136 (e.g., via a pro-rata algorithm).

In some embodiments, a "delivered positions" file or record may be generated/produced 1138, detailing short positions that have submitted intents and the pool of long positions that are to be assigned delivery. In some implementations, this file may contain positions at a clearing member level segregated by margin account, and may also include details of any nominated deliverable Treasuries. In some embodiments, the file and/or equivalent information may be sent or otherwise provided to the commodity management system and/or other indicated entity. In some embodiment, a delivered positions file/record and/or delivered positions information may be utilized to effectuate delivery, reconcile accounts, and/or update transaction record(s).

In some embodiments, the delivered positions may also be reflected in the end of day positions in TRS/CPS (i.e. delivered positions will be removed from TRS/CPS). In some implementations, long positions may be notified of the quantities they are to receive (e.g., via a HIT report or the like). In some such embodiments, this report may be produced at an exchange member level, while in other embodiments, the report may be more granular.

Figure 13:
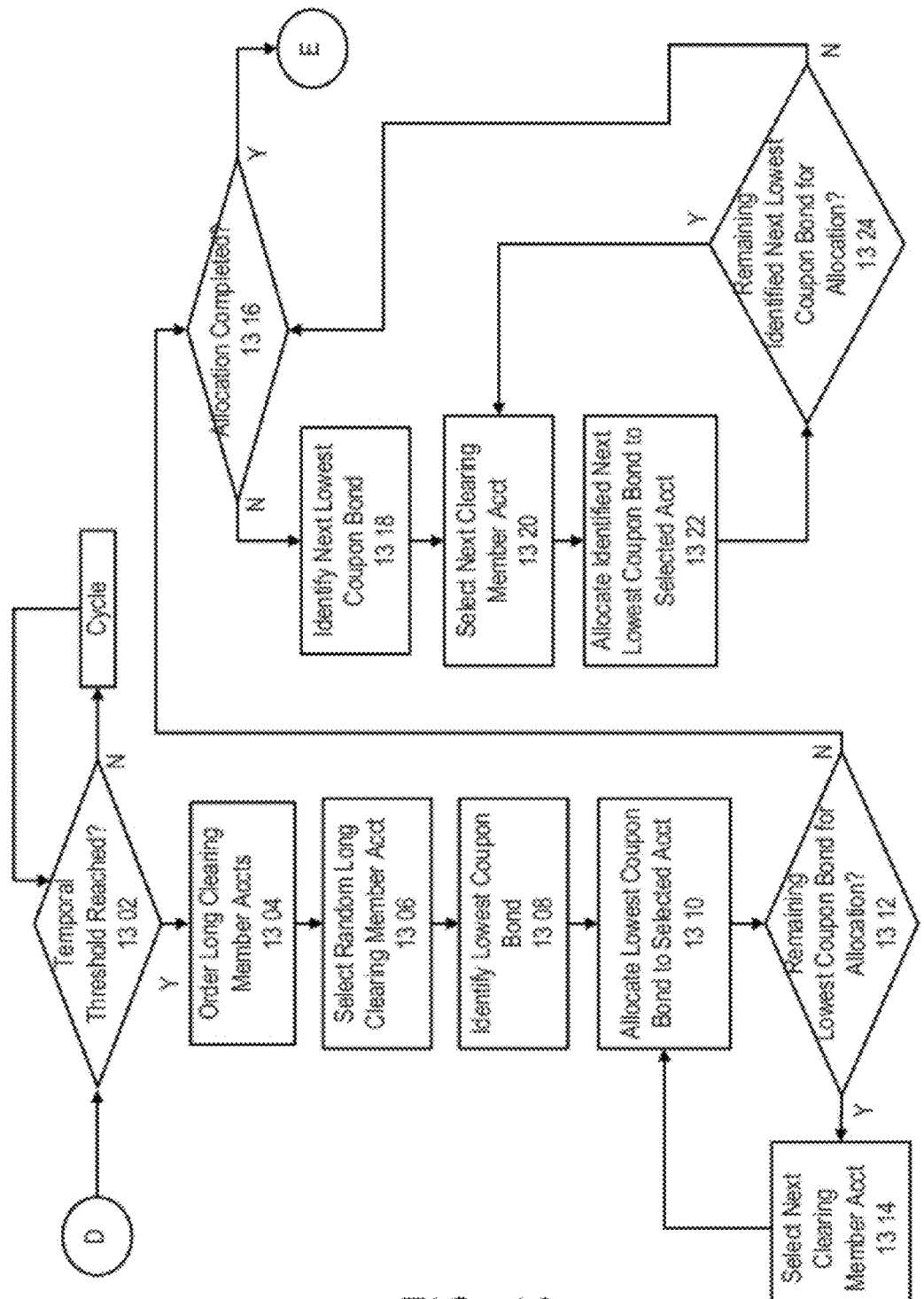
FIG. 13 is of a logic flow diagram illustrating aspects of a Matching/Allocation Component for some embodiments of the LITF ENGINE.

As illustrated by FIG. 13, in some embodiments of the LITF ENGINE, after a specified bond nomination deadline 1302 (and in some embodiment, prior to a specified subsequent time, e.g., 12:00 CT) or achievement of a like temporal threshold, the commodity management system may match deliveries in each issue with buyers in the long position pool (e.g., via a random strip algorithm and/or the like). In one such embodiment, long clearing member accounts may be ordered 1304, for example, listed in member mnemonic sequence, numeric first followed by alphabetic, and a starting account chosen at random 1306. Allocation of the lowest coupon bond 1308 commences 1310 with the selected mnemonic and progresses 1312 through the list of members' accounts 1314. When no further allocation of the lowest coupon bond can be made 1312, and the allocation is not completed 1316, the allocation continues 1320, 1322, 1324 with the next lowest coupon bond 1318. In some embodiments, bonds of equal coupon but different maturities may be nominated. Some implementations of such embodiments of the LITF ENGINE may be configured such that those bonds with the earliest maturity may be selected first. Other implementations of such embodiments of the LITF ENGINE may be configured such that those bonds with the latest maturity may be selected first. Yet other implementations of such embodiments of the LITF ENGINE may be configured based on contracts' specifications.

The example code below further illustrates the above aspects for one embodiment of the LITF ENGINE:

```
if (time >= TEMPORAL_DEADLINE) //if the time is >= the deadline
{
    //go through accounts
    //if an account is long_clearing
    //add it to the list of long clearing accounts
    for (i=0; i < NUM_ACCOUNTS; i++)
    {
        if (Accounts[i].long_clearing == TRUE)
        {
            LongClearingAccounts.AddAccount(Accounts[i]);
        }
    }
    //order the accounts by mnemonic
    Sort(LongClearingAccounts);
    //go through bonds
    //if a bond is nominated, add it to the list of nominated bonds
    for (i=0; i< NUM_BONDS; i++)
    {
        if (Bonds[i].is_nominated == TRUE)
        {
            NominatedBonds.AddBond(Bonds[i]);
        }
    }
    //sort the bonds first by coupon
    //sort again for maturity, preserving the previous coupon sort
    SortBondsByCoupon(NominatedBonds);
    SortBondsByMaturityPreserveCoupon(NominatedBonds);
    //pick a random account in the list
    selectedAccount = RandomNumber( );
    //while there are still bonds in the nominated list
    //put that bond into an account, starting with the first
    //selected account and progressing through the accounts
    //if the selectedAccount number reaches the size of the Accounts
    //i.e., if it reaches the end of the Accounts, start over at 0,
    //i.e., the beginning. Continue until the bonds are allocated
    while (NominatedBonds.Size( ) > 0)
    {
        Accounts[selectedAccount].bonds.AddBond
            (NominatedBonds.First( ));
        NominatedBonds.Delete( );
        NominatedBonds.Next( );
        selectedAccount++;
        if (selectedAccount == Accounts.Size( ))
            selectedAccount = 0;
    }
}
```

In some embodiments of the LITF ENGINE, once the allocation is completed 1316, the commodity management system may then create cash trades, which may be sent to PTFSC. In some embodiments, the Clearing Entity may act as a broker to each trade, as described below with respect to FIG. 14 and FIG. 15.

Figure 14:
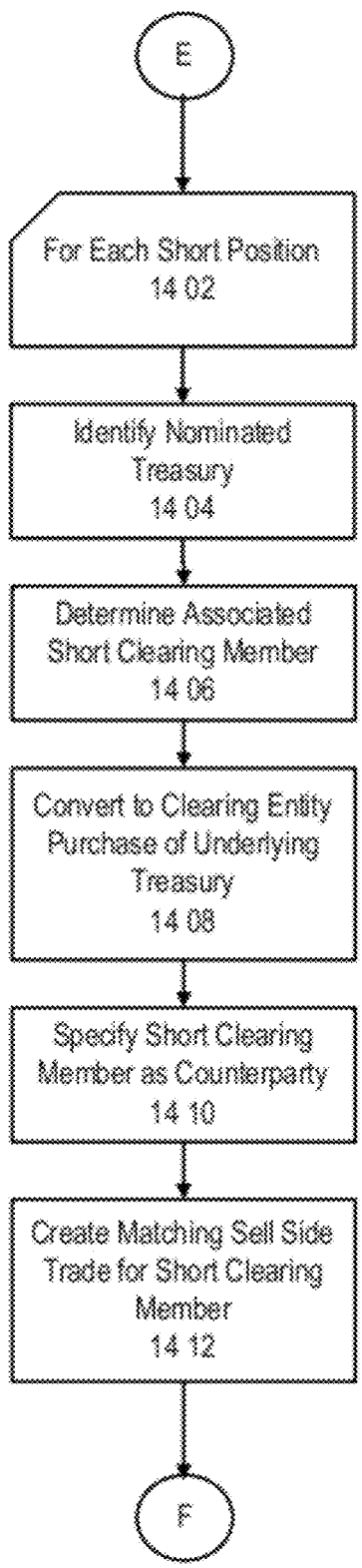
FIG. 14 is of a logic flow diagram illustrating aspects of a Short Position Conversion Component for some embodiments of the LITF ENGINE.

As illustrated in FIG. 14, in one implementation, each short position 1402 may be converted to a Clearing Entity purchase in the underlying treasury 1408 (as defined by the treasury nominated by the short position 1404). The short clearing member 1406 may be listed as the counterparty 1410. A matching sell side trade may be generated/created 1412 for the short clearing member (e.g., via PTFSC systems).

Figure 15:
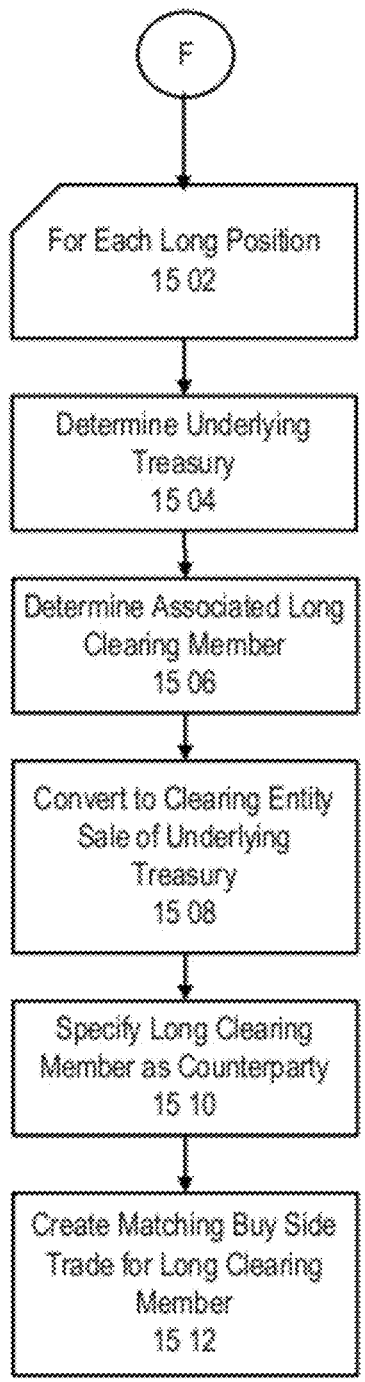
FIG. 15 is of a logic flow diagram illustrating aspects of a Long Position Conversion Component for some embodiments of the LITF ENGINE.

As illustrated in FIG. 15, in one implementation, for each long position 1502, the underlying treasury may be determined 1504 (e.g., as defined by the allocation algorithm discussed above), the associated long clearing member identified 1506, and the long position may be converted to a Clearing Entity sale in the underlying treasury 1508. The long clearing member may be listed/specified as the counterparty 1510, and PTFSC (and/or other) systems may create a matching buy side trade for the long clearing member 1512.

Figure 16A:
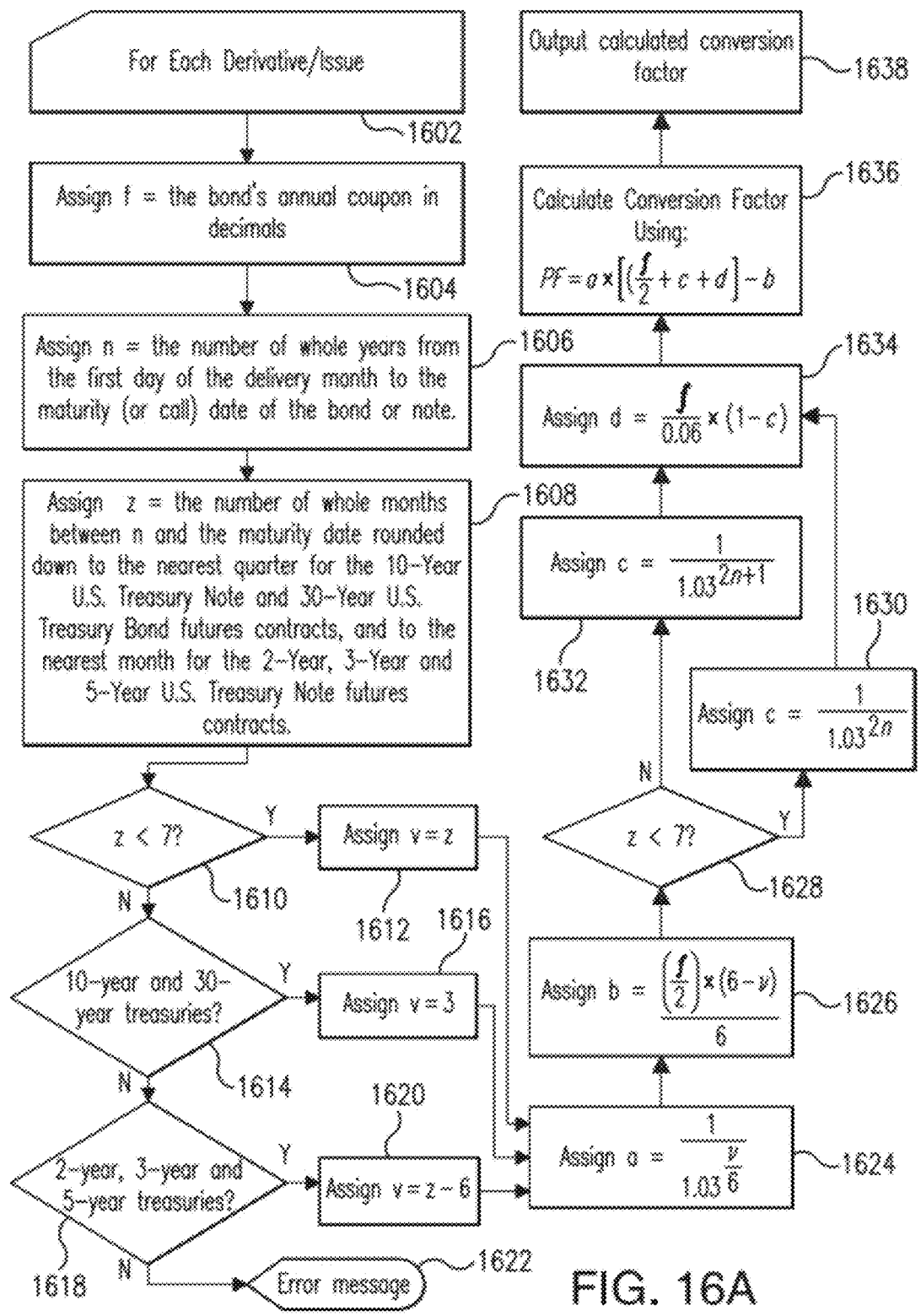
FIG. 16A is of a logic flow diagram illustrating aspects of a Conversion Factor Calculation Component for some embodiments of the LITF ENGINE.

FIG. 16A is of a logic flow diagram illustrating aspects of a Conversion Factor Calculation Component for some embodiments of the LITF ENGINE. In some embodiments, Conversion Factors may need to be calculated for each issue that is mapped to a derivative, consequently the calculation may need to be carried out when processing the Derivatives Mapped to Issues file. In some embodiments, any errors whilst performing the calculation may be reported as part of the Derivatives Mapped to Issues file processing.

In one implementation, the conversion factor for each derivative/issue 1602 may be calculated using the following formula:

$$PF = a \times \left[\left(\frac{f}{2} + c + d\right)\right] - b$$

where:
f=the bond's annual coupon in decimals 1604.
n=the number of whole years from the first day of the delivery month to the maturity (or call) date of the bond or note 1606.
z=is the number of whole months between n and the maturity date rounded down to the nearest quarter for the 10-Year U.S. Treasury Note and 30-Year U.S. Treasury Bond futures contracts, and to the nearest month for the 2-Year, 3-Year and 5-Year U.S. Treasury Note futures contracts 1608.
v=z if z<7, e.g., 1610 and 1612
3 if z≥7, for 10-year and 30-year treasuries, e.g., 1614 and 1616
z–6 if z≥7, for 2-year, 3-year and 5-year treasuries, e.g., 1618 and 1620
return an error message if z does not fit in any category 1622

$$a = \frac{1}{1.03^{\frac{v}{6}}}, \text{ e.g., } 1624$$

$$b = \frac{\left(\frac{f}{2}\right) \times (6 - v)}{6}, \text{ e.g., } 1626$$

$$c = \frac{1}{1.03^{\frac{2n}{}}} \text{ if } z < 7, \text{ e.g., } 1628 \text{ and } 1630$$

$$\frac{1}{1.03^{2n+1}} \text{ if } z \geq 7, \text{ e.g., } 1632$$

$$d = \frac{f}{0.06} \times (1 - c), \text{ e.g., } 1634$$

The conversion factor for each derivative/issue may be calculated using the following formula:

$$PF = a \times \left[\left(\frac{f}{2} + c + d\right)\right] - b, \text{ e.g., } 1636$$

In one implementation, the calculated conversion factor may be output for processing 1638.

FIGS. 16B-16E provide exemplary spreadsheets illustrating aspects of a Conversion Factor Calculation Component for some embodiments of the LITF ENGINE.

Figure 17A:
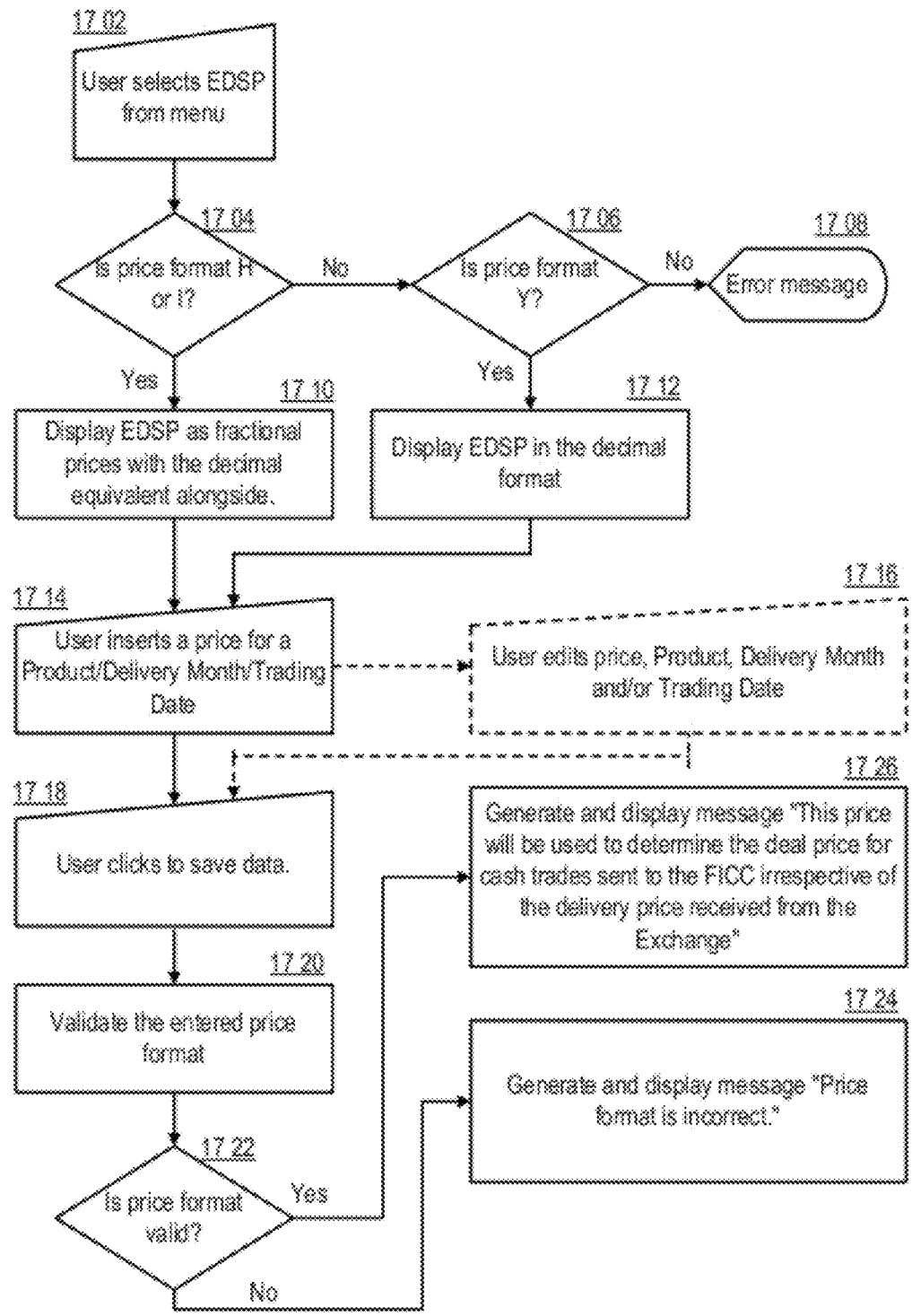
FIG. 17A is of a logic flow diagram illustrating aspects of a Settlement Prices Maintenance Component for some embodiments of the LITF ENGINE.

FIG. 17A is of a logic flow diagram illustrating aspects of a Settlement Prices Maintenance Component for some embodiments of the LITF ENGINE. In some embodiments, settlement prices may be extracted from the Delivery Position Notes file each day that positions are present and are stored on Bond Delivery System. However, if prices are already present on Bond Delivery System then the prices on the file may be ignored. The settlement price maintenance function may allow users to enter, add and amend prices. In some embodiments, Clearing Entity Operations users may be able to use the function providing it has been enabled on their user profile.

Figure 17B:
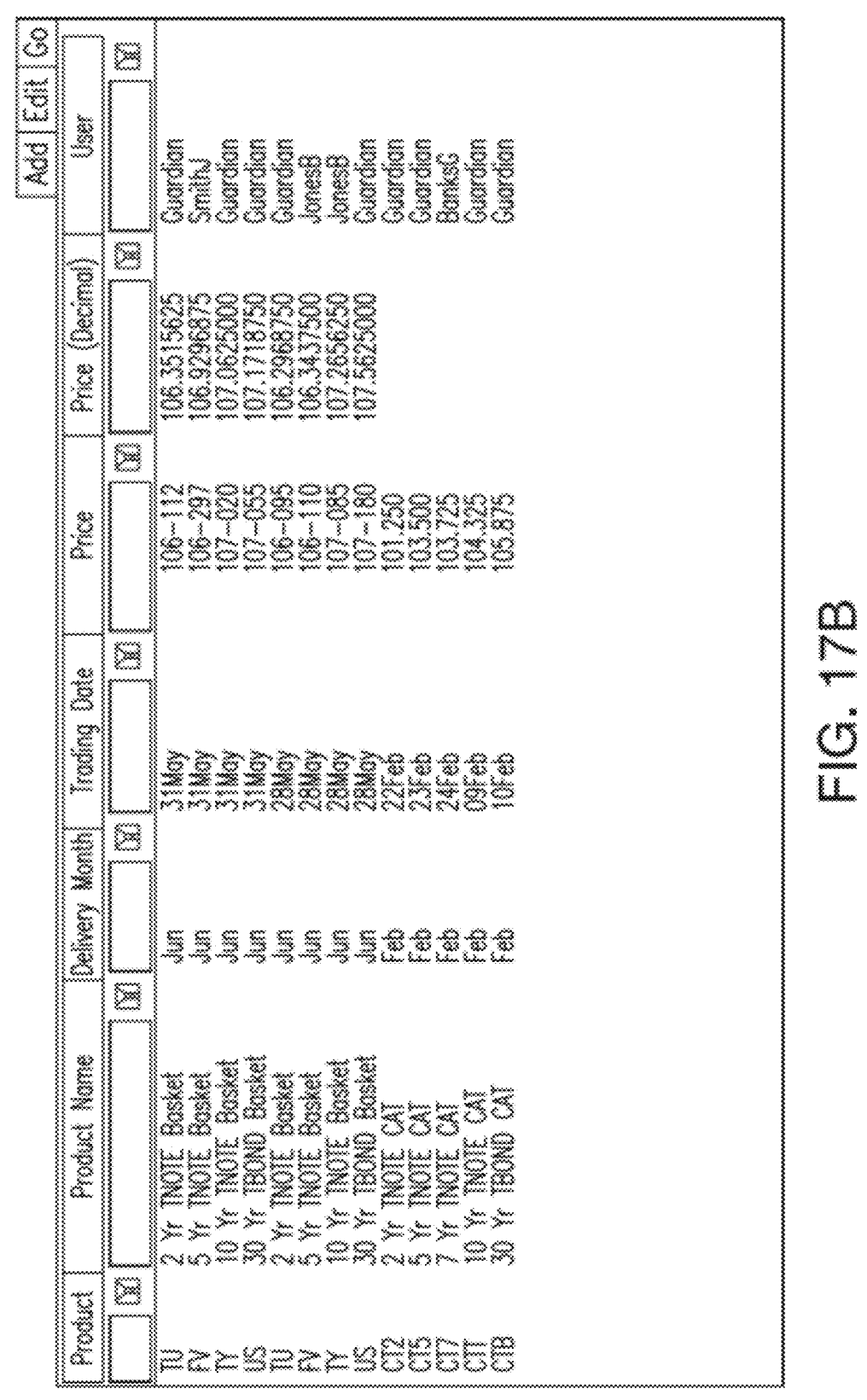

In one implementation, users may select EDSP from the interface menu 1702 (e.g., in FIG. 17B). For products where the price format is H or I 1704, the EDSPs may be displayed as fractional prices with the decimal equivalent alongside 1710. For products where the price format is Y 1706, the EDSP may be just be displayed in the decimal format 1712. For price format what is not H, I, or Y, the LITF ENGINE may generate an error message 1708. In one implementation, CAT products may use the Y format and may change to H or I format as per basket products. In some embodiments, users may click the Add button to insert a price for a Product/Delivery Month/Trading Date that does not currently exist 1714. Optionally, they may select a line and click the Edit button to change a price 1716. Users may save the data 1718 (e.g., FIG. 17C).

In some embodiments, the LITF ENGINE may validate if the entered price contains a correct format 1720. For example, for products that have a price format of I, the EDSP may contain a hyphen (-) preceded by 2 or 3 numeric digits and followed by 3 numeric digits, the first two of which may be in the range 00-31 and the last digit may be 0, 2, 5 or 7. For products that have a price format of H, the EDSP may contain a hyphen (-) preceded by 2 or 3 numeric digits and followed by 3 numeric digits, the first two of which may be in the range 00-31 and the last digit may be 0 or 5 For products that have a price format of Y, the EDSP may contain 2 or 3 numeric digits, followed by a decimal place and a number of numeric digits depending on the Tick Size Denominator for the Product/Delivery Month (1000=3 digits, 100=2 digits, 10=1 digit). In one implementation, the LITF ENGINE may not allow prices to be entered if the Cash trades file has already been produced.

Once users have clicked the Save button and the price entered passes all the validation checks 1722, they may be presented with the following message and asked to Confirm or Cancel: "This price will be used to determine the deal price for cash trades sent to the PTFSC irrespective of the delivery price received from the Exchange." Where prices are amended after delivery notices have been produced, then the LITF ENGINE may regenerate the cash trades data and delivery notices with a revised deal price. If the price entered does not pass the validation checks, the system may generate and display an error message, for example, "Price format is incorrect", 1724.

In some embodiments, the process that imports the two delivery notes may create settlement prices when they are already present for each Product/Delivery Month/Trading Date that is on the file when the prices on the file may be ignored. In one implementation, for the Intraday file, the Trading Date may be one business day less than the Business Date on the header. In another implementation, for the EOD file, the Trading date may be the Business Date on the header.

Figure 17C:
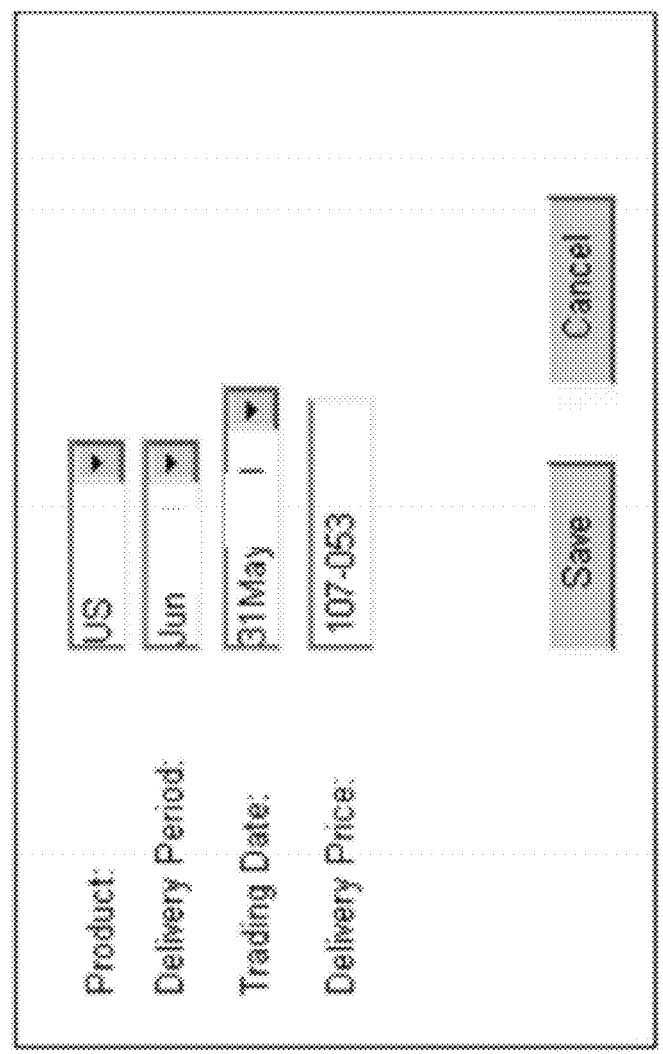
Figure 18E:
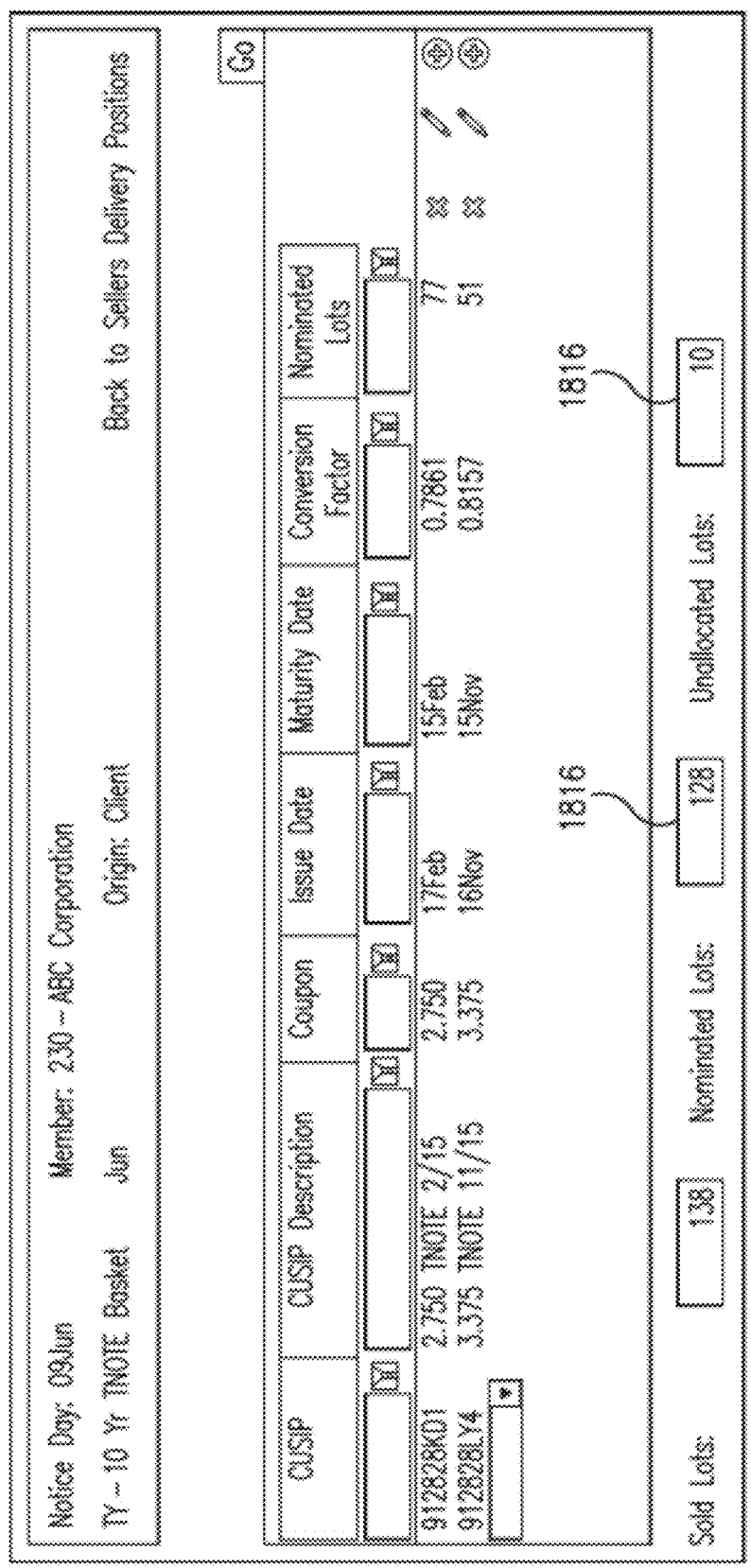

FIGS. 17B-17C provide screenshots of example user interfaces for an exemplary Settlement Prices Maintenance Component for some embodiments of the LITF ENGINE.

FIGS. 18A-18F provide screenshots of example user interfaces for an exemplary Sellers Issue Nomination Component for some embodiments of the LITF ENGINE. In some embodiments, the LITF ENGINE may allow members to enter, view and amend issues that are nominated against basket product sold positions that have been designated for delivery in CPS. In one implementation, CAT products may not be shown on this screen. In another implementation, the component may be made available to members and Clearing Entity Operations who may be able to act on members behalf.

In some embodiments, users may select Sellers Delivery Positions from the user interface menu. Box 1802 may be populated with the latest Notice Day. In one implementation, the previous date may be selected. In one implementation, members may only have access to their own positions 1804. In some embodiments, users may select one row and click on the View/Amend Nominations button 1806 to add 1808, amend, delete or view issue nominations. In one implementation, members may not be able to add, amend or delete issue nominations once the Sellers Issue Nomination deadline has passed. In another implementation, Clearing Entity Operations users may be able to add, amend or delete issue nominations after the Sellers Issue Nomination deadline has passed as long as the Allocation deadline has not passed. In some embodiments, validation may not allow a nomination to be added when all Sold Lots in the position have been nominated; an error message may be produced to notify the user. Users may enter CUSIP in box or select CUSIP from drop down list 1810. CUSIPs that already have nominations for the position may not be listed. Once CUSIP is selected, the issue details may be prompted 1812. Users may enter the number of lots and clicks save button 1814. Accordingly, lots totals 1816 may be updated. In some embodiments, validation may ensure that nominated lots plus lots entered do not exceed the sold lots for the position; an error message may be produced to alert the user. In some embodiments, as shown in FIG. 18F, to amend an issue nomination, users may select the Edit icon on the row to be amended, change the number of lots nominated and click the Save button. The Nominated and Unallocated Lots fields may then be updated. Validation may ensure that nominated lots plus amended lots do not exceed the sold lots for the position; an error message may be produced to alert the user. In some embodiments, to delete issue nominations, users may click the Delete icon (Red Cross) on the row to be deleted and the row may be removed. Nominated Lots and Unallocated Lots may be updated.

Figure 19:
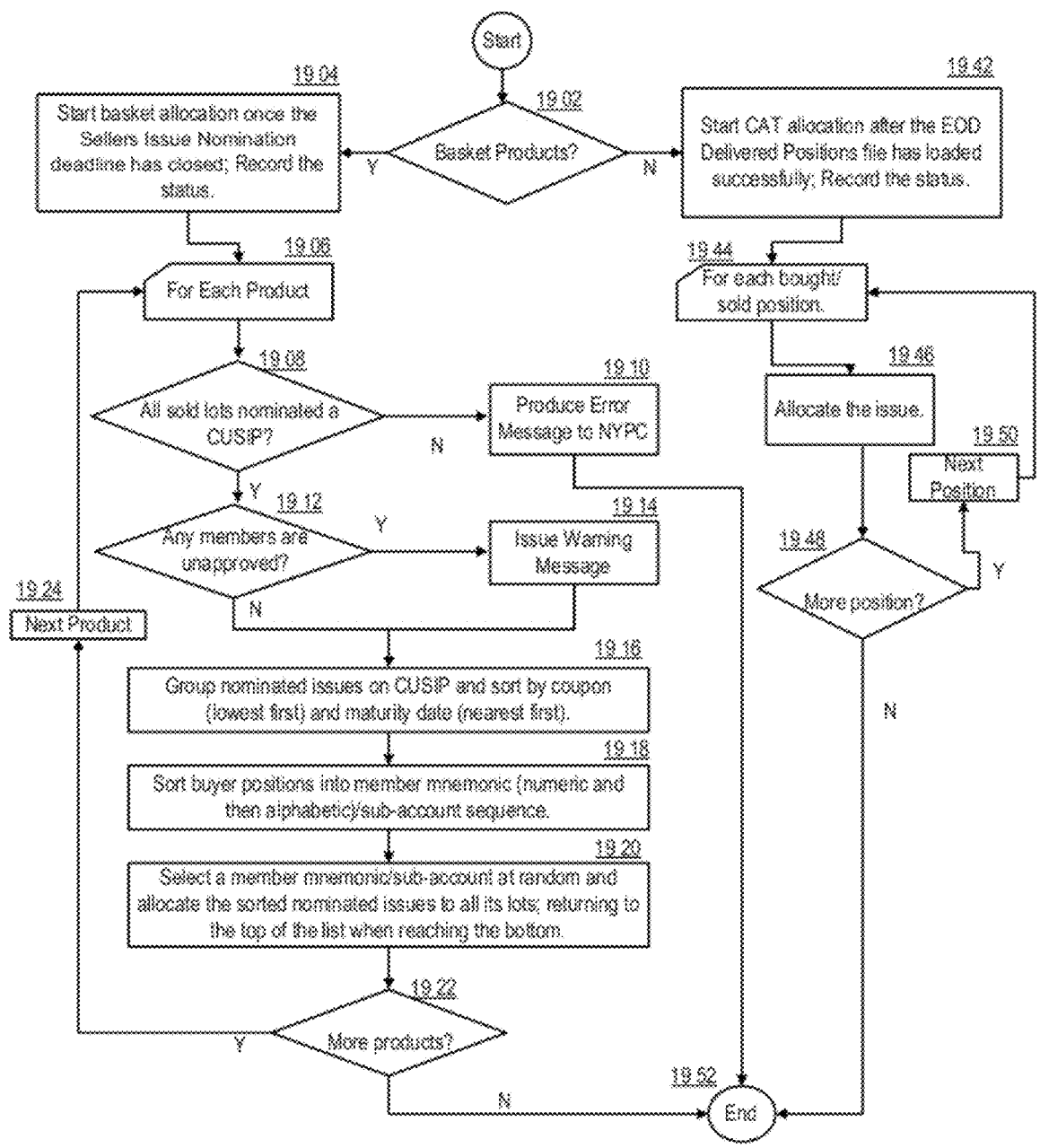
FIG. 19 is of a logic flow diagram illustrating aspects of a Issues Allocation Component for some embodiments of the LITF ENGINE.

FIG. 19 is of a logic flow diagram illustrating aspects of a Issues Allocation Component for some embodiments of the LITF ENGINE. In some embodiments, there may be two separate allocation processes. The LITF ENGINE may determine whether the products are basket treasure futures 1902. The basket allocation process may allocate issues nominated by sellers to buyers for basket products using a random strip algorithm 1904. The Currently Active Treasury ("CAT") allocation process where no algorithm is necessary as there may only be one issue delivered per product/delivery month hence the issue to be delivered for each product may be picked up from the derivatives mapped to issues entries in the database 1942. In some embodiments, this process may be initiated automatically but Clearing Entity Operations may have the ability to resubmit the process in the event of any issues with the original run. Progress status may be reported via the dashboard. In some embodiments, the process may run automatically once the deadline for the Sellers Issue Nomination has closed. Clearing Entity users may be able to change the deadline for individual members or for all members to facilitate late input of issue nominations.

In some embodiments, the allocation process may be carried out for each basket product independently 1906. Prior to the allocation being run, a check may be carried out to ensure that all sold lots on the Delivered Positions file have been nominated a CUSIP 1908. If the check fails, an error message may be produced to notify Clearing Entity of the failure and the reason e.g. "member nnn is delivering xxx lots of product yyy but has only nominated zzz lots" 1910. If any members are unapproved 1912, i.e. they have been set up automatically because they were present on the Delivered Positions file but had not previously been set up on Bond Delivery System, the LITF ENGINE may issue a warning message and continue processing. In some embodiments, the LITF ENGINE may group nominated issues on CUSIP and sort into the sequence 1916. For example, it may sort by coupon (lowest first), and/or, Maturity Date (nearest first), and/or the like. As a non-limiting example for illustration purpose, given the following nominated issues:

| Member Mnemonic | Sub-Account | Short Lots | Nominated Issue (Lots x CUSIP) |
|---|---|---|---|
| 100 | C | 15 | 6 x 912828GH7, 9 x 912828HA1 |
| 100 | H | 20 | 20 x 912828FY1 |
| 101 | H | 13 | 13 x 912828GH7 |
| 102 | C | 7 | 3 x 912828GH7, 4 x 912828HA1 | grouping and sorting them may result in the following:

| CUSIP | Coupon | Maturity Date | Lots |
|---|---|---|---|
| 912828FY1 | 4.625 | 15Nov20XX | 20 |
| 912828GH7 | 4.625 | 15Feb20XX | 22 |
| 912828HA1 | 4.75 | 15Aug2oXX | 13 |

In some embodiments, the buyer positions may be sorted into member mnemonic (numeric then alphabetic)/sub-account sequence 1918. For example:

| Member Mnemonic | Sub-Account | Long Lots |
|---|---|---|
| 200 | C | 8 |
| 201 | C | 7 |
| 201 | H | 25 |
| ABC | C | 10 |
| ABC | H | 5 |

A member mnemonic/sub-account may then be selected at random and the sorted nominated issues may be allocated to all the lots for the selected member mnemonic/sub-account 1920 before moving on to the next entry in the list. The LITF ENGINE may return to the top of the list when reaching the bottom 1924. For example, if 201 H is selected at random, it may result in the following allocation:

| Member Mnemonic | Sub-Account | Long Lots | Allocated Issue (Lots x CUSIP) |
|---|---|---|---|
| 201 | H | 25 | 20 x 912828Fy1, 5 x 912828GH7 |
| ABC | C | 10 | 10 x 912828GH7 |
| ABC | H | 5 | 5 x 912828GH7 |
| 200 | C | 8 | 2 x 912828GH7, 6 x 912828HA1 |
| 201 | C | 7 | 7 x 912828HA1 |

In some embodiments, the LITF ENGINE may record the status of the allocation process during processing so that it may be viewed on the dashboard. For example, the status may be Allocation Started, Allocation Failed, Allocation Successfully Completed. The business date, processing date and processing time may be recorded with the status.

In some embodiments, the CAT products allocation process may run immediately after the EOD Delivered Positions file has loaded successfully 1942. Sellers may not nominate issues for CAT products as there is only one issue per product/delivery period. Therefore, for each bought and sold position on the file 1944, the LITF ENGINE may allocate the issue 1946 that is mapped to the product/delivery period in the database. A non-limiting example of records on EOD Delivered Positions file may be:

| Product | Member Mnemonic | Sub-Account | Short Lots | Long Lots |
|---|---|---|---|---|
| CT5 | 300 | C | 10 | |
| CT5 | 300 | H | 5 | 17 |
| CT2 | 301 | C | | 6 |
| CT2 | 301 | H | 1 | 3 |
| CT5 | 301 | H | 8 | |
| CT5 | 302 | H | | 6 |
| CT2 | DEF | C | 8 | |

A non-limiting example of issues mapped to Deliverable may be:

| Product | Delivery Period | CUSIP |
|---|---|---|
| CT2 | Feb 20XX | 912828MM9 |
| CT5 | Feb 20 XX | 912828MA5 |
| CT7 | Feb 20 XX | 912828LZ1 |
| CTT | Feb 20 XX | 912828LY4 |
| CTB | Feb 20 XX | 912810QD3 |

A non-limiting example of issues allocated to Buyers and Sellers may be:

| Product | Member Mnemonic | Sub-Account | Short Lots | Long Lots | Issue |
|---|---|---|---|---|---|
| CT5 | 300 | C | 10 |  | 912828MA5 |
| CT5 | 300 | H | 5 | 17 | 912828MA5 |
| CT2 | 301 | C |  | 6 | 912828MM9 |
| CT2 | 301 | H | 1 | 3 | 912828MM9 |
| CT5 | 301 | H | 8 |  | 912828MA5 |
| CT5 | 302 | H |  | 6 | 912828MA5 |
| CT2 | DEF | C | 8 |  | 912828MM9 |

In some embodiments, the LITF ENGINE may record the status of the allocation process during processing so that it may be viewed on the dashboard. The status may be Allocation Started, Allocation Failed, Allocation Successfully Completed. The business date, processing date and processing time may be recorded with the status.

Figure 20A:
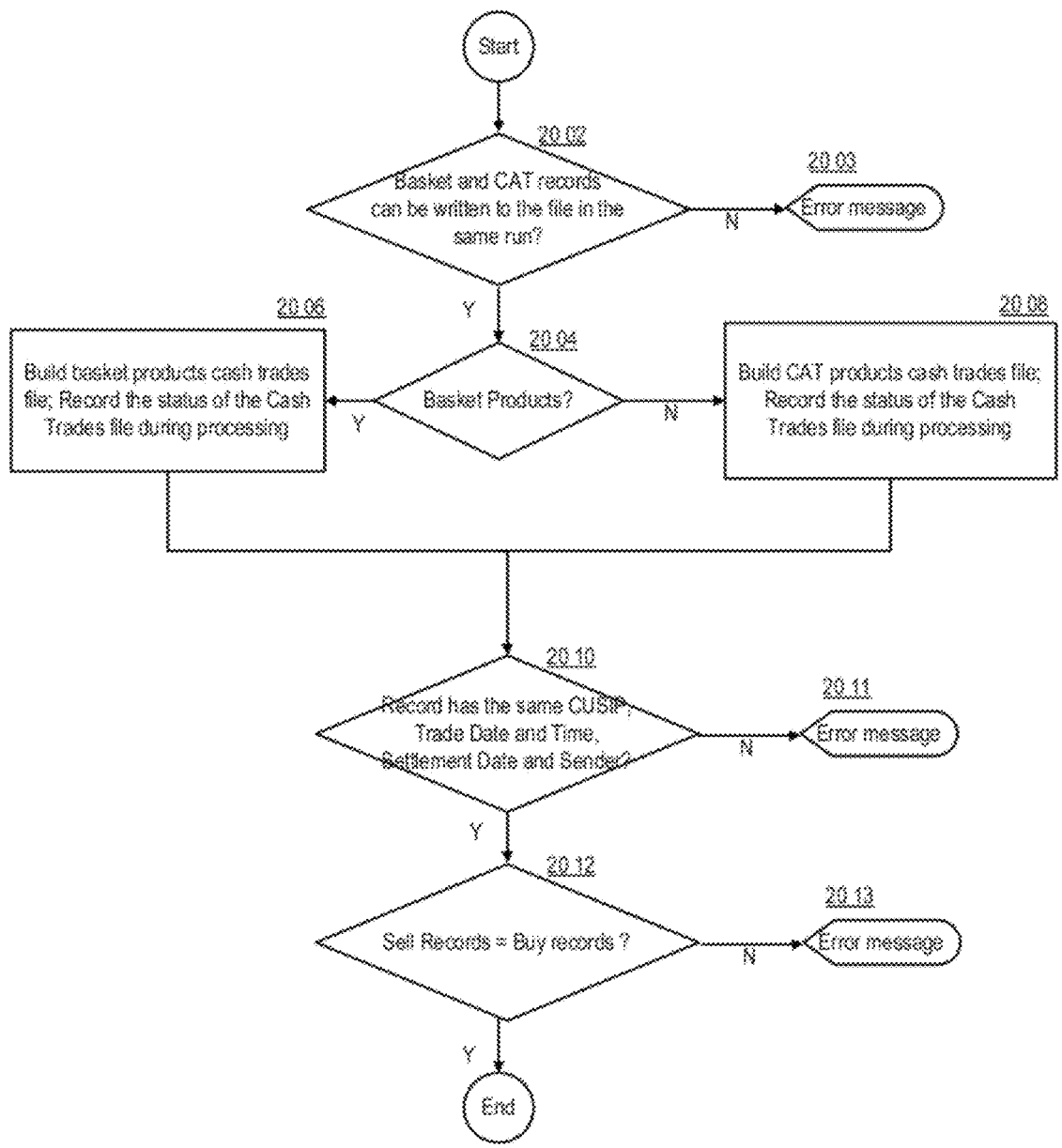
FIG. 20A is of a logic flow diagram illustrating aspects of a Cash Trades File Component for some embodiments of the LITF ENGINE.

FIG. 20A is of a logic flow diagram illustrating aspects of a Cash Trades File Component for some embodiments of the LITF ENGINE. In some embodiments, the LITF ENGINE may check if Basket and CAT records may be written to the file in the same run. In some embodiments, the cash trades file generation may run each day immediately after the CAT allocation successfully completes. It may pick up the results from the Basket allocation 2006 and the CAT allocation 2008 and create one Cash Trades file. It may cater for PTFSC holidays i.e. days when the PTFSC are on holiday but Clearing Entity remains open. The LITF ENGINE may determine if every record with the same Broker Reference Number has the same CUSIP, Trade Date and Time, Settlement Date and Sender 2010. If the data is different, the LITF ENGINE may generate and display an error message 2011. The LITF ENGINE may also determine if the total quantity for all the sell records (e.g., Trade Type=SELL) equals the total quantity for all the buy records (e.g., Trade Type=BUY) 2012. If the quantities are different, the LITF ENGINE may generate and display an error message 2013.

In some embodiments, the LITF ENGINE may record the status of the Cash Trades file during processing so that it may be viewed on the dashboard: e.g., Cash Trades File Started, Cash Trades File Failed, Cash Trades File Successfully Created, No Cash Trades File today—PTFSC Holiday, Cash Trades File Successfully Created With Two Days Trades. The business date, system date and time may be recorded along with the status.

In some embodiments, when the current business date is an PTFSC holiday, Cash Trade records may be built in the database but a file may not be created. When the previous business day is an PTFSC holiday, the LITF ENGINE may merge the Cash Trade records built today with previous day(s) records on the database.

In some embodiments, the Clearing Entity users may be able to view progress on the Dashboard.

As non-limiting examples for illustrating purpose only, for Basket Products allocation, the Delivered Positions with Associated CUSIP may be: Notice Day=11 December:

| Product | Delivery Period | Member Mnemonic | Member FICC ID | Member NYPC ID | Sub-Account | Buy/Sell | Lots | CUSIP |
|---|---|---|---|---|---|---|---|---|
| TY | December | 100 | 6601 | 801 | H | S | 20 | 912828FY1 |
| TY | December | 201 | 6601 | 830 | H | B | 20 | 912828FY1 |
| TY | December | 100 | 6601 | 800 | C | S | 6 | 912828GH7 |
| TY | December | 101 | 6682 | 850 | H | S | 13 | 912828GH7 |
| TY | December | 102 | 6698 | 882 | C | S | 3 | 912828GH7 |
| TY | December | 201 | 6601 | 830 | H | B | 5 | 912828GH7 |
| TY | December | ABC | 6722 | 844 | C | B | 10 | 912828GH7 |
| TY | December | ABC | 6722 | 845 | H | B | 5 | 912828GH7 |
| TY | December | 200 | 6500 | 811 | C | B | 2 | 912828GH7 |
| TY | December | 100 | 6601 | 800 | C | S | 9 | 912828HA1 |
| TY | December | 102 | 6698 | 882 | C | S | 4 | 912828HA1 |
| TY | December | 200 | 6500 | 811 | C | B | 6 | 912828HA1 |
| TY | December | 201 | 6505 | 823 | C | B | 7 | 912828HA1 |

The Conversion Factors may be:

| Product | Delivery Period | CUSIP | Conversion Factor |
|---|---|---|---|
| TY | Dec | 912828FY1 | 0.9245 |
| TY | Dec | 912828GH7 | 0.9223 |
| TY | Dec | 912828HA1 | 0.9254 |

The Delivery Price may be:

| Product | Delivery Period | Trading Day | Delivery Price | Price (Decimal Equivalent) |
|---|---|---|---|---|
| TY | Dec09 | 10Dec09 | 102-085 | 102.2656250 | and/or as shown in FIGS. 20B-20C.

In some embodiments, the LITF ENGINE may generate fields for the cash trades file based on the process and the data. Fields that may be constant for every run may not be shown as they are described in the file specification, in the following non-limiting example. One or more records may be produced for each record produced by the allocation process.

| Message Header (see file spec) | Derivation |
|---|---|
| Password | Always 9798 |
| Sender | This is the FICC ID for the NYPC i.e. 00009798 |
| Senders Reference | Format yymmddXnnnnnn where yymmdd is the Notice day, X = B for basket and C for CAT, nnnnnn is a sequence number for each record produced starting at 000001. Note that multiple records may need to be produced for one position if the quantity exceeds a threshold - see Quantity derivation. |
| Master Reference Number | same as Senders Reference |
| Broker Reference Number | Format yymmddXccccccccc where yymmdd is the Notice day, X = B for basket and C for CAT, ccccccccc is the CUSIP |
| Trade Date & Time | Format YYYYMMDDHHMMSS where YYYYMMDD is the Notice Day, HHMMSS is the time that this process started. |
| Settlement Date | The next business day excluding FICC holidays, unless the current business date is an FICC holiday in which case settlement date is the business day after next excluding FICC holidays. |
| Deal Price | For Baskets: Delivery price (for the previous business date) * CUSIP Conversion Factor (obtained from Product/Delivery Period/CUSIP) rounded to 7 decimal places Example: 102.265625 * 0.9223 = 94.3195859 (94,3195859 in SWIFT format). For CATs: Delivery Price (for the current business date) rounded to 7 decimal places. Note that any prices expressed as fractional (currently the basket prices but CATs may change to this format) should be converted to decimal |
| Trade Type | Reversed from the records produced by the allocation process. Hence "SELL" if the member is a buyer and "BUYT" if the member is a seller. |
| Party = Buyer | The FICC ID of the member when the member is a seller |
| Party = Buyers Executing Firm | When the member is a seller then the NYPC ID for the member/sub-account |
| Party = Seller | The FICC ID of the member when the member is a buyer |
| Party = Sellers Executing Firm | When the member is a buyer then the NYPC ID for the member/sub-account |
| Quantity | Nominal Value * Lots. The nominal value is held as a configuration item per product and is 100,000 for all products apart from the 2 year TNOTE basket and CAT which is 200,000. Example: 100,000 * 6 = 600000. If this field exceeds the MAXIMUM_LOCKIN_SIZE for the product (currently set to 50,000,000) then two or more records need to be produced none of which must have a quantity exceeding the MAXIMUM_LOCKIN_SIZE. For example if quantity = 120,000,000 and MAXIMUM_LOCKIN_SIZE is 50,000,000 then 3 records would be produced, two with quantity of 50,000,000 and a third with a quantity of 20,000,000. MAXIMUM_LOCKIN_SIZE is set up as a configuration item per product. |
| Security Identifier | CUSIP |

50

As non-limiting examples for illustrating purpose only, for CAT Products allocation, the Delivered Positions with Associated CUSIP may be: Notice Day=19 February:

| Product | Delivery Period | Member Mnemonic | Member FICC ID | Member NYPC ID | Sub-Account | Buy/Sell | Lots | CUSIP |
|---|---|---|---|---|---|---|---|---|
| CT2 | February | 301 | 6601 | 401 | H | S | 1 | 912828MM9 |
| CT2 | February | DEF | 6508 | 432 | C | S | 8 | 912828MM9 |
| CT2 | February | 301 | 6601 | 402 | C | B | 6 | 912828MM9 |
| CT2 | February | 301 | 6601 | 401 | H | B | 3 | 912828MM9 |
| CT5 | February | 300 | 6541 | 410 | C | S | 10 | 912828MA5 |
| CT5 | February | 300 | 6541 | 411 | H | S | 5 | 912828MA5 |
| CT5 | February | 301 | 6601 | 401 | H | S | 8 | 912828MA5 |
| CT5 | February | 300 | 6541 | 411 | H | B | 17 | 912828MA5 |
| CT5 | February | 302 | 6580 | 420 | H | B | 6 | 912828MA5 |

The Delivery Price may be:

| Product | Delivery Period | Delivery Price |
|---------|-----------------|----------------|
| CT2 | Feb10 | 105.625 |
| CT5 | Feb10 | 104.775 | and/or as shown in FIGS. 20D-20E.

Some embodiments of the Cash Trades File Component may be carried out through the Bond Delivery System ("BDS").

Figure 21A:
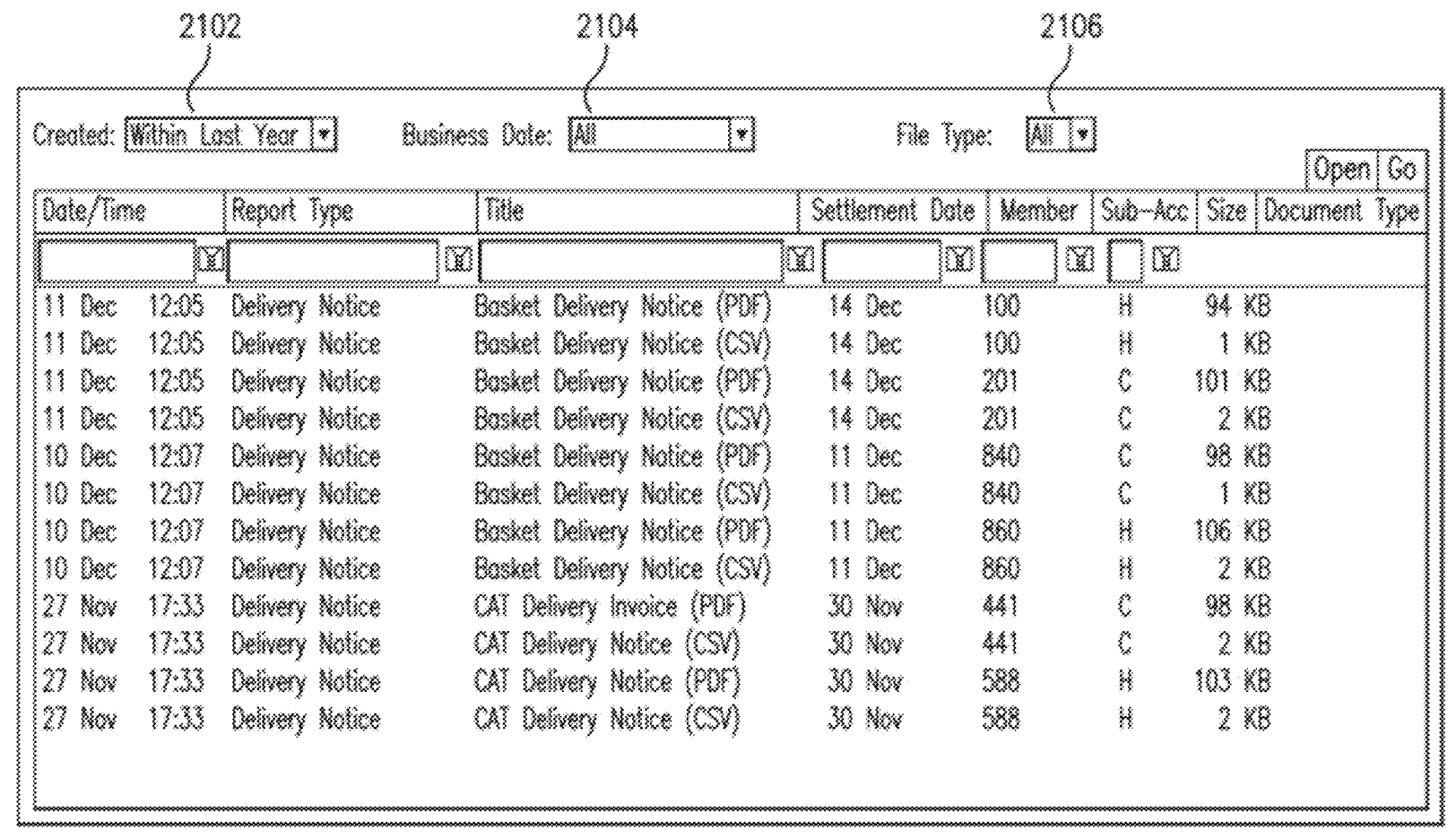

FIG. 21A provides an exemplary screenshot of the user interface of the Members Delivery Notification Component ("MDNC") in some embodiments of the LITF ENGINE. In some embodiments, the LITF ENGINE may produce .pdf and/or .csv format Delivery Notices for members who have delivered or taken delivery of Treasury Bonds or Treasury Notes in fulfillment of one or more futures contract(s). Separate Notices may be produced for Basket and CAT products. In one implementation, Clearing Entity users may be able to view members Delivery Notices. In one implementation, members may only be able to view their own Delivery Notices whereas Clearing Entity users may be able to view all members reports.

In some embodiments, the notification process may start immediately after the Baskets Allocation process for Basket products, and for CAT products, it may start immediately after the Cash Trades file has been produced. Delivery Notices in .pdf and .csv format may be produced for each member who is delivering or receiving security issues. The basket process may be re-run for all products if the delivery price is amended for any product in which case all output from the previous run may be deleted and replaced by the output from the rerun. As illustrated in FIG. 21A, users may select Reports/Document List from the menu in order to view their reports. Users may select reports that were created at different times, e.g., ALL, Today, Within Last Week, Within Last Month, etc., 2102. Users may also select all or a specific business date 2104. Users may also select different file types, e.g., csv, pdf, and/or text, 2106. In one implementation, users may highlight a row and click the Open button to view a report. If a .pdf report is selected, the report may be opened in Adobe Acrobat. If a .csv file is selected then the user may be prompted to Open, Save or Cancel the operation. In some embodiments, the LITF ENGINE may record the status of each delivery notice function during processing, e.g., Process Started, Process Failed, Process Successfully Completed. The business date, system date and system time may be recorded with the status.

FIGS. 21B-21C provide exemplary notification reports in the MDNC component in some embodiments of the LITF ENGINE.

LITF ENGINE Controller

Figure 22:
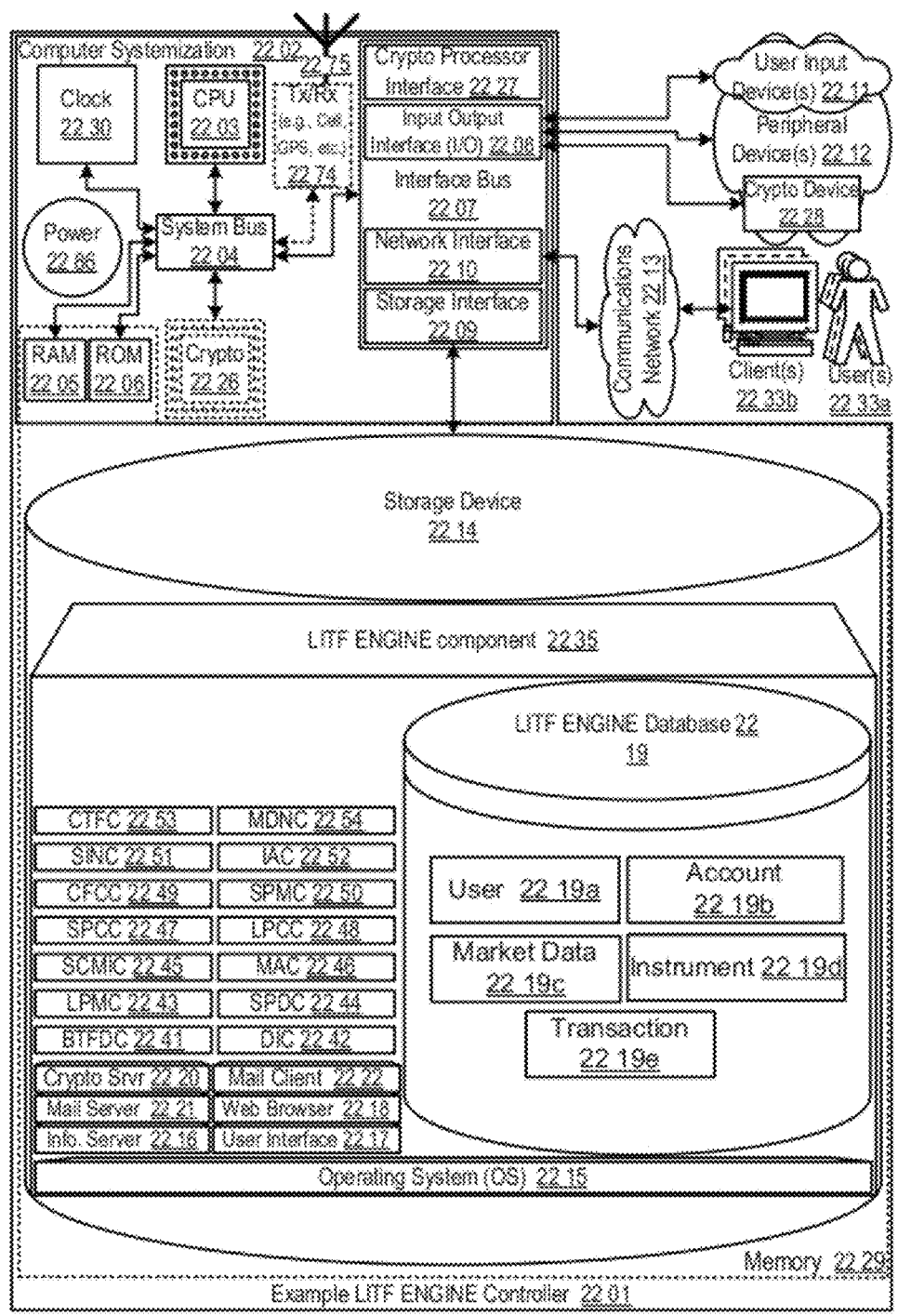
FIG. 22 is of a block diagram illustrating embodiments of the LITF ENGINE controller.

FIG. 22 illustrates inventive aspects of a LITF ENGINE controller 2201 in a block diagram. In this embodiment, the LITF ENGINE controller 2201 may serve to aggregate, process, store, search, serve, identify, instruct, generate, match, and/or facilitate interactions with a computer through secure finance, trading, and/or data management technologies, and/or other related data.

Typically, users, which may be people and/or other systems, may engage information technology systems (e.g., computers) to facilitate information processing. In turn, computers employ processors to process information; such processors 2203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the LITF ENGINE controller 2201 may be connected to and/or communicate with entities such as, but not limited to: one or more users from user input devices 2211; peripheral devices 2212; an optional cryptographic processor device 2228; and/or a communications network 2213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The LITF ENGINE controller 2201 may be based on computer systems that may comprise, but are not limited to, components such as: a computer systemization 2202 connected to memory 2229.

Computer Systemization

A computer systemization 2202 may comprise a clock 2230, central processing unit ("CPU(s)" and/or "processor(s)" (these terms are used interchangeably throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother)board(s) 2202 having conductive and/or otherwise transportive circuit pathways through which instructions (e.g., binary encoded signals) may travel to effect communications, operations, storage, etc. Optionally, the computer systemization may be connected to an internal power source 2286. Optionally, a cryptographic processor 2226 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the LITF ENGINE controller and beyond through various interfaces. Should processing requirements dictate a greater amount speed and/or capacity, distributed processors (e.g., Distributed LITF ENGINE), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the LITF ENGINE may be achieved by implementing a microcontroller such as CAST's R8051XC2 microcontroller; Intel's MCS 51 (i.e., 8051 microcontroller); and/or the like. Also, to implement certain features of the LITF ENGINE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the LITF ENGINE component collection (distributed or otherwise) and/or features may be implemented via the microprocessor and/or via embedded components; e.g., via ASIC, coprocessor, DSP, FPGA, and/or the like. Alternately, some implementations of the LITF ENGINE may be implemented with embedded components that are configured and used to achieve a variety of features or signal processing.

Depending on the particular implementation, the embedded components may include software solutions, hardware solutions, and/or some combination of both hardware/software solutions. For example, LITF ENGINE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the LITF ENGINE features. A hierarchy of programmable interconnects allow logic blocks to be interconnected as needed by the LITF ENGINE system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the LITF ENGINE may be developed on regular FPGAs and then migrated into a fixed version that more resembles ASIC implementations. Alternate or coordinating implementations may migrate LITF ENGINE controller features to a final ASIC instead of or in addition to FPGAs. Depending on the implementation all of the aforementioned embedded components and microprocessors may be considered the "CPU" and/or "processor" for the LITF ENGINE.

Power Source

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the LITF ENGINE thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface Adapters

Interface bus(ses) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2210 may accept, communicate, and/or connect to a communications network 2213. Through a communications network 2213, the LITF ENGINE controller is accessible through remote clients 2233*b* (e.g., computers with web browsers) by users 2233*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed LITF ENGINE), architectures may similarly be employed to pool, load balance, and/or otherwise increase the communicative bandwidth required by the LITF ENGINE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2211 may be card readers, dongles, finger print readers, gloves, graphics tablets, joysticks, keyboards, mouse (mice), remote controls, retina readers, trackballs, trackpads, and/or the like.

Peripheral devices 2212 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the LITF ENGINE controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the LITF ENGINE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the LITF ENGINE controller and/or a computer systemization may employ various forms of memory 2229. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 2229 will include ROM 2206, RAM 2205, and a storage device 2214. A storage device 2214 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the LITF ENGINE component(s) 2235; and/or the like (i.e., collectively a component collection). These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

Operating System

The operating system component 2215 is an executable program component facilitating the operation of the LITF ENGINE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the LITF ENGINE controller to communicate with other entities through a communications network 2213. Various communication protocols may be used by the LITF ENGINE controller as a subcarrier transport mechanism for interaction, such as, but not limited to: multicast, TCP/IP, UDP, unicast, and/or the like.

Information Server

An information server component 2216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the LITF ENGINE controller based on the remainder of the HTTP request. For example, a request such as http://

123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the LITF ENGINE database 2219, operating systems, other program components, user interfaces, Web browsers, and/or the like.

Access to the LITF ENGINE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the LITF ENGINE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the LITF ENGINE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2218 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the LITF ENGINE enabled nodes. The combined application may be nugatory on systems employing standard Web browsers.

Mail Server

A mail server component 2221 is a stored program component that is executed by a CPU 2203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the LITF ENGINE.

Access to the LITF ENGINE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the LITF ENGINE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the LITF ENGINE component to engage in secure transactions if so desired. The cryptographic component facilitates the secure accessing of resources on the LITF ENGINE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The LITF ENGINE Database

The LITF ENGINE database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the LITF ENGINE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the LITF ENGINE database is implemented as a data-structure, the use of the LITF ENGINE database 2219 may be integrated into another component such as the LITF ENGINE component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219a-e. A user table 2219a includes fields such as, but not limited to: an user_id, user_authorization, user_status, user_profile, user_instruments, member_id, member_account, customer_id, customer_account, and/or the like. The user table may support and/or track multiple entity accounts on a LITF ENGINE. An account table 2219b includes fields such as, but not limited to: an account_id, account_authorization, account_status, account_profile, account_instruments, and/or the like. A market data table 2219c includes fields such as, but not limited to: market_data_feed_ID, asset_ID, asset_symbol, asset_name, spot_price, bid_price, ask_price, contract_info, and/or the like; in one embodiment, the market data table is populated through a market data feed (e.g., Bloomberg's PhatPipe, Dun & Bradstreet, Reuter's Tib, Triarch, Exchange Entity market data feed, etc.), for example, through Microsoft's Active Template Library and Dealing Object Technology's real-time toolkit Rtt.Multi. A instrument table 2219d includes fields such as, but not limited to: instrument_id, instrument_details, instrument_specification, instrument_term, and/or the like. A transaction table 2219e includes fields such as, but not limited to: transaction_id, transaction_parties, transaction_profile, transaction_details, transaction_instrument, transaction_status, and/or the like.

In one embodiment, the LITF ENGINE database may interact with other database systems. For example, employing a distributed database system, queries and data access by search LITF ENGINE component may treat the combination of the LITF ENGINE database, an integrated data security layer database as a single database entity.

In one embodiment, user programs may contain various user interface primitives, which may serve to update the LITF ENGINE. Also, various accounts may require custom database tables depending upon the environments and the types of clients the LITF ENGINE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219a-e. The LITF ENGINE may be configured to keep track of various settings, inputs, and parameters via database controllers.

The LITF ENGINE database may communicate to and/or with other components in a component collection, including itself, and/or facilities of the like. Most frequently, the LITF ENGINE database communicates with the LITF ENGINE component, other program components, and/or the like. The database may contain, retain, and provide information regarding other nodes and data.

The LITF ENGINEs

The LITF ENGINE component 2235 is a stored program component that is executed by a CPU. In one embodiment, the LITF ENGINE component incorporates any and/or all combinations of the aspects of the LITF ENGINE that was discussed in the previous figures. As such, the LITF ENGINE affects accessing, obtaining and the provision of information, services, transactions, and/or the like across various communications networks.

The LITF ENGINE transforms membership and product code synchronization data, prices & options settlement data, position snapshots data, expiry positions (cash trades) data, daily mark-to-market cashflow data and, periodic (e.g., monthly) trading & clearing fees data inputs via LITF ENGINE components Benchmark Treasury Futures Delivery Component ("BTFDC") 2241, Delivery Initiation Component ("DIC") 2242, Long Position Maintenance Component ("LPMC") 2243, Short Position Delivery Component ("SPDC") 2244, Short Clearing Member Initiation Component ("SCMIC") 2245, Matching/Allocation Component ("MAC") 2246, Short Position Conversion Component ("SPCC") 2247, Long Position Conversion Component ("LPCC") 2248, Conversion Factor Calculation Component ("CFCC") 2249, Settlement Prices Maintenance Component ("SPMC") 2250, Sellers Issue Nomination Component ("SINC") 2251, Issues Allocation Component ("IAC") 2252, Cash Trades File Component ("CTFC") 2253, Members Delivery Notification Component ("MDNC") 2254, into transaction processing outputs.

The LITF ENGINE components enable the implementation, configuration, distribution, customization, and/or the like and use of the LITF ENGINE.

The LITF ENGINE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the LITF ENGINE server employs a cryptographic server to encrypt and decrypt communications. The LITF ENGINE component may communicate to and/or with other components in a component collection, including itself, and/or facilities of the like. Most frequently, the LITF ENGINE component communicates with the LITF ENGINE database, operating systems, other program components, and/or the like. The LITF ENGINE may contain, communicate, generate, obtain, and/or provide program component, system, user, and/or data communications, requests, and/or responses.

Distributed LITF ENGINEs

The structure and/or operation of any of the LITF ENGINE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the LITF ENGINE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and improve over previous works, the application is directed to APPARATUSES, METHODS AND SYSTEMS FOR A LOCKED-IN TRADE FACILITATION ENGINE. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a LITF ENGINE individual and/or enterprise user, database configuration and/or relational model, data type, data transmission and/or network framework, syntax structure, and/or the like, various embodiments of the LITF ENGINE, may be implemented that enable a great deal of flexibility and customization. For example, aspects of the LITF ENGINE may be adapted for institutional or independent exchanges, and/or web-based services. While various embodiments and discussions of the LITF ENGINE have been directed to implementations in exchanges and financial institutions, however, it is to be understood that the embodiments described herein may be readily configured and/or customized for a wide variety of other applications and/or implementations.

What is claimed is:

1. A processor-implemented method for facilitating delivery of open futures positions into currency-denominated fixed income market positions, comprising:
    receiving and maintaining, by at least one processing device comprising memory and at least one processor executing instructions stored in the memory, data pertaining to cleared open interests, wherein the cleared open interests comprise interests that remain open after delivery expiration; and
    automatically submitting the cleared open interests as locked-in trades in an underlying currency-denominated fixed income instrument, comprising:
        receiving at the at least one processing device from an exchange member an instrument nomination for each open interest representing a short position, the instrument nomination specifying the underlying currency-denominated fixed income instrument that is to be delivered by a member;
        determining, by the at least one processing device, one or more long positions that will take delivery of one or more short positions represented by the nominated instruments for each member, comprising:
            determining a trading volume assigned to each trading date for each exchange member by:
                sorting a set of volumes associated with long positions by trading date, and
                selecting, starting with a latest trading date, each trading date sequentially until the long position for that member has been satisfied;
            grouping long positions by trading date; and
            adding long positions for each trading date to the pool of long positions until the total long positions satisfy the total short positions on a trading date pro-rata basis responsive to a total volume of the trading date being greater than required;
        converting, by that at least one processing device, the one or more short positions to at least one locked-in trade comprising a purchase by a clearing house and sale by the exchange member in the underlying currency-denominated fixed income instrument corresponding to each of the short positions;
        converting, by the at least one processing device, the one or more long positions to at least one other locked-in trade comprising a sale by the clearing house and a purchase by the exchange member in the underlying currency-denominated fixed income instrument;
        developing, by the at least one processing device, a single matched trade file for a specified period, the matched trade file comprising details of the at least one locked-in trade, the at least one other locked-in trade, the short positions and the long positions,
        said single matched trade file being embedded with messages as data records, such that each of said data records corresponds to a respective one of at least one locked-in trade and the at least one other locked-in trade;
        transmitting, by the at least one processing device, the single matched trade file, over a computer network, to a computerized transaction settlement system; and
        settling, by the computerized transaction settlement system, the locked-in trades embedded as data records within the single matched trade file.

2. The method of claim 1, further comprising:
    providing a user interface comprising a selection of financial instruments available for delivery from which the exchange member may nominate at least one financial instrument;
    receiving information from the exchange member interacting with the user interface, the received information comprising an instrument nomination.

3. The method of claim 2, wherein the user interface providing the selection of financial instruments includes CUSIP information.

4. The method of claim 2, wherein the user interface providing the selection of financial instruments includes coupon rate information.

5. The method of claim 2, wherein the user interface providing the selection of financial instruments includes maturity information.

6. The method of claim 2, wherein the selection of financial instruments is limited to financial instruments that are deliverable under the terms of a contract associated with the short position.

7. The method of claim 1, wherein the nominated instruments are bonds, and further comprising:
    ordering long clearing member accounts;
    randomly selecting an account as a starting account from the ordered accounts; and
    allocating a lowest coupon bond to the starting account and accounts following the starting account according to the order and continuing the allocation of the next lowest coupon bond once the lowest coupon bond has been allocated and continuing until all bonds have been allocated.

8. The method of claim 7, wherein when bonds of equal coupon but different maturity dates have been nominated, allocating bonds with an earlier maturity date before allocating bonds with a later maturity date.

9. The method of claim 1, wherein the matched trade file comprises a settlement date, an exchange member identification, an assigned trade price, and a CUSIP.

10. An exchange delivery system, comprising:
    means to receive and maintain data pertaining to cleared open interests, wherein the cleared open interests comprise interests that remain open after delivery expiration; and means to automatically submit the cleared open interests as locked-in trades in an underlying currency-denominated fixed income instrument, comprising:
   means to receive from an exchange member an instrument nomination for each open interest representing a short position, the instrument nomination specifying the underlying currency-denominated fixed income instrument that is to be delivered by a member;
   means to determine one or more long positions that will take delivery of one or more short positions represented by the nominated instruments for each member, comprising:
      means to determine a trading volume assigned to each trading date for each exchange member, comprising:
         means to sort a set of volumes associated with long positions by trading date, and
         means to select, starting with a latest trading date, each trading date sequentially until the long position for that member has been satisfied;
      means to group long positions by trading date; and
      means to add long positions for each trading date to the pool of long positions until the total long positions satisfy the total short positions on a trading date pro-rata basis responsive to a total volume of the trading date being greater than required;
   means to convert the one or more short positions to at least one locked-in trade comprising a purchase by a clearing house and sale by the exchange member in the underlying currency-denominated fixed income instrument corresponding to each of the short positions;
   means to convert the one or more long positions to at least one other locked-in trade comprising a sale by the clearing house and a purchase by the exchange member in the underlying currency-denominated fixed income instrument;
   means to develop one matched trade file per trading day that includes messages embedded as data records, each of said data records comprising a settlement date, an exchange Member identification, an assigned trade price, and a CUSIP corresponding to a respective one of the at least one locked-in trade and the at least one other locked in trade;
   means to transmit the one matched trade file, over a computer network, to a computerized transaction settlement system for settlement; and
   means to settle, by the computerized transaction settlement system, the locked-in trades embedded as data records within the one matched trade file.

11. The system of claim 10, further comprising:
   means to provide a user interface comprising a selection of financial instruments available for delivery from which the exchange member may nominate at least one financial instrument;
   means to receive information from the exchange member interacting with the user interface, the received information comprising an instrument nomination.

12. The system of claim 11, wherein the user interface providing the selection of financial instruments includes CUSIP information.

13. The system of claim 11, wherein the user interface providing the selection of financial instruments includes coupon rate information.

14. The system of claim 11, wherein the user interface providing the selection of financial instruments includes maturity information.

15. The system of claim 11, wherein the selection of financial instruments is limited to financial instruments that are deliverable under the terms of a contract associated with the short position.

16. The system of claim 10, wherein the nominated instruments are bonds, further comprising:
   means to order long clearing member accounts;
   means to randomly select an account as a starting account from the ordered accounts; and
   means to allocate a lowest coupon bond to the starting account and accounts following the starting account according to the order and continuing the allocation of the next lowest coupon bond once the lowest coupon bond has been allocated and continuing until all bonds have been allocated.

17. The system of claim 16, further comprising:
   wherein when bonds of equal coupon but different maturity dates have been nominated, means to allocate bonds with an earlier maturity date before allocating bonds with a later maturity date.

18. The system of claim 10, wherein the matched trade file comprises a settlement date, an exchange member identification, an assigned trade price, and a CUSIP.

19. A financial instrument exchange apparatus configured to provide transaction communication via a matched trade file, the apparatus comprising:
   a memory;
   at least one processor disposed in communication with said memory and configured to execute instructions stored in the memory to cause the apparatus to:
      receive and maintain data pertaining to cleared open interests, wherein the cleared open interests comprise interests that remain open after delivery expiration; and
      automatically submit the cleared open interests as locked-in trades in an underlying currency-denominated fixed income instrument by executing instructions that cause the apparatus to:
         receive from an exchange member an instrument nomination for each open interest representing a short position, the instrument nomination specifying the underlying currency-denominated fixed income instrument that is to be delivered by a member;
         determine one or more long positions that will take delivery of one or more short positions represented by the nominated instruments for each member by executing instructions that cause the apparatus to:
            determine a trading volume assigned to each trading date for each exchange member by:
               sorting a set of volumes associated with long positions by trading date, and
               selecting, starting with the latest trading date, each trading date sequentially until the long position for that member has been satisfied;
            group long positions by trading date; and
            add long positions for each trading date to the pool of long positions until the total long positions satisfy the total short positions on a trading date pro-rata basis responsive to a total volume of the trading date being greater than required;
         convert the one or more short positions to at least one locked-in trade comprising a purchase by a clearing house and sale by the exchange member in the underlying currency-denominated fixed income instrument corresponding to each of the short positions;

convert the one or more long positions to at least one other locked-in trade comprising a sale by the clearing house and a purchase by the exchange member in the underlying currency-denominated fixed income instrument;

develop one matched trade file per trading day that includes messages embedded as data records, each of said data records comprising a settlement date, an exchange Member identification, an assigned trade price, and a CUSIP corresponding to a respective one of the at least one locked-in trade and the at least one other locked in trade;

transmit the one matched trade file, over a computer network, to a computerized transaction settlement system for settlement; and settle, by the computerized transaction settlement system, the locked-in trades embedded as data records within the one matched trade file.

20. The apparatus of claim 19, further comprising:
provide a user interface comprising a selection of financial instruments available for delivery from which the exchange member may nominate at least one financial instrument;
receive information from the exchange member interacting with the user interface, the received information comprising an instrument nomination.

21. The apparatus of claim 20, wherein the user interface providing the selection of financial instruments includes CUSIP information.

22. The apparatus of claim 20, wherein the user interface providing the selection of financial instruments includes coupon rate information.

23. The apparatus of claim 20, wherein the user interface providing the selection of financial instruments includes maturity information.

24. The apparatus of claim 20, wherein the selection of financial instruments is limited to financial instruments that are deliverable under the terms of a contract associated with the short position.

25. The apparatus of claim 19, wherein the nominated instruments are bonds, further comprising:
order long clearing member accounts;
randomly select an account as a starting account from the ordered accounts; and
allocate a lowest coupon bond to the starting account and accounts following the starting account according to the order and continuing the allocation of the next lowest coupon bond once the lowest coupon bond has been allocated and continuing until all bonds have been allocated.

26. The apparatus of claim 25, further comprising: wherein when bonds of equal coupon but different maturity dates have been nominated, means to allocate bonds with an earlier maturity date before allocating bonds with a later maturity date.

27. The apparatus of claim 19, wherein the matched trade file comprises a settlement date, an exchange member identification, an assigned trade price, and a CUSIP.

28. A non-transitory computer-readable medium storing processor-issuable and generated instructions to:
receive and maintain data pertaining to cleared open interests, wherein the cleared open interests comprise interests that remain open after delivery expiration; and
automatically submit the cleared open interests as locked-in trades in an underlying currency-denominated fixed income instrument by:
receiving from an exchange member an instrument nomination for each open interest representing a short position, the instrument nomination specifying an underlying currency-denominated fixed income instrument that is to be delivered by a member;
determining by a processor one or more long positions that will take delivery of one or more short positions represented by the nominated instruments for each member by:
determining a trading volume assigned to each trading date for the each exchange member by:
sorting a set of volumes associated with long positions by trading date, and
selecting, starting with a latest trading date, each trading date sequentially until the long position for that member has been satisfied;
grouping long positions by trading date; and
adding long positions for each trading date to the pool of long positions until the total long positions satisfy the total short positions on a trading date pro-rata basis responsive to a total volume of the trading date being greater than required;
converting the one or more short positions to at least one locked-in trade comprising a purchase by a clearing house and sale by the exchange member in the underlying currency-denominated fixed income instrument corresponding to each of the short positions;
converting the one or more long positions to at least one other locked-in trade comprising a sale by the clearing house and a purchase by the exchange member in the underlying currency-denominated fixed income instrument;
developing one matched trade file per trading day that includes messages embedded as data records, each of said data records comprising a settlement date, an exchange member identification, an assigned trade price, and a CUSIP corresponding to a respective one of the at least one locked-in trade and the at least one other locked in trade;
transmitting the matched trade file, over a computer network, to a computerized transaction settlement system for settlement; and
settling, by the computerized transaction settlement system, the locked-in trades embedded as data records within the one matched trade file.

* * * * *